(12) United States Patent
Shiiyama

(10) Patent No.: US 7,508,998 B2
(45) Date of Patent: Mar. 24, 2009

(54) IMAGE SEARCH APPARATUS, IMAGE SEARCH METHOD, PROGRAM, AND STORAGE MEDIUM

(75) Inventor: Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 11/291,981

(22) Filed: Dec. 2, 2005

(65) Prior Publication Data

US 2006/0120627 A1  Jun. 8, 2006

(30) Foreign Application Priority Data

Dec. 7, 2004  (JP) ............................. 2004-354702

(51) Int. Cl.
*G06K 9/54* (2006.01)
*G06K 9/46* (2006.01)

(52) U.S. Cl. .......................................... 382/305; 707/3

(58) Field of Classification Search ................. 382/170, 382/173, 181, 190, 228, 305, 176, 192, 218–220; 707/1, 3, 4, 100, 104.1; 358/403
See application file for complete search history.

(56) References Cited

U.S. PATENT DOCUMENTS

| 5,159,667 | A | 10/1992 | Borrey et al. ............... 395/148 |
| 6,584,223 | B1 * | 6/2003 | Shiiyama .................... 382/173 |
| 6,826,305 | B2 * | 11/2004 | Zhu ............................ 382/172 |
| 7,075,683 | B1 | 7/2006 | Shiiyama .................... 358/452 |
| 7,233,945 | B2 * | 6/2007 | Shiiyama ....................... 707/4 |
| 2003/0108237 | A1 | 6/2003 | Hirata ........................ 382/164 |
| 2003/0236778 | A1 * | 12/2003 | Masumoto et al. ............ 707/3 |
| 2004/0091153 | A1 * | 5/2004 | Nakano et al. .............. 382/228 |
| 2004/0215660 | A1 * | 10/2004 | Ikeda ....................... 707/104.1 |
| 2004/0243602 | A1 | 12/2004 | Shiiyama .................... 707/100 |
| 2006/0110073 | A1 | 5/2006 | Matsushita et al. .......... 382/305 |
| 2006/0164702 | A1 | 7/2006 | Shiiyama .................... 358/537 |

FOREIGN PATENT DOCUMENTS

JP  2001-319231  11/2001
WO  99/17250  4/1999

OTHER PUBLICATIONS

U.S. Appl. No. 11/598,026, (Hirotaka Shiiyama), pending.

* cited by examiner

*Primary Examiner*—Kanji Patel
(74) *Attorney, Agent, or Firm*—Fitzpatrick, Cella, Harper & Scinto

(57) ABSTRACT

This invention realizes, with low cost, an image search apparatus which can quickly obtain adequate search results upon searching for document images which are identical or similar to a predetermined document image. To this end, an image search apparatus of this invention has the following arrangement. That is, an image search apparatus for searching for images similar to a query image, includes a region division unit (204, 209) which extracts a plurality of partial regions which form an image, a region feature extraction unit (205, 210) which calculates the number of partial regions and center of gravity positions, and a feature amount updating unit (206) which saves the calculated number of partial regions and center of gravity positions in an image region management DB (216) as an index. The image search apparatus loads partial regions which match the number of partial regions and center of gravity positions of a query image from the image region management DB (216) onto a memory, narrows down registered images on the basis of the loaded partial regions, and searches the narrowed-down registered images for images.

34 Claims, 44 Drawing Sheets

FIG. 6

| 1 | 2 | 3 |
|---|---|---|
| 4 | 5 | 6 |
| 7 | 8 | 9 |

| 61 | 134 | 142 | 256 |
|---|---|---|---|
| 61 | 142 | 213 | 267 |
| 65 | 139 | 293 | 391 |
| 51 | 121 | 136 | 500 |

DOCUMENTS WITH NUMBER OF
IMAGE REGIONS = 1
(2972 DOCUMENTS - 2972 IMAGES)

B

| 100 | 206 | 175 | 261 |
|---|---|---|---|
| 109 | 215 | 244 | 290 |
| 148 | 305 | 332 | 428 |
| 102 | 227 | 176 | 254 |

DOCUMENTS WITH NUMBER OF
IMAGE REGIONS = 2
(1786 DOCUMENTS - 3572 IMAGES)

C

| 91 | 186 | 163 | 207 |
|---|---|---|---|
| 107 | 318 | 252 | 293 |
| 143 | 314 | 348 | 383 |
| 75 | 201 | 193 | 212 |

DOCUMENTS WITH NUMBER OF
IMAGE REGIONS = 3
(1162 DOCUMENTS - 3486 IMAGES)

D

| 107 | 201 | 179 | 238 |
|---|---|---|---|
| 140 | 335 | 234 | 340 |
| 143 | 328 | 310 | 404 |
| 96 | 190 | 176 | 151 |

DOCUMENTS WITH NUMBER OF
IMAGE REGIONS = 4
(893 DOCUMENTS - 3572 IMAGES)

E

| 83 | 151 | 143 | 134 |
|---|---|---|---|
| 126 | 235 | 204 | 203 |
| 131 | 247 | 220 | 180 |
| 74 | 126 | 126 | 92 |

DOCUMENTS WITH NUMBER OF
IMAGE REGIONS = 5
(495 DOCUMENTS - 2475 IMAGES)

F

| 76 | 124 | 116 | 83 |
|---|---|---|---|
| 104 | 210 | 169 | 127 |
| 132 | 239 | 205 | 122 |
| 68 | 146 | 113 | 84 |

DOCUMENTS WITH NUMBER OF
IMAGE REGIONS = 6
(353 DOCUMENTS - 2118 IMAGES)

G

| 52 | 63 | 56 | 61 |
|---|---|---|---|
| 70 | 103 | 121 | 94 |
| 71 | 110 | 106 | 82 |
| 43 | 74 | 74 | 52 |

DOCUMENTS WITH NUMBER OF
IMAGE REGIONS = 7
(176 DOCUMENTS - 1232 IMAGES)

H

| 35 | 63 | 53 | 42 |
|---|---|---|---|
| 46 | 82 | 86 | 40 |
| 66 | 66 | 68 | 45 |
| 27 | 46 | 54 | 37 |

DOCUMENTS WITH NUMBER OF
IMAGE REGIONS = 8
(107 DOCUMENTS - 856 IMAGES)

I

| 19 | 29 | 35 | 30 |
|---|---|---|---|
| 36 | 49 | 31 | 37 |
| 55 | 81 | 72 | 51 |
| 25 | 45 | 42 | 29 |

DOCUMENTS WITH NUMBER OF
IMAGE REGIONS = 9
(74 DOCUMENTS - 666 IMAGES)

J

| 19 | 49 | 46 | 27 |
|---|---|---|---|
| 38 | 64 | 50 | 32 |
| 37 | 77 | 70 | 30 |
| 27 | 34 | 50 | 20 |

DOCUMENTS WITH NUMBER OF
IMAGE REGIONS = 10
(67 DOCUMENTS - 670 IMAGES)

K

| 136 | 119 | 119 | 104 |
|---|---|---|---|
| 167 | 163 | 169 | 83 |
| 124 | 135 | 148 | 82 |
| 104 | 82 | 118 | 52 |

DOCUMENTS WITH NUMBER OF
IMAGE REGIONS = 11 OR MORE
(140 DOCUMENTS - 1905 IMAGES)

F I G. 10

| REGISTERED DOCUMENT IMAGE ID | FULL-PATH FILE NAME | NUMBER OF IMAGE REGIONS | IMAGE REGION ID |
|---|---|---|---|
| 0000001 | C:¥img¥0000001.jpg | 2 | 0000001 0000002 |
| 0000002 | C:¥img¥0000002.jpg | 1 | 0000003 |

FIG. 11

| DOCUMENT SHAPE 1101 | NUMBER OF IMAGE REGIONS 1102 | CENTER OF GRAVITY POSITION BLOCK OF IMAGE REGION 1103 | IMAGE REGION ID LIST 1104 | FEATURE AMOUNT OF IMAGE REGION 1105 |
|---|---|---|---|---|
| VERTICALLY ELONGATED | 2 | 6 | 1,3 | FEATURE AMOUNT OF IMAGE REGION ID = 1<br>FEATURE AMOUNT OF IMAGE REGION ID = 3 |
| VERTICALLY ELONGATED | 1 | 11 | 2 | FEATURE AMOUNT OF IMAGE REGION ID = 2 |

FIG. 12

| 1201 | 1202 | 1203 | 1204 | 1205 |
|---|---|---|---|---|
| ASPECT RATIO | SIZE | CENTER OF GRAVITY POSITION COORDINATES | COLOR FEATURE INFORMATION | IMAGE REGION ID |
| 1.2 | 0.5 | 0.3, 0.3 | ......... | 0000001 |
| 0.7 | 0.6 | 0.75, 0.7 | ......... | 0000003 |
| 1.5 | 0.6 | 0.8, 0.2 | ......... | 0000002 |

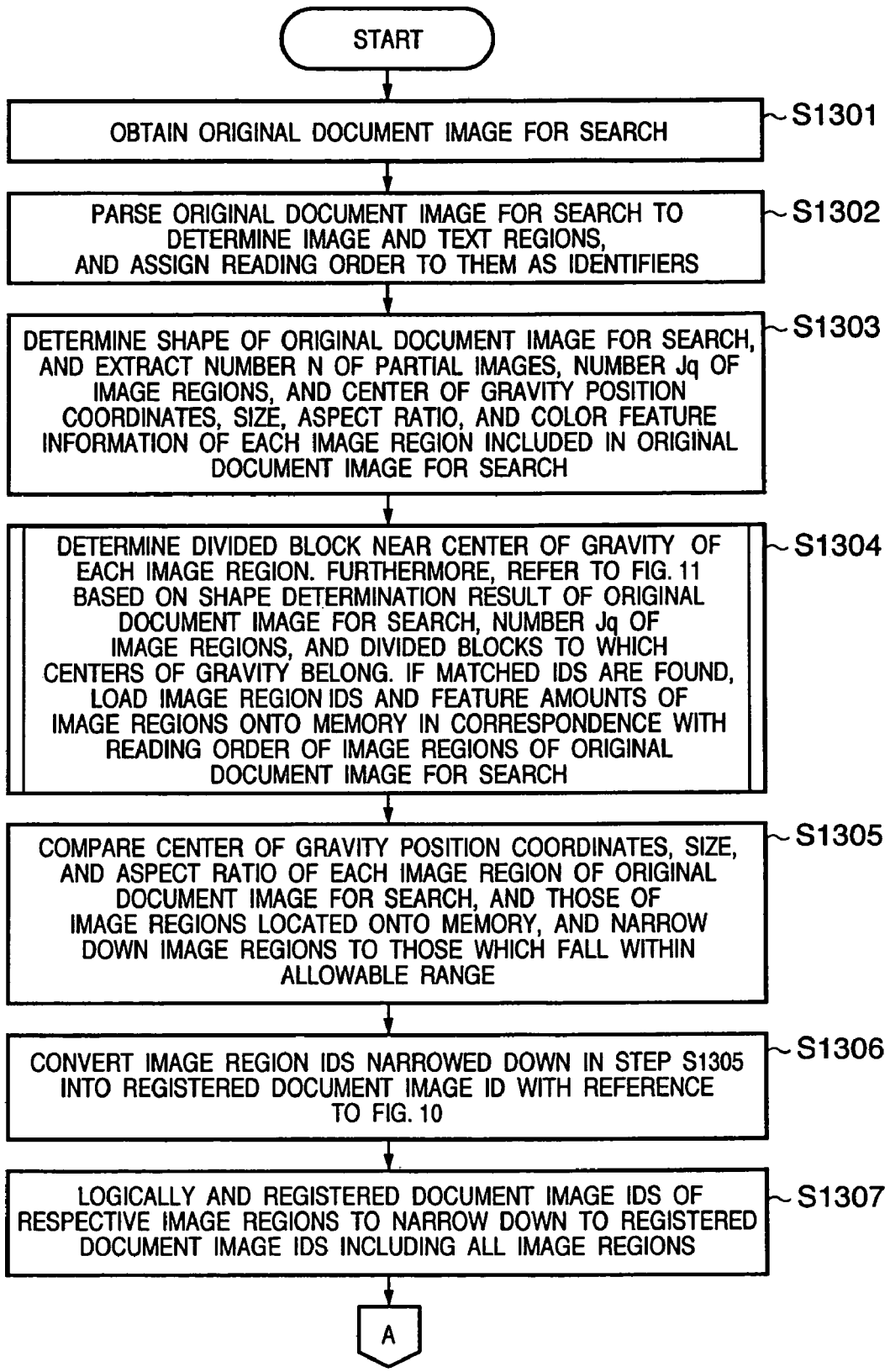

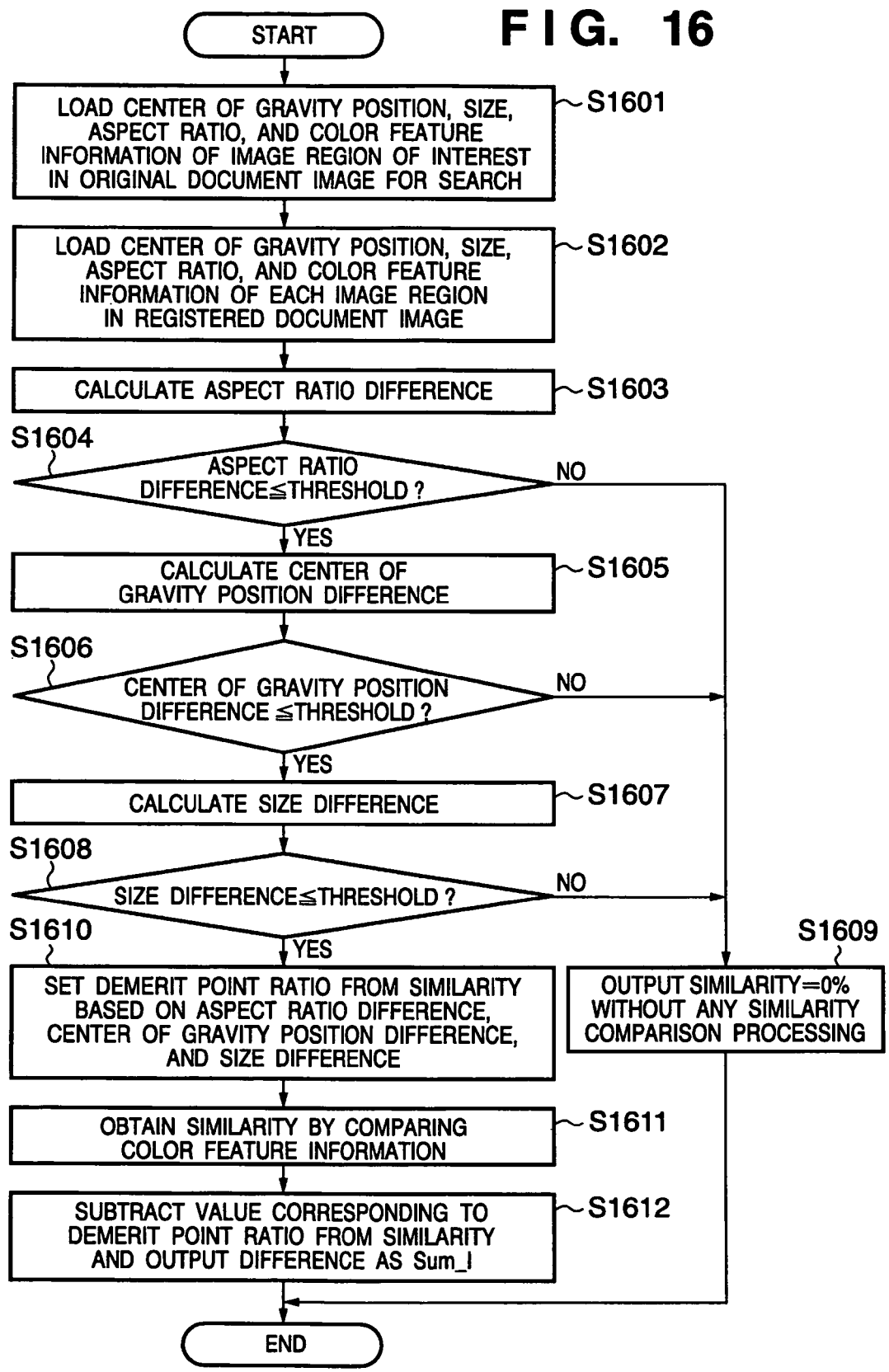

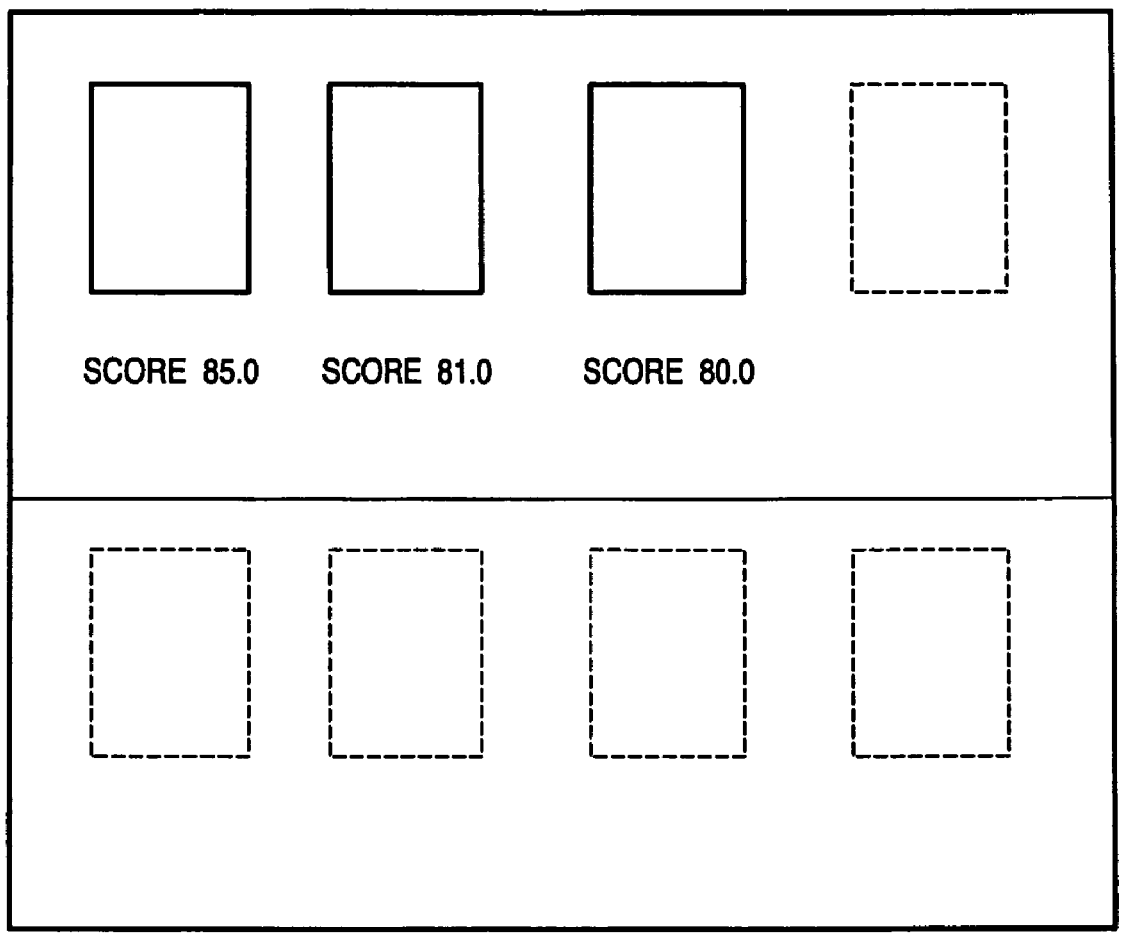
F I G. 18

FIG. 21

| REGISTERED DOCUMENT IMAGE ID 2101 | FULL-PATH FILE NAME 2102 | NUMBER OF TEXT REGIONS 2103 | TEXT REGION ID 2104 |
|---|---|---|---|
| 0000001 | C:¥img¥0000001.jpg | 2 | 0000001<br>0000002 |
| 0000002 | C:¥img¥0000002.jpg | 1 | 0000003 |

FIG. 22

| DOCUMENT SHAPE | NUMBER OF TEXT REGIONS | CENTER OF GRAVITY POSITION BLOCK OF TEXT REGION | TEXT REGION ID LIST | FEATURE AMOUNT OF TEXT REGION |
|---|---|---|---|---|
| VERTICALLY ELONGATED | 2 | 6 | 1,3 | FEATURE AMOUNT OF TEXT REGION ID = 1<br>FEATURE AMOUNT OF TEXT REGION ID = 3 |
| VERTICALLY ELONGATED | 1 | 11 | 2 | FEATURE AMOUNT OF TEXT REGION ID = 2 |

| 2301 | 2302 | 2303 | 2304 | 2305 |
|---|---|---|---|---|
| ASPECT RATIO | SIZE | CENTER OF GRAVITY POSITION COORDINATES | INTRA-REGION TEXT INFORMATION | TEXT REGION ID |
| 1.2 | 0.5 | 0.3, 0.3 | ......... | 0000001 |
| 0.7 | 0.6 | 0.75, 0.7 | ......... | 0000003 |
| 1.5 | 0.6 | 0.8, 0.2 | ......... | 0000002 |

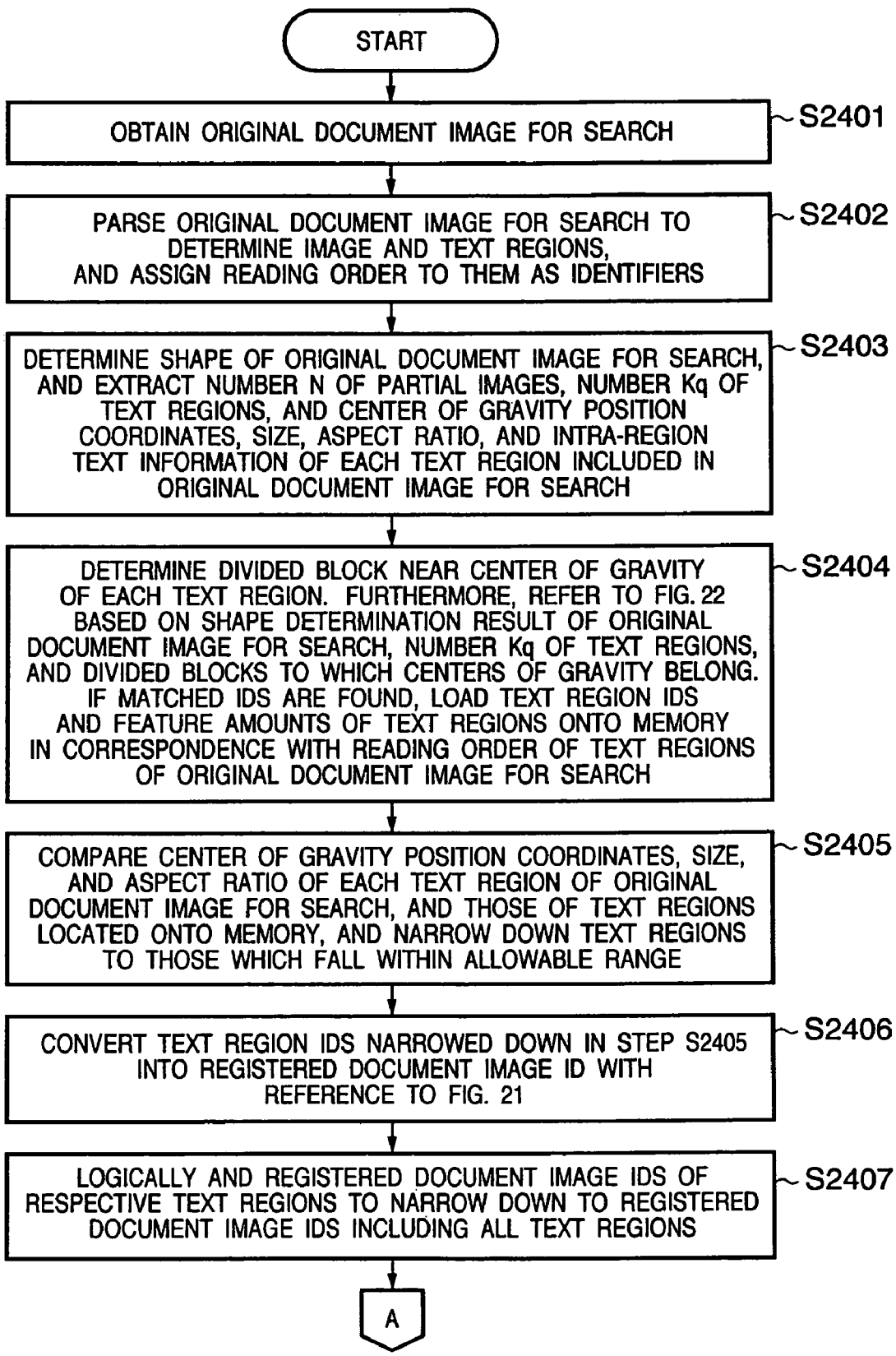

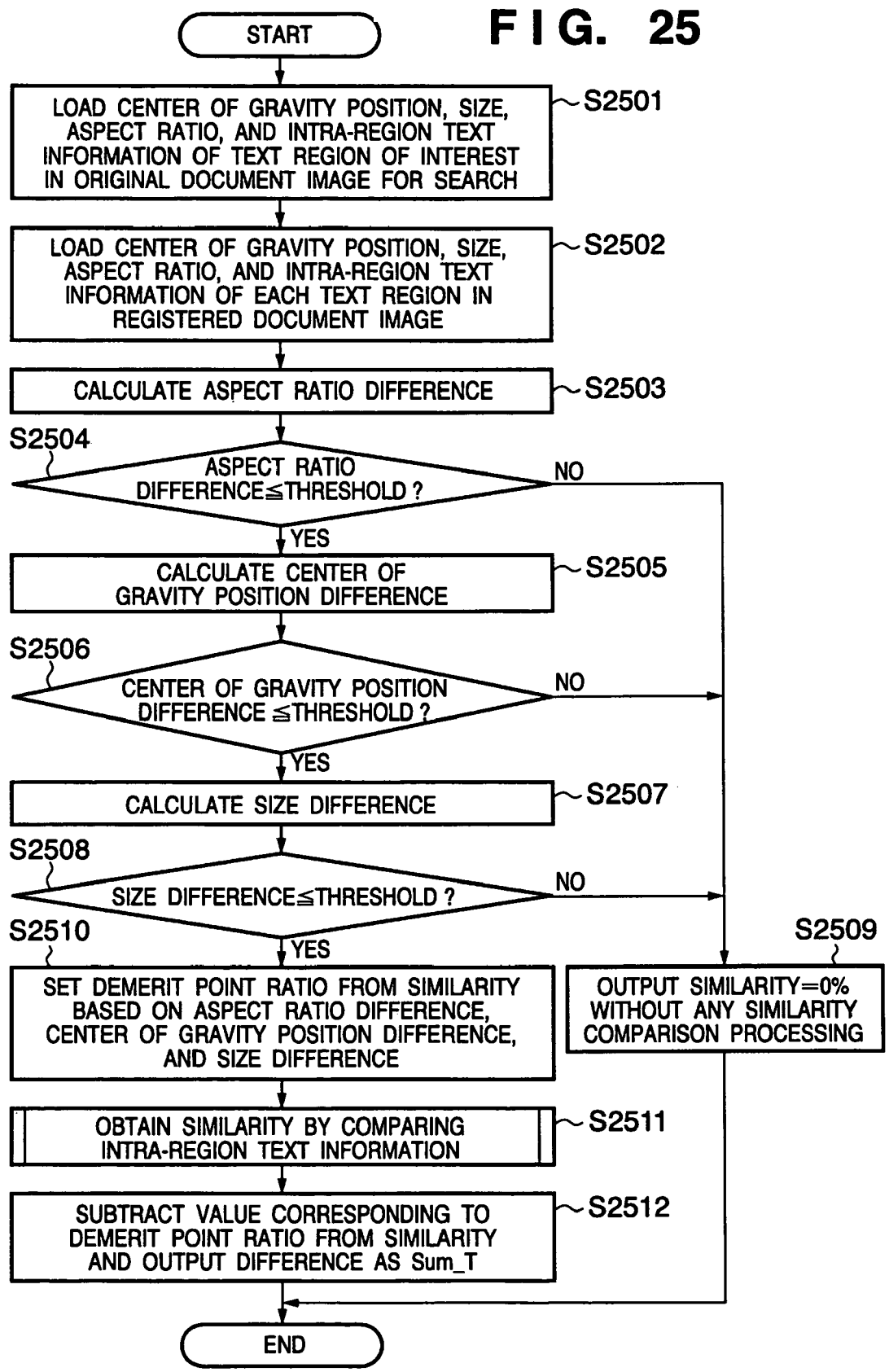

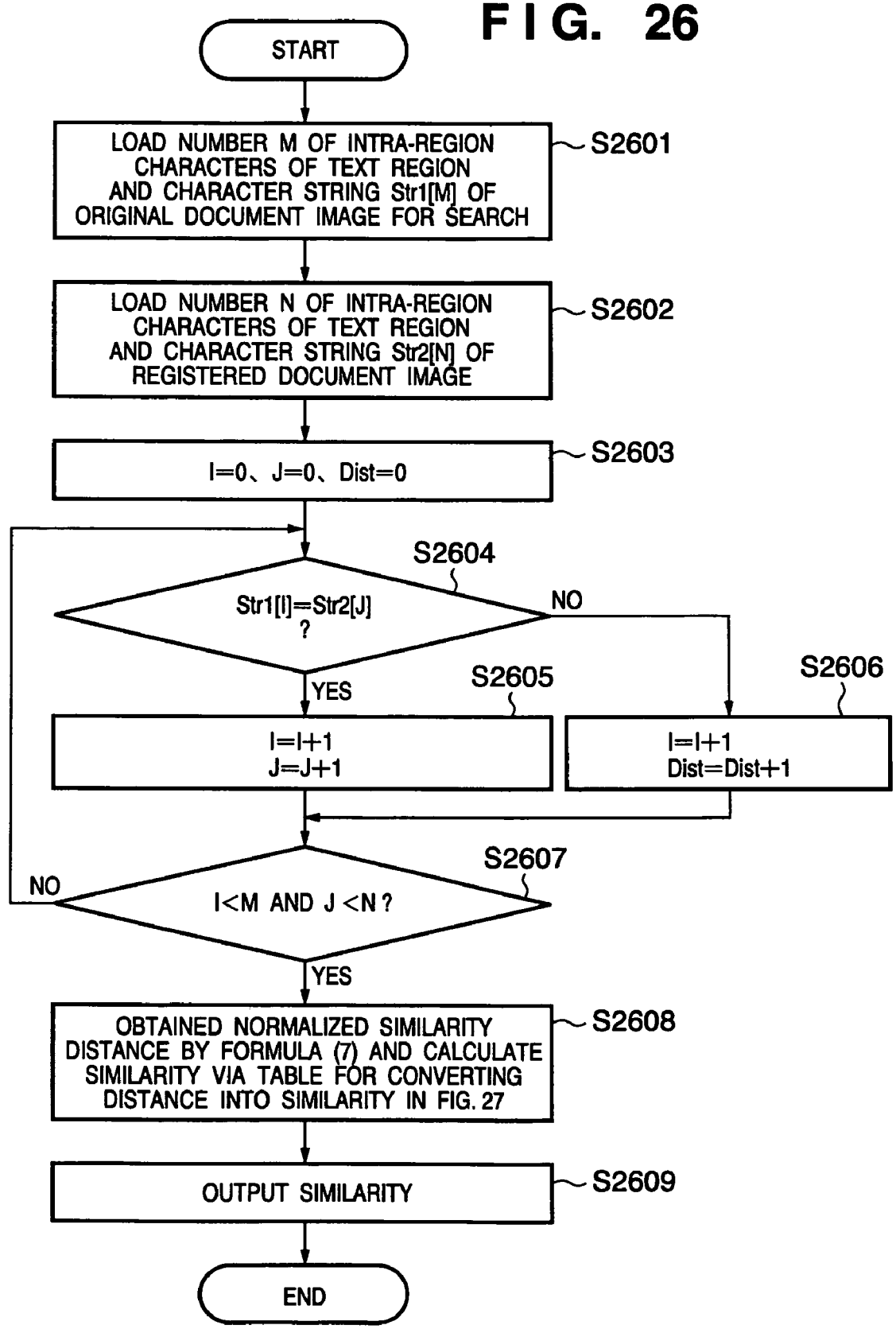

FIG. 30

| REGISTERED DOCUMENT IMAGE ID | FULL-PATH FILE NAME | NUMBER OF IMAGE REGIONS | NUMBER OF TEXT REGIONS | IMAGE REGION ID | TEXT REGION ID |
|---|---|---|---|---|---|
| 0000001 | C:¥img¥0000001.jpg | 2 | 1 | 0000001<br>0000002 | 0000001 |
| 0000002 | C:¥img¥0000002.jpg | 1 | 0 | 0000003 | |

FIG. 31

| 3101<br>DOCUMENT SHAPE | 3102<br>NUMBER OF IMAGE REGIONS | 3103<br>CENTER OF GRAVITY POSITION BLOCK OF IMAGE REGION | 3104<br>IMAGE REGION ID LIST | 3105<br>FEATURE AMOUNT OF IMAGE REGION |
|---|---|---|---|---|
| VERTICALLY ELONGATED | 2 | 6 | 1,3 | FEATURE AMOUNT OF IMAGE REGION ID =1<br>FEATURE AMOUNT OF IMAGE REGION ID =3 |
| VERTICALLY ELONGATED | 1 | 11 | 2 | FEATURE AMOUNT OF IMAGE REGION ID =2 |

FIG. 32

| ASPECT RATIO | SIZE | CENTER OF GRAVITY POSITION COORDINATES | COLOR FEATURE INFORMATION | IMAGE REGION ID |
|---|---|---|---|---|
| 1.2 | 0.5 | 0.3, 0.3 | ......... | 0000001 |
| 0.7 | 0.6 | 0.75, 0.7 | ......... | 0000003 |
| 1.5 | 0.6 | 0.8, 0.2 | ......... | 0000002 |

| 3301 | 3302 | 3303 | 3304 | 3305 |
|---|---|---|---|---|
| DOCUMENT SHAPE | NUMBER OF TEXT REGIONS | CENTER OF GRAVITY POSITION BLOCK OF TEXT REGION | TEXT REGION ID LIST | FEATURE AMOUNT OF TEXT REGION |
| VERTICALLY ELONGATED | 1 | 10 | 1 | FEATURE AMOUNT OF TEXT REGION ID=1 |

FIG. 34

| 3401 | 3402 | 3403 | 3404 | 3405 |

| ASPECT RATIO | SIZE | CENTER OF GRAVITY POSITION COORDINATES | INTRA-REGION TEXT INFORMATION | TEXT REGION ID |
|---|---|---|---|---|
| 0.7 | 0.2 | 0.5, 0.2 | ·········· | 0000001 |

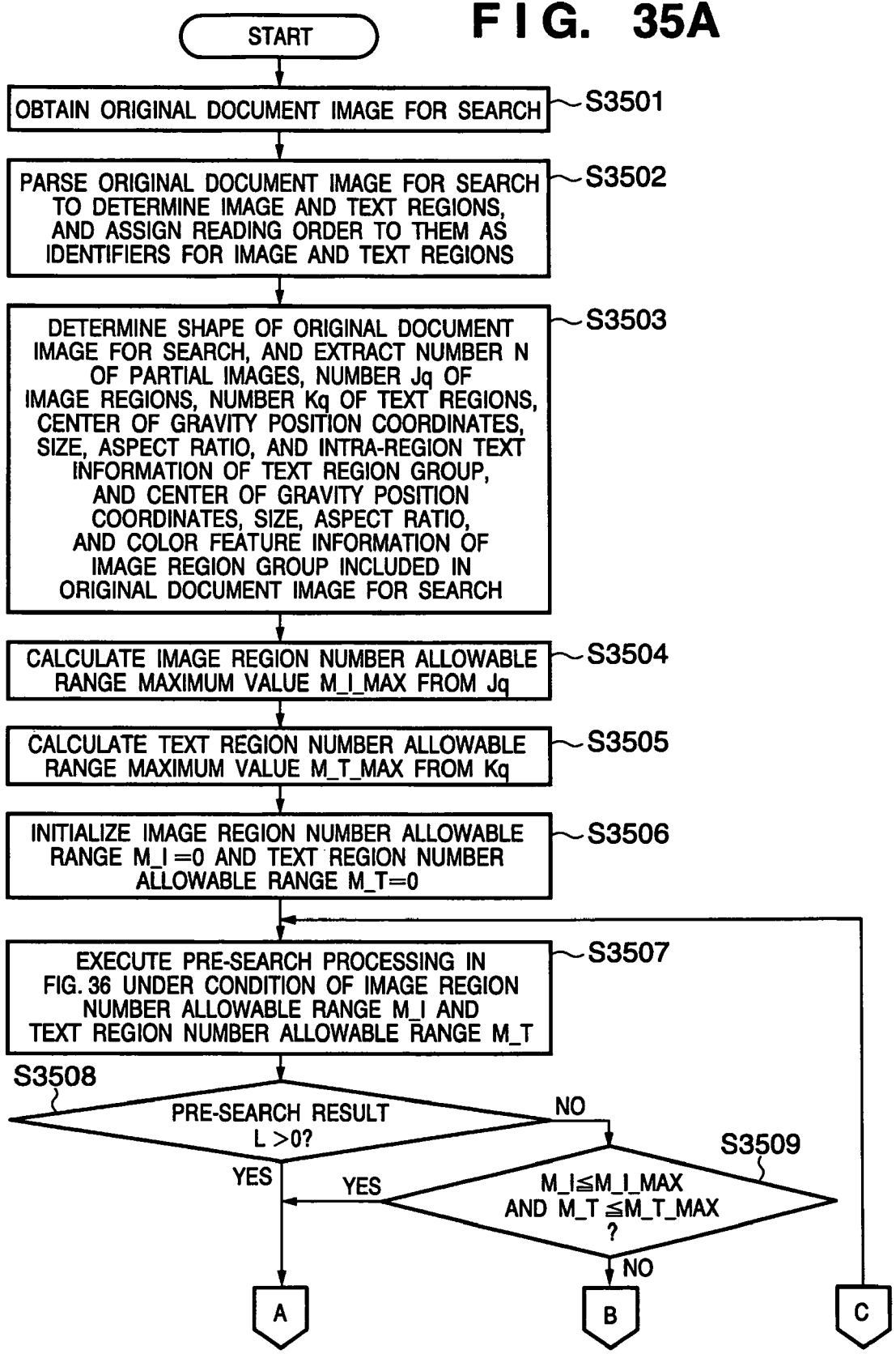

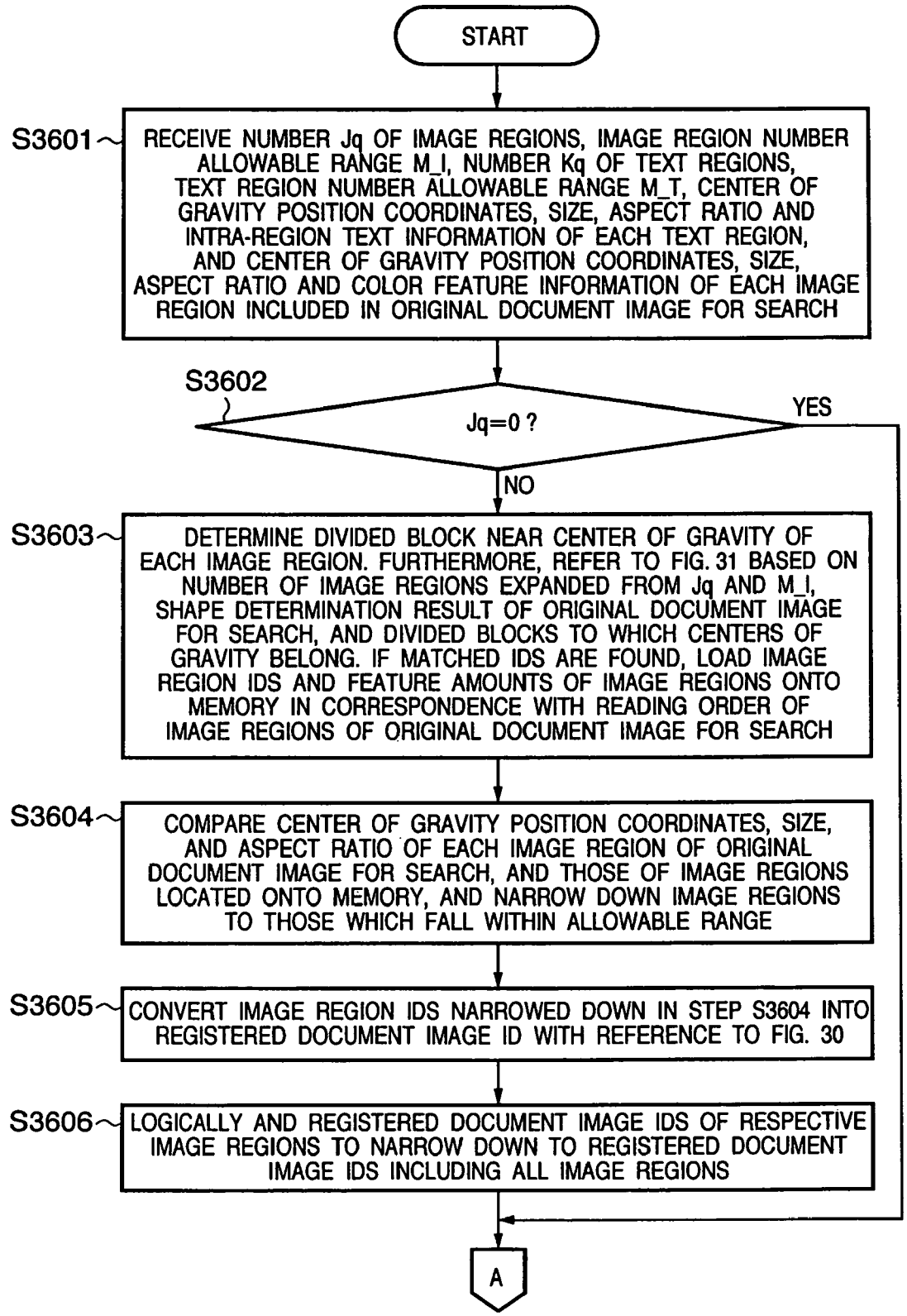

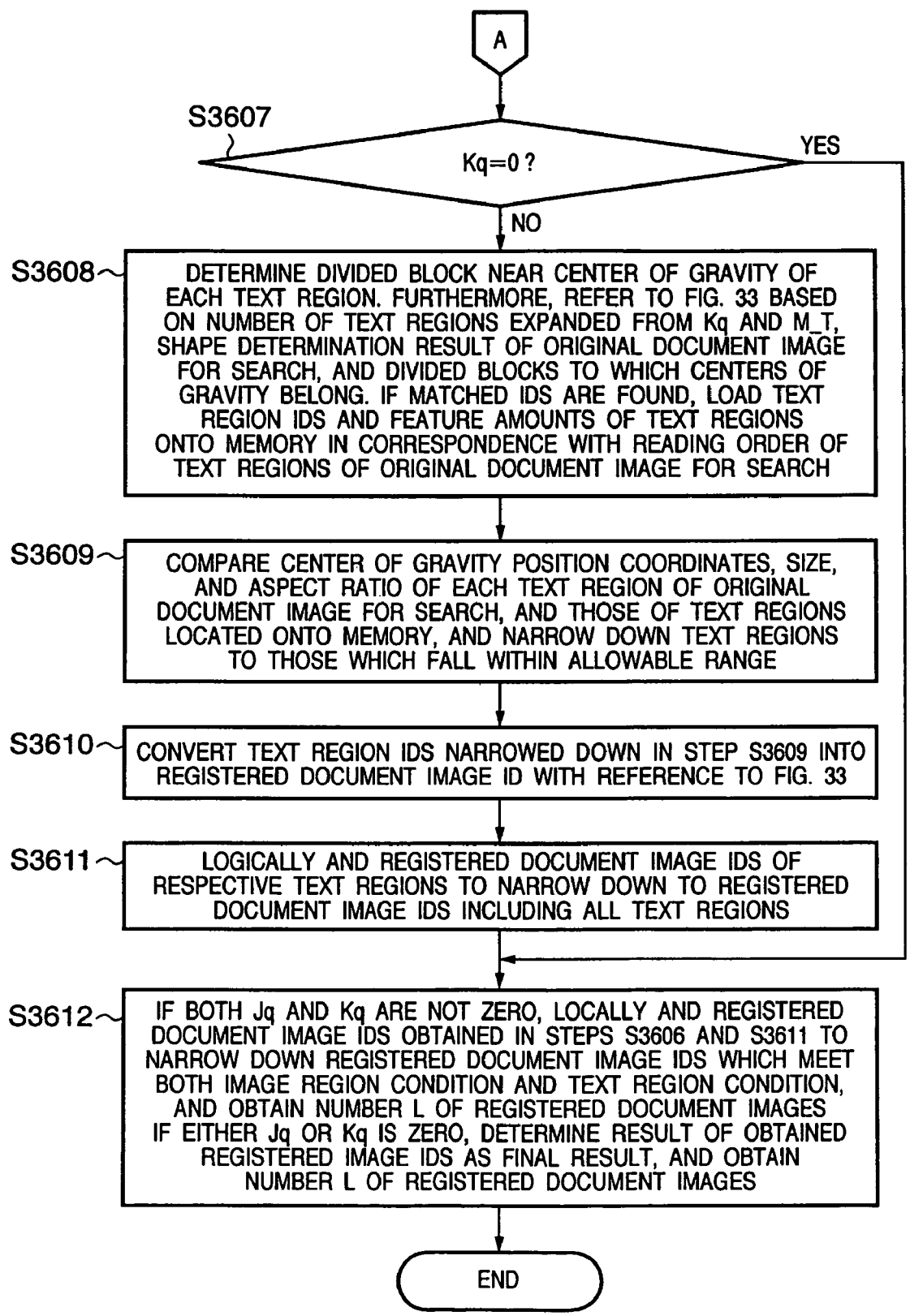

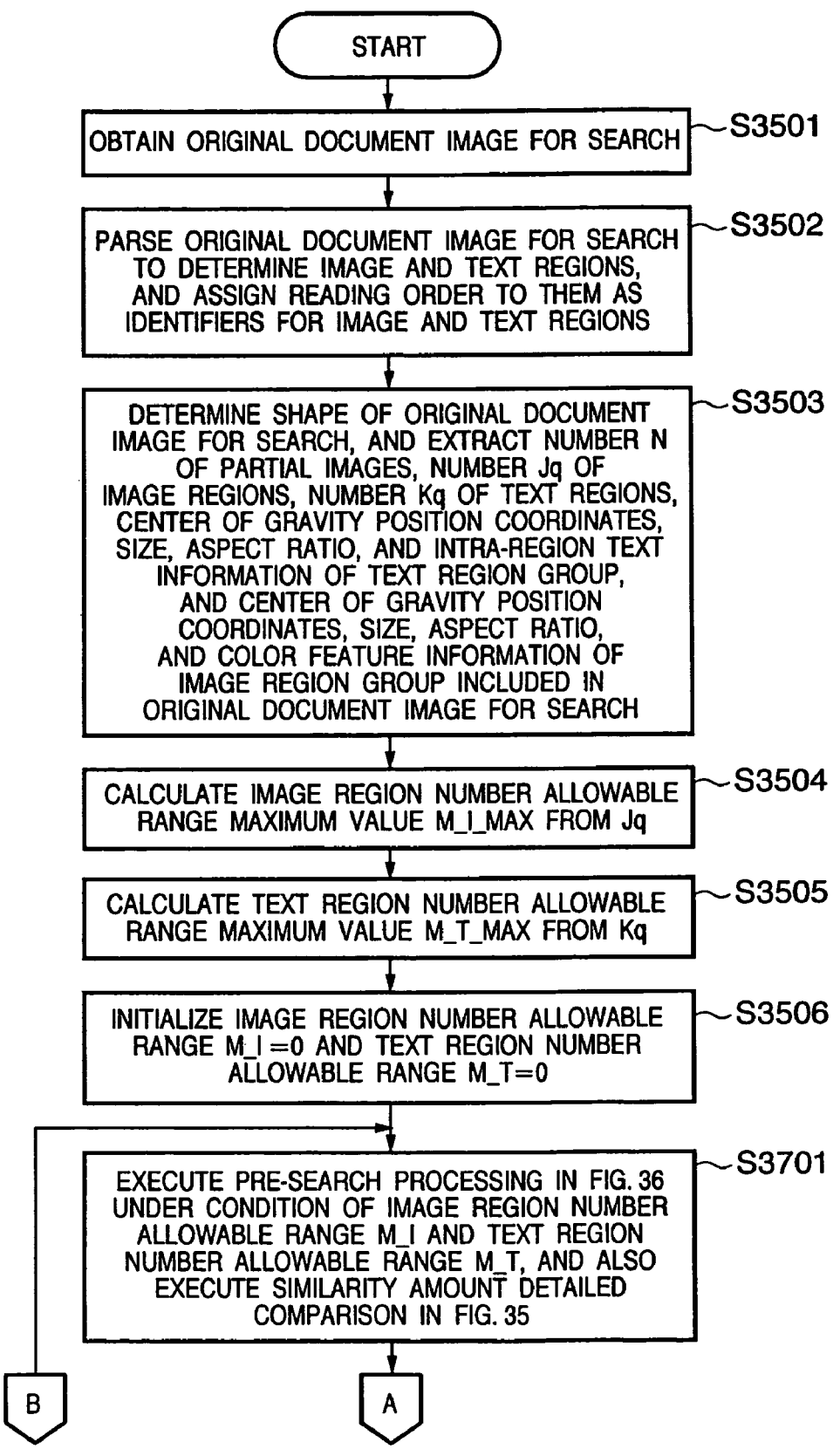

IMAGE SEARCH APPARATUS, IMAGE SEARCH METHOD, PROGRAM, AND STORAGE MEDIUM

FIELD OF THE INVENTION

The present invention relates to an image search technique for searching document images.

BACKGROUND OF THE INVENTION

Conventionally, an image search technique for searching a DB (database) for a document image which is equal or similar to a predetermined document image at high speed has been proposed. For example, Japanese Patent Laid-Open No. 2001-319231 (patent reference 1) speeds up search processing by extracting a plurality of partial regions from a document image, specifying the number of extracted partial regions as a narrowing-down condition, and calculating a similarity to a document image which has the same number of regions using that feature amount.

However, in case of the search method described in the prior art, since only the number of partial regions is used as the narrowing-down condition, candidates cannot often be sufficiently narrowed down. Hence, in order to narrow down to the appropriate number of candidates, and to further speed up the search processing, it is desired that the narrowing-down condition includes not only the number of partial regions but also feature amounts of partial regions, and the like.

However, upon narrowing down candidates, if all the feature amounts of the partial regions reside on a memory, system cost undesirably increases. On the other hand, in order to avoid such problem, when all the feature amounts of each document image are saved in an HDD (hard disk drive), file accesses take much time, resulting in a heavy image search time. Likewise, even when all the feature amounts are managed by a DB and those of a desired document image are directly referred to from the DB, database transactions take much time, and a long processing time is also required to read data from the HDD, resulting in distant implementation. Therefore, it is demanded to use optimal feature amounts so as to narrow down to the appropriate number of candidates, and to implement such narrowing-down processing at high speed and with low cost.

Furthermore, upon conducting image search like in patent reference 1, if feature amounts are compared with those of a document image having the same number of regions, adequate image search is often disabled due to over- or under-extraction upon extracting partial regions from a document image. For this reason, feature amounts and the like used in the narrowing-down condition must have flexibility.

SUMMARY OF THE INVENTION

The present invention has been made in consideration of the above problems, and has as its object to implement an image search apparatus, which can obtain an adequate search result at high speed upon searching for a document image equal or similar to a predetermined document image, with low cost.

In order to achieve the above object, an image search apparatus according to the present invention comprises the following arrangement. That is, an image search apparatus for searching a plurality of saved registered images for an image similar to a predetermined image, comprising:

extraction unit configured to extract a plurality of partial regions which form an image;

determination unit configured to determine attributes of the partial regions extracted by the extraction unit;

first calculation unit configured to calculate the number of partial regions having an identical attribute of the attributes of the partial regions determined by the determination unit, and center of gravity positions of the partial regions;

second calculation unit configured to calculate feature amounts of the partial regions having the identical attribute of the attributes of the partial regions determined by the determination unit;

save unit configured to save the number of partial regions having the identical attribute and the positions of the partial regions calculated by the first calculation unit as an index in correspondence with the image;

load unit configured to refer to indices saved in said save unit on the basis of the number of partial regions having the identical attribute and the positions of the partial regions calculated by the first calculation unit, and for, when matched indices found, loading feature amounts of the matched partial regions onto a memory;

judgment unit configured to compare the feature amounts of the partial region which is included in the predetermined image and calculated by the second calculation unit with the feature amounts of the partial regions loaded by the load unit, and judging whether or not the feature amounts of the partial regions loaded by the load unit fall within predetermined allowable ranges, respectively; and selection unit configured to select the registered images on the basis of the judgment result of the judgment unit, wherein the registered images selected by the selection unit are searched for an image similar to the predetermined image.

According to the present invention, an image search apparatus, which can obtain an adequate search result at high speed upon searching for a document image equal or similar to a predetermined document image, can be realized with low cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view for explaining color feature information;

FIG. 9 is a view showing the calculation results of the distributions of the center of gravity positions of image regions for 10,000 vertically elongated business document images;

FIG. 10 shows a practical example of data stored in an image management DB;

FIG. 11 shows a practical example of data stored in an image region management DB;

FIG. 12 shows a practical example of data stored in the image region management DB;

FIG. 13A is a flowchart showing the flow of similar image search processing (pre-search processing);

FIG. 15A is a flowchart showing the flow of processing for determining a divided block group from which an image region index is to be referred to;

FIG. 15B is a flowchart showing the flow of processing for determining a divided block group from which an image region index is to be referred to;

FIG. 16 is a flowchart showing the flow of image region comparison processing;

FIG. 18 shows an example of a search result display window;

FIG. 21 shows a practical example of data stored in an image management DB;

FIG. 22 shows a practical example of data stored in a text region management DB;

FIG. 23 shows a practical example of data stored in the text region management DB;

FIG. 24A is a flowchart showing the flow of similar image search processing (pre-search processing);

FIG. 25 is a flowchart showing the flow of text region comparison processing;

FIG. 26 is a flowchart showing the flow of similarity calculation processing of a text region;

FIG. 30 shows a practical example of data stored in an image management DB;

FIG. 31 shows a practical example of data stored in the image management DB;

FIG. 32 shows a practical example of data stored in the image management DB;

FIG. 33 shows a practical example of data stored in a text region management DB;

FIG. 34 shows a practical example of data stored in a text region management DB;

FIG. 35A is a flowchart showing the flow of similar image search processing;

FIG. 36A is a flowchart showing the flow of pre-search processing;

FIG. 36B is a flowchart showing the flow of pre-search processing;

FIG. 37A is a flowchart showing the flow of similar search processing; and

DETAILED DESCRIPTION OF THE PREFERRED EMBODIMENTS

Figure 1:
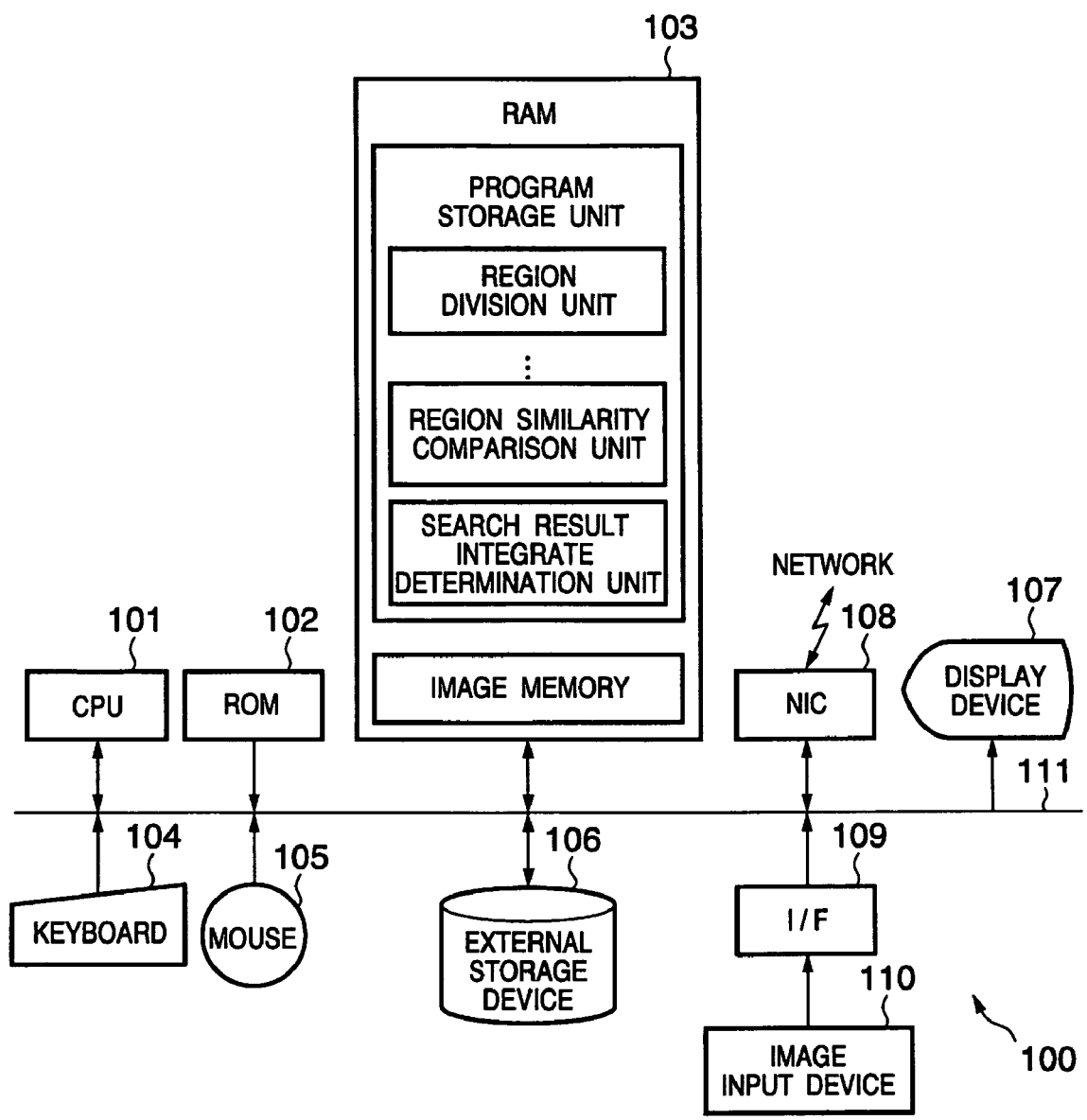
FIG. 1 is a block diagram showing an example of the arrangement of an image search apparatus common to respective embodiments of the present invention.

Preferred embodiments of the present invention will now be described in detail in accordance with the accompanying drawings.

An overview of respective embodiments of the present invention will be described first. Image search processing by an image search apparatus of each embodiment to be described hereinafter is characterized in that the narrowing-down condition uses a block (an identifier indicating a position) at the center of gravity of each partial region in addition to the number of partial regions included in a document image. In this way, since a block at the center of gravity of each partial region is used in addition to the number of partial regions, candidates can be narrowed down to the appropriate number.

Also, the narrowing-down processing is characterized in that the number of partial regions and a block at the center of gravity position of each partial region are used as an index, and only feature amounts of partial regions that match the index are loaded onto a memory. Since only specific feature amounts stored in a DB are loaded to calculate a similarity, the search speed is greatly higher than the conventional method which sequentially loads feature amounts stored on an HDD or individually and directly refers to feature amounts stored and managed using a DB. In addition, the memory consumption amount can be greatly reduced without any large search speed drop compared to the conventional method which stores all feature amounts on the memory.

Furthermore, in the conventional method, since candidates are narrowed down to those which have the same number of partial regions included in a document image, adequate image search is often disabled due to under-extraction of partial regions. However, according to the image search apparatuses according to the fourth, fifth, and sixth embodiments to be described later, candidates can be narrowed down without omission even in such case. More specifically, an allowable value is set for the number of partial regions (a threshold is set for the calculated similarity), and recursive processing is executed so that when candidates are not narrowed down to the appropriate number, the allowable value is changed to narrow down candidates again. As for a block at the center of gravity position of each partial region, not only it perfectly matches but also neighboring blocks are included.

In order to eliminate omission upon narrowing down, allowable values are provided to respective narrowing-down conditions (the number of partial regions, and a block at the center of gravity position of each partial region), while candidates are further narrowed down under the condition that feature amounts of partial regions (center of gravity position coordinates, sizes, and aspect ratios of respective partial regions), which meet the narrowing-down conditions and are loaded onto a memory, fall within allowable ranges. In this manner, since narrowing-down processing is done in two steps, candidates can be further narrowed down to the appropriate number.

Of the embodiments to be described hereinafter, the first embodiment will explain a case wherein an image region included in a document image is used upon conducting image search, and the second embodiment will explain a case wherein a text region included in a document image is used. The third embodiment will explain modifications of the first and second embodiments.

Furthermore, the fourth embodiment will explain a case wherein both an image region and text region included in a document image are used upon conducting image search, and the fifth and sixth embodiments will respectively explain modifications of the fourth embodiment.

First Embodiment

1. Hardware Arrangement of Image Search Apparatus

FIG. 1 is a block diagram showing an example of the arrangement of an image search apparatus (100) common to respective embodiments of the present invention. Referring to FIG. 1, reference numeral 101 denotes a CPU which executes various kinds of arithmetic operations and control so as to implement the image search method according to the present invention. Reference numeral 102 denotes a ROM which stores a boot program to be executed upon starting up the image search apparatus 100, and various permanent data. Reference numeral 103 denotes a RAM which stores a control program required to execute processing by the CPU 101, and provides a work area used when the CPU 101 executes various kinds of control. For example, the RAM 103 stores a region division unit, region similarity comparison unit, search result comprehensive determination unit, and the like as programs for implementing the image search method of the present invention. Also, the RAM 103 is used as an image memory for temporarily storing a document image upon inputting the document image.

Reference numeral 104 denotes a keyboard; and 105, a mouse. The keyboard 104 and mouse 105 provide various input operation environments such as designation of a processing mode by the user, and the like.

Reference numeral 106 denotes an external storage device which comprises a hard disk, floppy disk, CD-ROM, or the like, and is also used as a storage space of document images in addition to an image management DB and image region management DB to be described later. Reference numeral 107 denotes a display device used to display an image search result and the like.

Reference numeral 108 denotes a network interface used to make communications with devices on a network. Reference numeral 109 denotes an interface; and 110, an image input device such as an image scanner, digital camera, or the like. Reference numeral 111 denotes a bus which interconnects the aforementioned components.

2. Functional Block Arrangement of Image Search Apparatus

Figure 2:
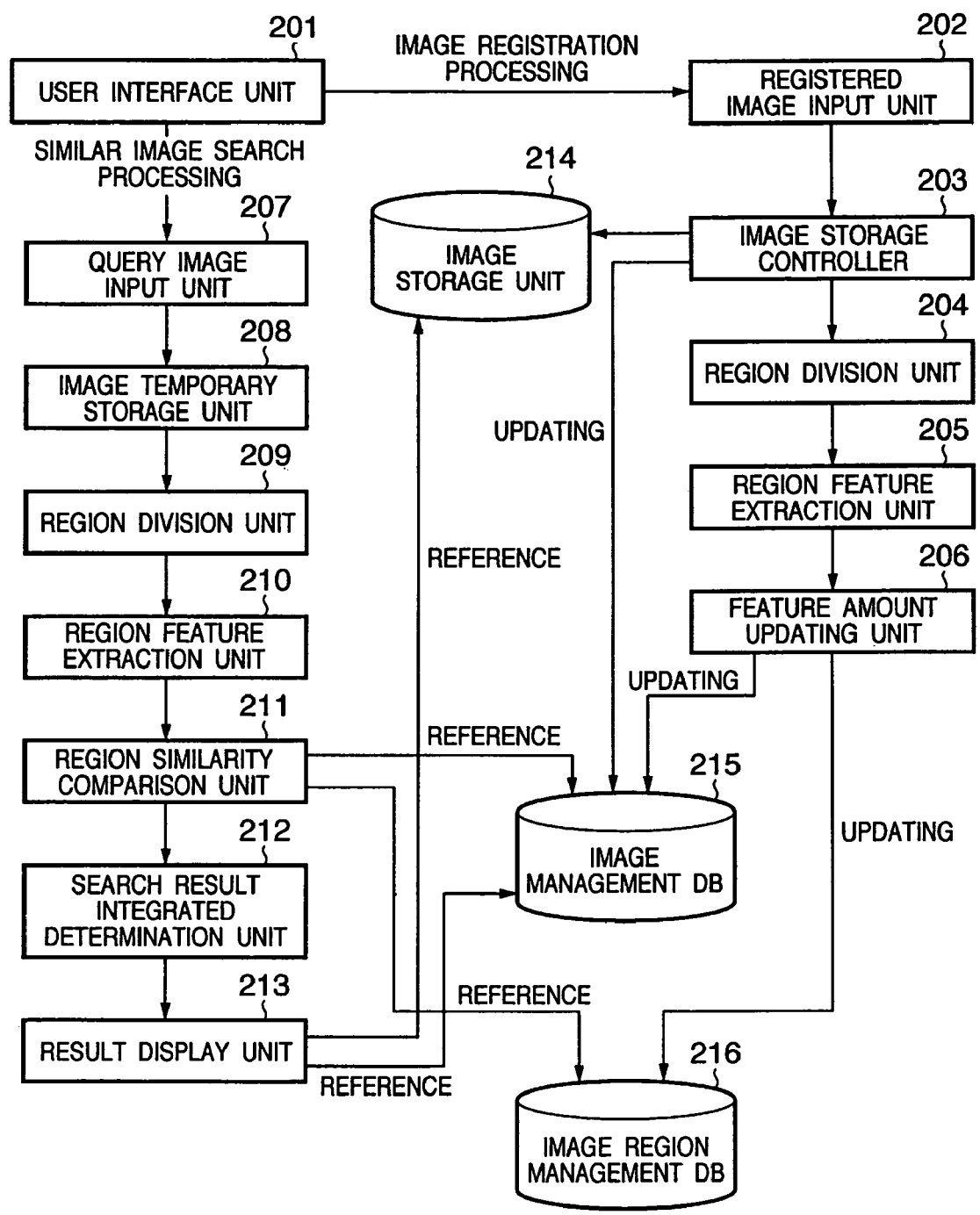
FIG. 2 is a block diagram showing the arrangement of an image registration/similar image search function of the image search apparatus according to the first embodiment of the present invention.

FIG. 2 is a block diagram showing the arrangement of an image registration/similar image search function of the image search apparatus 100. Referring to FIG. 2, reference numeral 201 denotes a user interface unit, which detects various operation inputs from the user using the display device 107, keyboard 104, and mouse 105, and determines if either image registration processing or similar image search processing is to be executed.

Reference numeral 202 denotes a registered image input unit which inputs a document image to be registered (registered document image) via the image input device 110. Reference numeral 203 denotes an image storage controller which temporarily stores a registered document image input by the registered image input unit 202 in an image memory assured on the RAM 103, and also stores that registered document image on the external storage device 106 which serves as an image storage unit 214. Furthermore, the image storage controller 203 stores the storage address of the registered document image on the external storage device 106 which also serves as an image management DB 215.

Reference numeral 204 denotes a region division unit which divides the registered document image temporarily stored in the image memory on the RAM 103 into a plurality of partial regions. Reference numeral 205 denotes a region feature extraction unit which extracts feature amounts of the partial regions divided by the region division unit 204. Reference numeral 206 denotes a feature amount updating unit which stores the feature amounts of the respective partial regions extracted by the region feature extraction unit 205 in the external storage device 106 which serves as the image management DB 215 and an image region management DB 216.

Reference numeral 207 denotes an query image input unit which inputs a document image as an query image for search (original document image for search) via the image input device 110. Reference numeral 208 denotes an image temporary storage unit which temporarily stores the original document image for search input by the query image input unit 207 in the image memory on the RAM 103. Reference numeral 209 denotes a region division unit which divides the original document image for search temporarily stored in the image memory on the RAM 103 into a plurality of partial regions. Reference numeral 210 denotes a region feature extraction unit which extracts feature amounts of the partial regions divided by the region division unit 209.

Reference numeral 211 denotes a region similarity comparison unit which compares the feature amounts of the partial regions of the original document image for search with those extracted from the partial regions of the registered document images stored in the image management DB 215 and image region management DB 216 in the external storage device 106, and obtains search results about the partial regions of the registered document images which are similar to the partial regions of the original document image for search.

Reference numeral 212 denotes a search result comprehensive determination unit which makes final determination of similar registered document images using the search results about the partial regions of the registered document images obtained by the region similarity comparison unit 211. Reference numeral 213 denotes a search result display unit which displays the search results finally determined by the search result comprehensive determination unit 212 on the display device 107. The image registration processing and similar image search processing in the image search apparatus 100 according to this embodiment will be described in more detail below.

3. Image Registration Processing

3.1 Flow of Overall Image Registration Processing

Data to be stored in the respective DBs (image management DB 215 and image region management DB 216) by the image registration processing will be described first.

A plurality of partial regions (image and text regions) are extracted from an image to be registered as a registered document image by the image registration processing, the aspect ratio, the size relative to the registered document image, and the center of gravity position coordinates are obtained as "feature amounts associated with each partial region", and color feature information is obtained as a "feature amount associated with the contents of each partial region". These feature amounts are stored in the image management DB 215 and image region management DB 216 in correspondence with the registered document image. Practical examples of data to be stored in the DBs, i.e., the image management DB 215 and image region management DB 216 are as shown in FIGS. 10 to 12. FIG. 10 shows a practical example of data to be stored in the image management DB 215, and FIGS. 11 and 12 show a practical example of data to be stored in the image region management DB 216.

Figure 3:
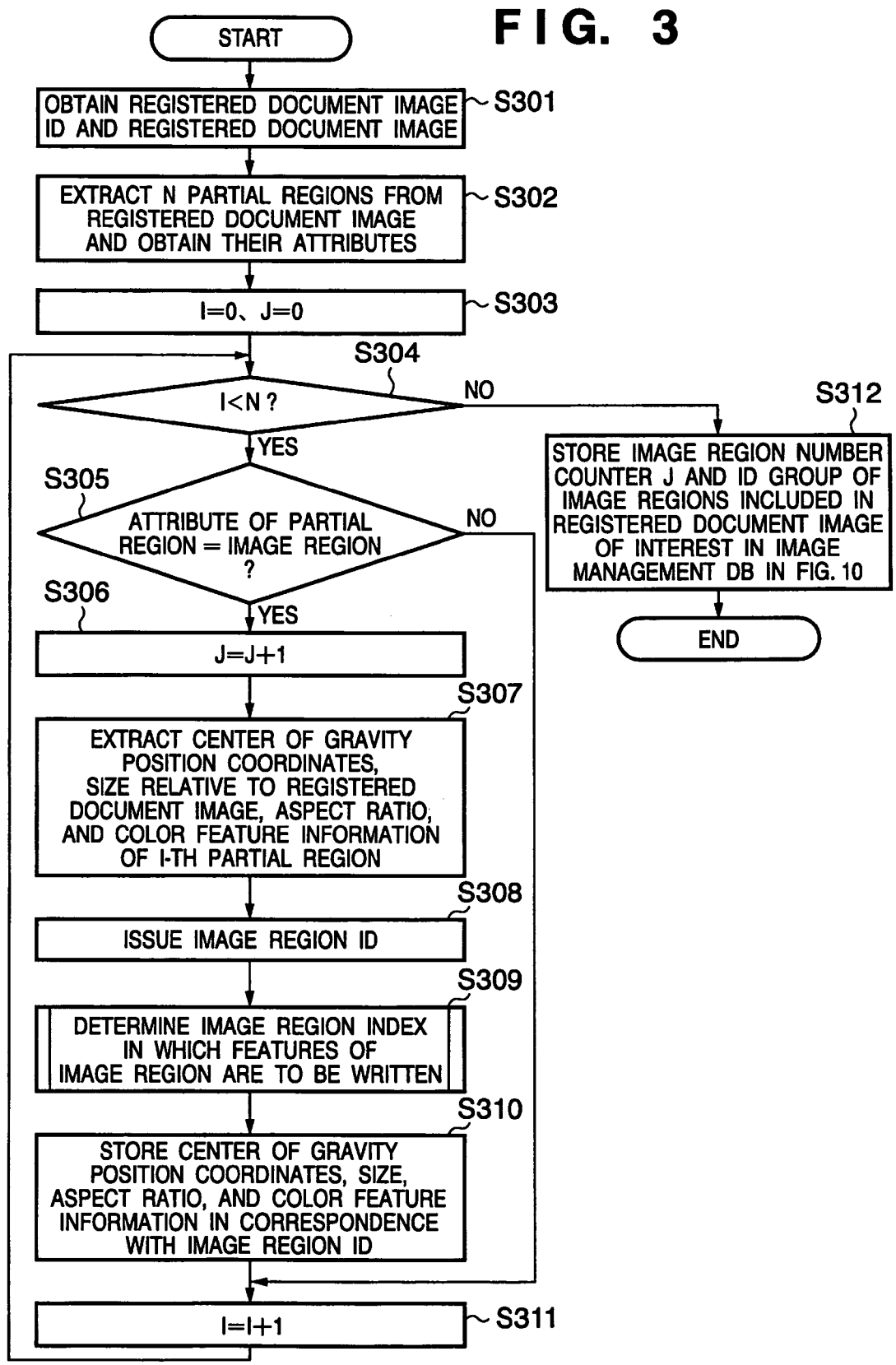
FIG. 3 is a flowchart showing the flow of image registration processing.

The flow of processes until respective DBs are generated by the image registration processing will be described below using FIG. 3. FIG. 3 is a flowchart showing the flow of the image registration processing. In step S301, the registered image input unit 202 inputs a registered document image via the image input device 110. Furthermore, the image storage controller 203 issues an ID of the input registered document image, stores the ID of the registered document image in a registered document image ID field (1001 in FIG. 10) in the image management DB 215, stores the storage location of the registered image in a full-path file name field (1002 in FIG. 10), and then stores the registered document image in the image storage unit 214 as a file.

Figure 4:
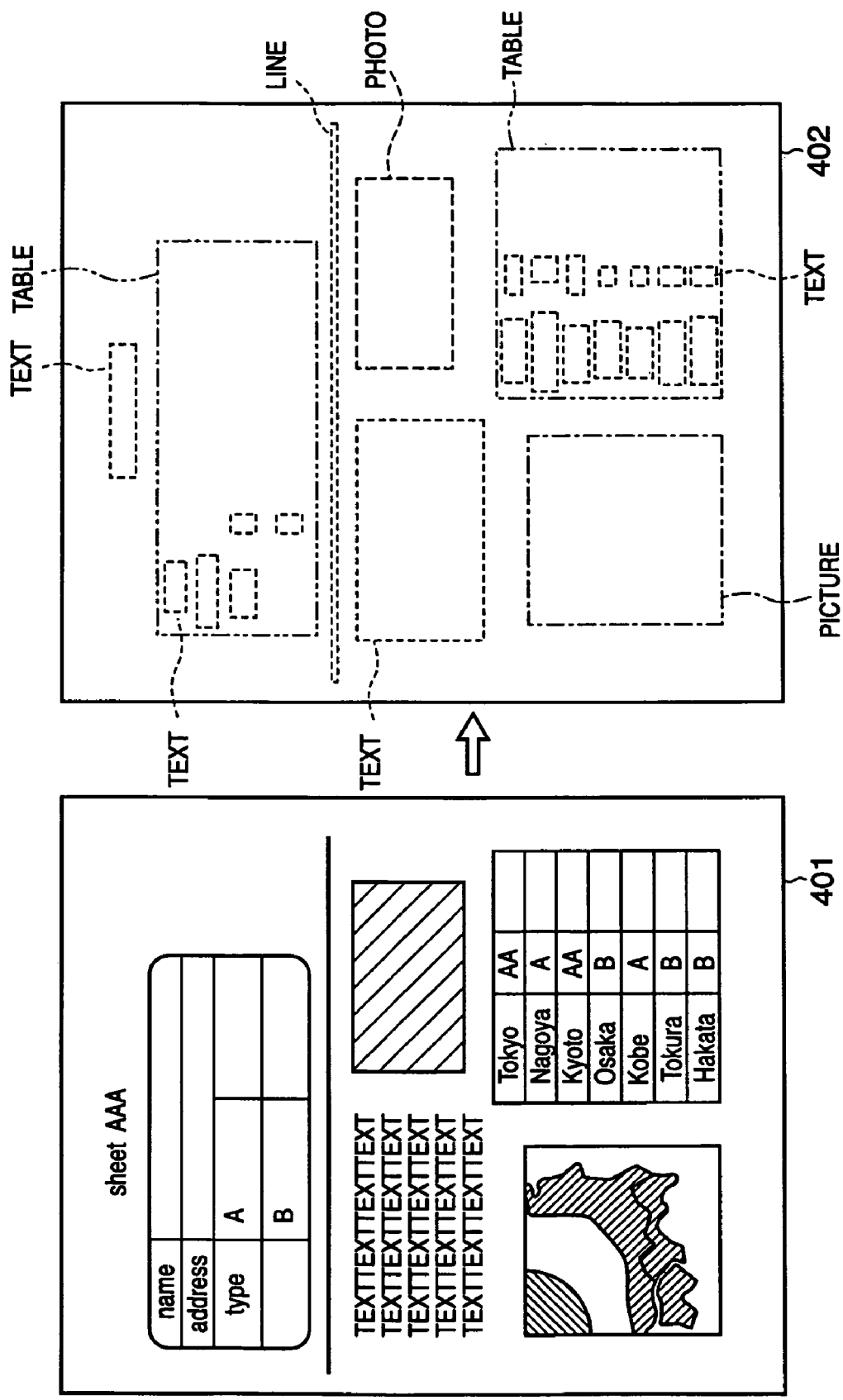
FIG. 4 shows an example of a registered document image.

In step S302, the region division unit 204 extracts partial regions and their attributes from the registered document image, and obtains the number (N) of extracted partial regions. For example, when a registered document image 401 shown in FIG. 4 is input, extraction of partial regions and their attributes is done by recognizing the registered document image 401 as partial regions for respective objects, determining attributes (text (TEXT)/picture (PICTURE)/photo (PHOTO)/line (LINE)/table (TABLE), and the like) of respective partial regions (see 402 in FIG. 4), and extracting partial regions having different attributes.

In step S303, the region feature extraction unit 205 resets a partial region number counter I and image region number counter J to zero. Furthermore, it is checked in step S304 if the partial region number counter I is smaller than the number N of partial regions. If it is determined in step S304 that the partial region number counter I is smaller than the number N of partial regions, the flow advances to processes in step S305 and subsequent steps. In this manner, the processes in step S305 and subsequent steps are repeated until the partial region number counter I becomes equal to the number N of partial regions and all partial regions are processed.

If the partial region number counter I becomes equal to the number N of partial regions and all partial regions are processed, the flow advances to step S312. In step S312, the feature amount updating unit 206 stores the value of the image region number counter J in an image region number field 1003 in the image management DB 215, and stores an image region ID group included in the registered document image in an image region ID field 1004, thus ending the processing.

On the other hand, if it is determined in step S304 that I<N and partial regions to be processed still remain, the region feature extraction unit 205 checks in step S305 if the attribute of the I-th partial region indicates an image region. If it is determined in step S305 that the attribute of the I-th partial image indicates an image region, the image region number counter J is incremented by 1 in step S306, and the flow advances to step S307.

In step S307, the center of gravity position coordinates, the size relative to the registered document image, and the aspect ratio as "feature amounts associated with the I-th partial region", and color feature information as "information associated with the contents of that partial region" are extracted.

In step S308, the feature amount updating unit 206 issues a unique image region ID. Furthermore, in step S309, an index (image region index) that reflects the nature of the image region of the registered document image is determined. In this embodiment, assume that the image region index is a combination of:

document image shape (vertically elongated, horizontally elongated, square) (1101);
the number of image regions included in the document image (1102); and
a center of gravity block of the image region (1103).

Furthermore, in step S310 the feature amount updating unit 206 stores the center of gravity position coordinates (1203), the size relative to the registered document image (1202), the aspect ratio (1201), and color feature information (1204) in the image region management DB 216 in correspondence with the image region ID (1205). In step S311, the partial region number counter I is incremented by 1, and the flow returns to step S304.

On the other hand, if it is determined in step S305 that the attribute of the I-th partial region does not indicate an image region, the flow jumps to step S311 to increment the partial region number counter I by 1, and the flow returns to step S304.

3.2 Details of Partial Region Extraction Processing (Step S302)

Details of the partial region extraction processing in step S302 in FIG. 3 will be described below. Upon extracting partial regions, an input registered document image is binarized into a monochrome image, and the binary image undergoes contour tracing to extract partial regions of pixels bounded by black pixel contours. As for a partial region of black pixels with a large area, white pixels included in that region undergo contour tracing to extract a partial region of white pixels. Furthermore, a partial region of black pixels is recursively extracted from the interior of the partial region of white pixels having a predetermined area or more.

The partial regions of black pixels obtained in this way are categorized into regions having different attributes based on their sizes and shapes. For example, a partial region in which each pixel group having an aspect ratio closer to 1 and a size falling within a predetermined range is determined as that corresponding to a character, and neighboring characters regularly line up and can be grouped is determined as a text region, a low-profile partial region is determined as a line region, a partial region which has a predetermined size or more and is occupied by black pixel groups that include rectangular white pixel groups, which regularly line up, is determined as a table region, a partial region in which pixels with indeterminate forms are distributed is determined as a photo region, a partial region with an arbitrary shape other than those described above is determined as a picture region, and so forth. Note that the partial region extraction processing (step S302) handles a photo region, in which pixels with indeterminate forms are distributed and which has a rectangular shape, as an image region.

As a result of execution of the partial region extraction processing (step S302), coordinates which express respective partial regions and attributes (image or text region) of these partial regions are output as the extraction results.

3.3 Details of Image Region Index Determination Processing (Step S309)

Figure 7:
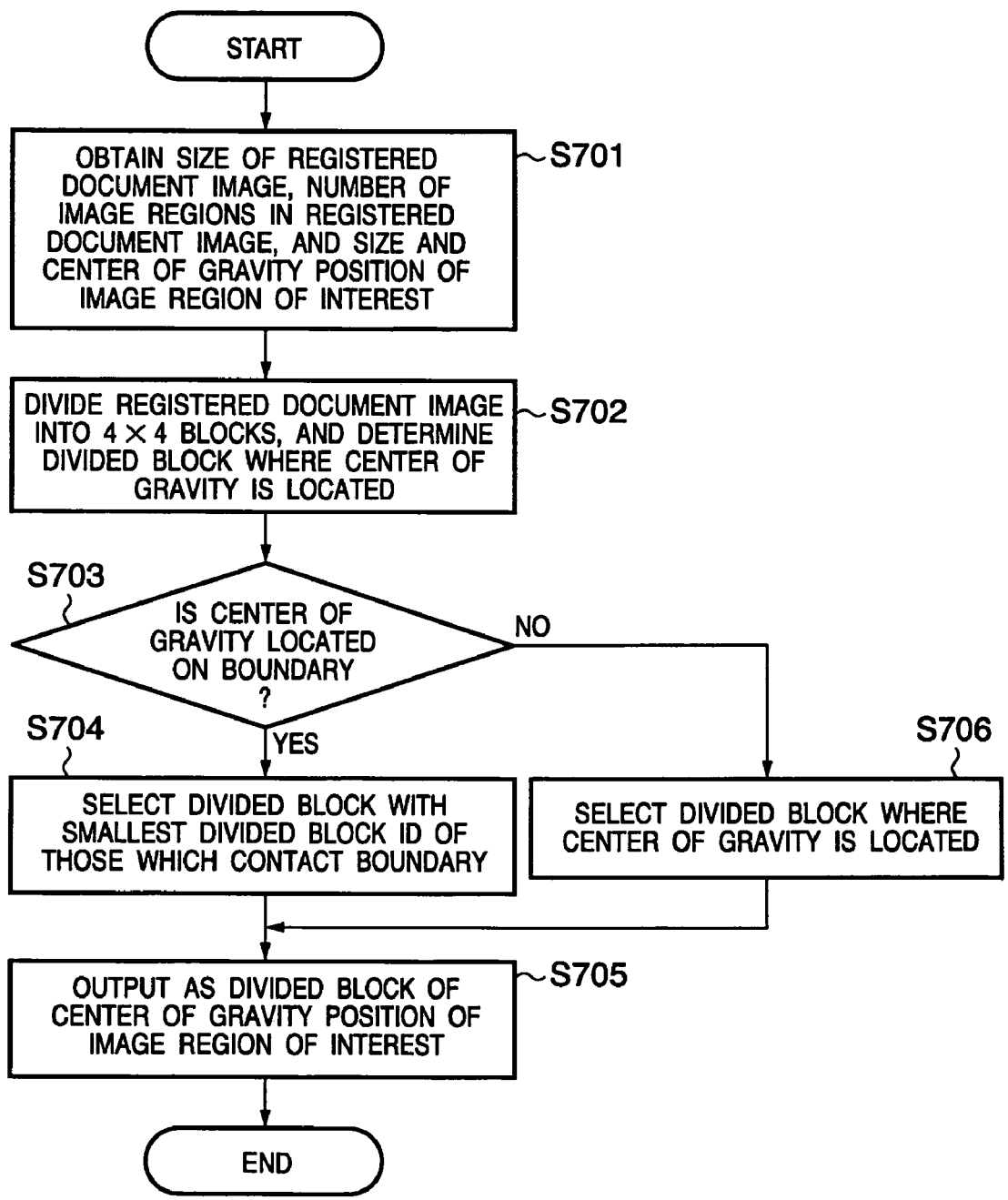
FIG. 7 is a flowchart showing the flow of processing for calculating a center of gravity block of an image region in image region index determination processing.

Details of processing for obtaining a center of gravity block of the image region (1103) of the image region index determination processing in step S309 in FIG. 3 will be described below. FIG. 7 is a flowchart showing the flow of processing for obtaining the center of gravity block of the image region (1103) of the image region index determination processing.

In step S701, the size of the registered document image, the number of image regions in the registered document image, and the size and center of gravity position coordinates of an image region of interest (I-th image region) are respectively acquired. In step S702, the registered document image is divided into a plurality of blocks (e.g., 4×4=16 blocks), as shown in FIG. 8, and a block where the center of gravity of the image region exists is obtained (numerical values described in respective divided blocks in FIG. 8 indicate IDs of the divided blocks).

It is checked in step S703 if the center of gravity of the image region is located on a boundary of the divided blocks. If it is determined that the center of gravity of the image region is not located on the boundary of the divided blocks, the flow advances to step S706 to select a divided block where the center of gravity is located. On the other hand, if it is determined that the center of gravity of the image region is located on the boundary of the divided blocks, a divided block with a smaller divided block ID of those which neighbor the boundary is selected in step S704.

In step S705, the ID of the divided block selected in step S704 or S706 is output as a result.

Figure 8:
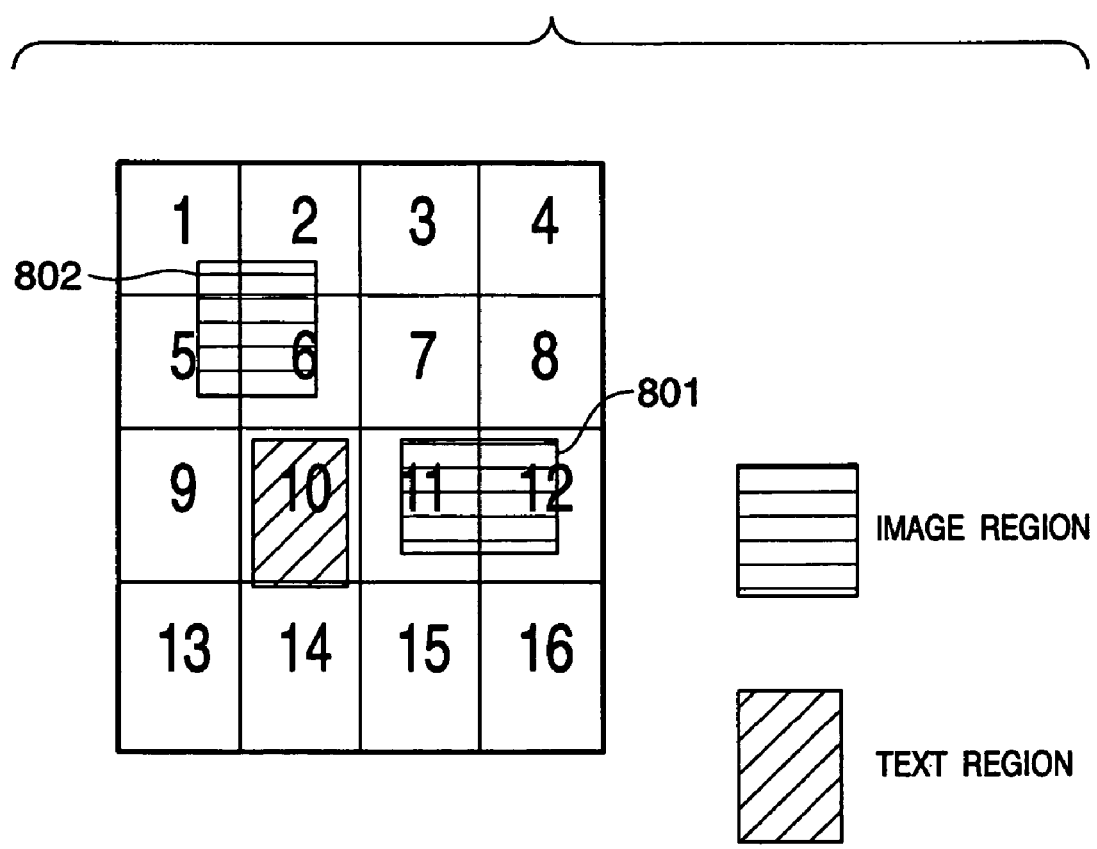
FIG. 8 is a view showing the center of gravity position of an image region in a registered document image divided into blocks.

FIG. 8 shows an example in which the registered document image has two image regions (801, 802). The center of gravity of the lower right image region 801 is located on the boundary between divided block IDs 11 and 12. Therefore, the divided block ID 11 is output as a result. On the other hand, the center of gravity of the upper left image region 802 is located on the divided block ID 6. Therefore, the divided block ID 6 is output as a result.

FIG. 9 shows the calculation results of the distributions of the center of gravity positions of image regions in 10,000 vertically elongated business document images for reference. FIG. 9 takes statistics for the numbers of image regions included in the business document images, and indicate the locations of center of gravity positions in 4×4 blocks for respective numbers of image regions. For example, reference mark A in FIG. 9 takes statistics of the distributions of the center of gravity positions for 2,972 document images each having the number of image regions=1 included in the business document images (that is, the number of image regions equals 2,972). As shown in reference mark A in FIG. 9, of the 2,972 image regions, 61 image regions have their center of gravity positions on an upper left block (divided block ID=1). Likewise, the numbers of image regions included in document images are quantized to 11 classes, i.e., 1, 2, 3, 4, 5, 6, 7, 8, 9, 10, and 11 or more, and statistics are taken.

As can be seen from FIG. 9, image region indices (each including the document image shape, the number of image regions, and center of gravity blocks of the image regions) generated by the image region index determination processing (step S309) are distributed to relatively unbiased sizes, and are satisfactorily used as those upon narrowing down candidates.

3.4 Details of Storage Processing (Step S310)

Details of the storage processing in step S310 in FIG. 3 will be explained below. FIG. 11 shows the configuration of data stored in the image region management DB 216. One record includes a document shape (1101), the number of image regions per document image (1102), the center of gravity blocks of the image regions (1103), an image region ID list (1104), and a feature amount list of the image regions (1105). Using, as a key, a combination of the document shape (1101), the number of image regions per document image (1102), and the center of gravity blocks of the image regions (1103), the image region ID list (1104) and the feature amount list of the image regions (1105) are obtained.

The feature amount list of the image regions (1105) includes sequence data in which feature amounts of each image region are arranged in the order of image region IDs in the image region ID list (1104), and the aspect ratio (1201), size (1202), center of gravity position coordinates (1203), and color feature information (1204) are stored in correspondence with each image region ID included in the feature amount list of the image regions, as shown in FIG. 12.

The center of gravity position coordinates (1203) are defined as relative ($0 \leq X \leq 1$) position coordinates when the vertical and horizontal sizes of the registered document image are assumed to be 1. The size of the image region (1202) is defined as an area of the image region when the area of the registered document image is assumed to be 1. The aspect ratio (1201) is defined as a ratio of the number of vertical pixels to the number of horizontal pixels of the image region.

Figure 5:
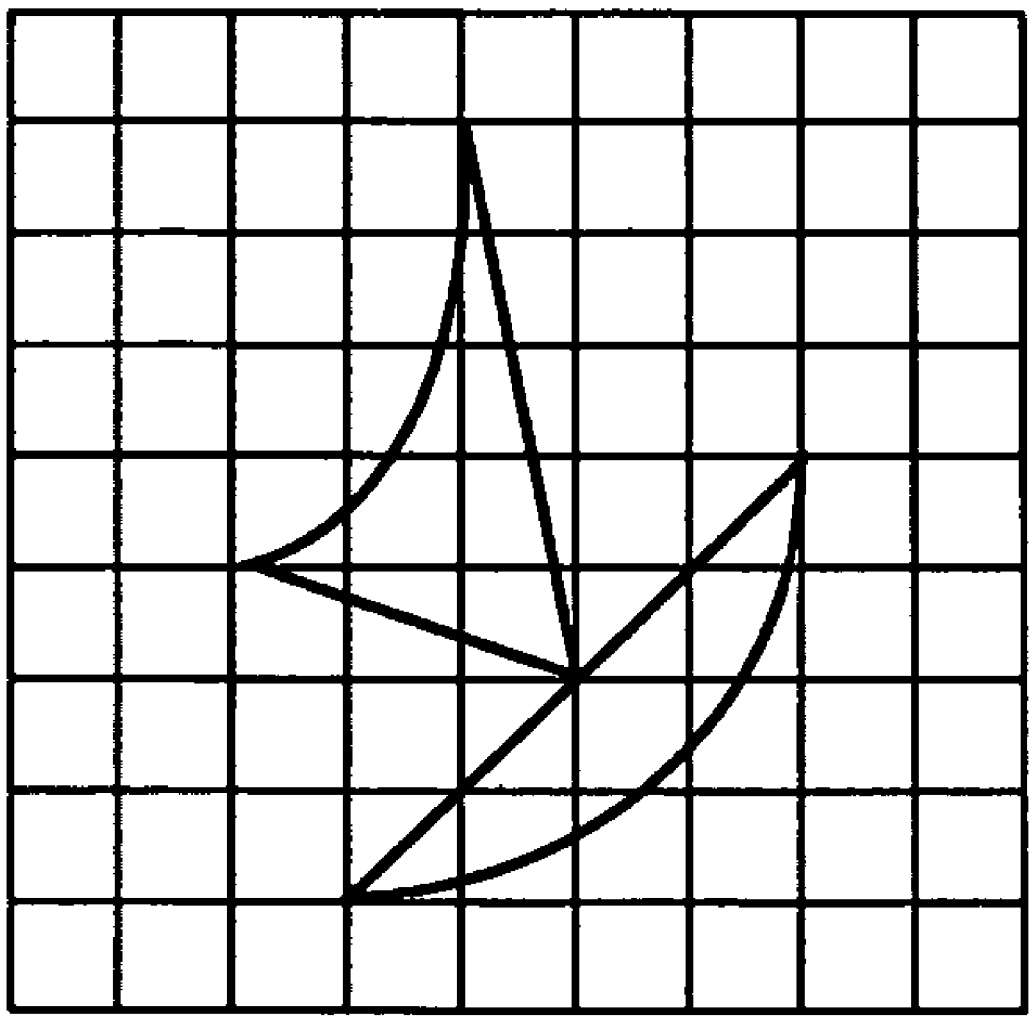
FIG. 5 is a view for explaining color feature information.
Figure 6:
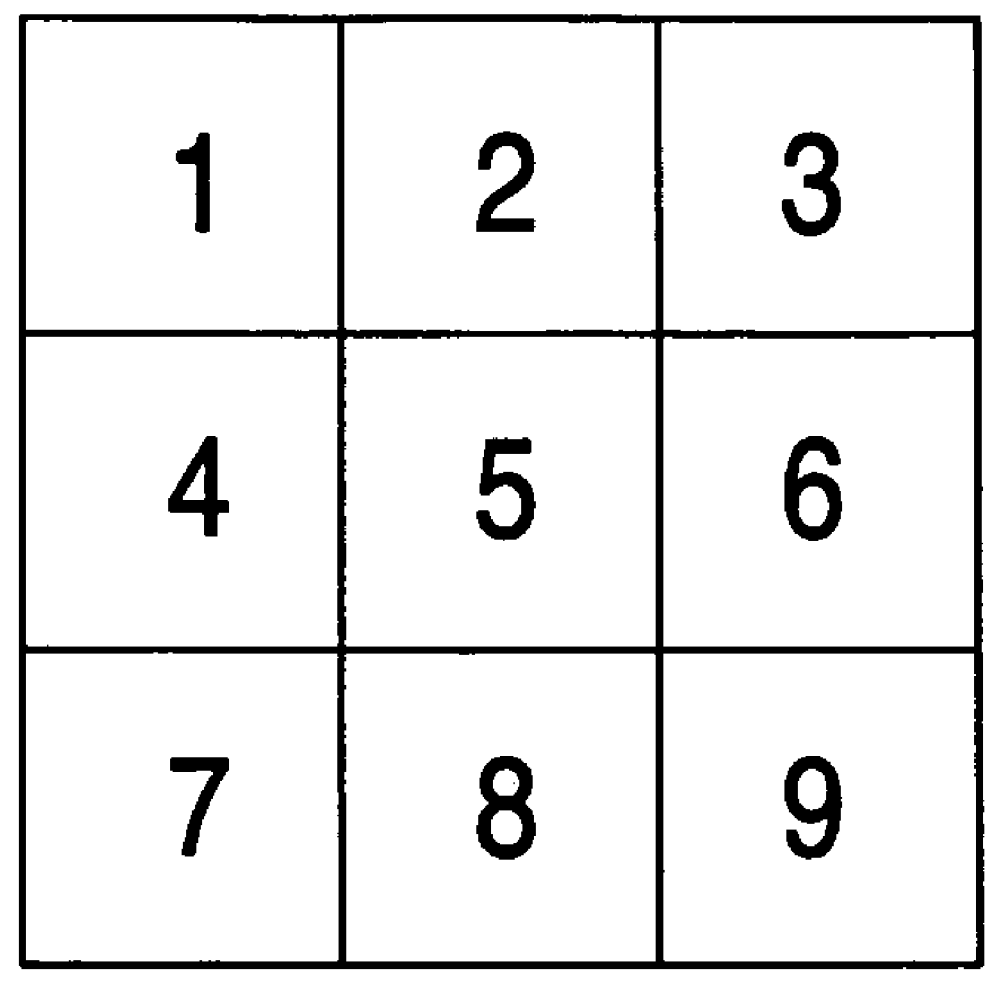

The color feature information (1204) is obtained by dividing the registered document image into blocks in the vertical and horizontal directions as in an example of FIG. 5, calculating the average values of RGB channels of pixels which belong to each divided block, and holding them in a matrix in the scan order, as shown in FIG. 6. FIG. 6 shows the scan order of 9 (=3×3) blocks for the sake of illustrative convenience.

4. Similar Image Search Processing

4.1 Flow of Overall Similar Image Search Processing

Figure 13B:
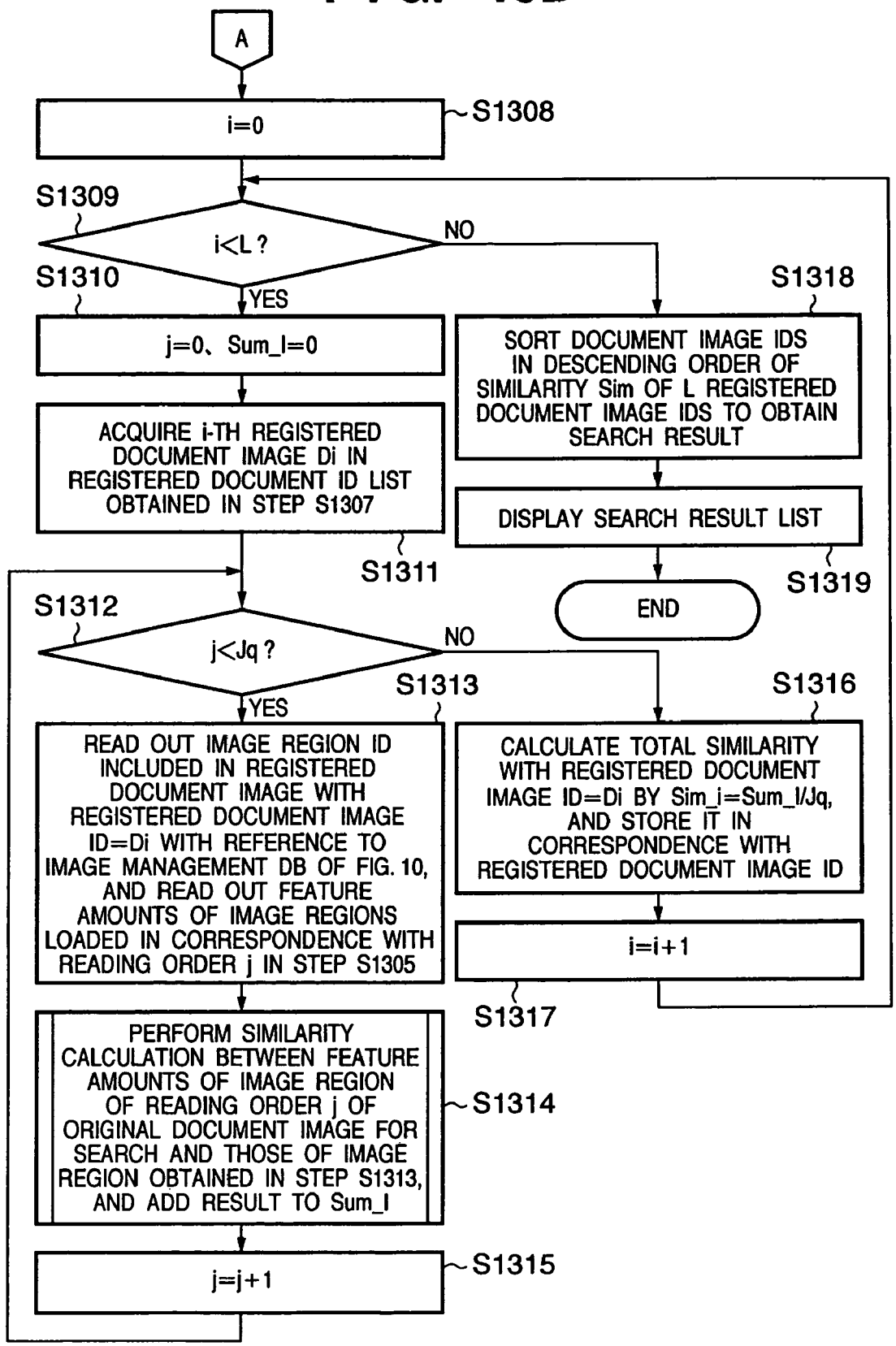
FIG. 13B is a flowchart showing the flow of similar image search processing (feature amount detailed comparison and similarity calculation processing)

The flow of the similar image search processing will be described below. FIGS. 13A and 13B are flowcharts showing the flow of the similar image search processing. Especially, steps S1301 to S1307 in FIG. 13A show the flow of pre-search processing for narrowing down registered document images on the basis of an original document image for search, and high-speed search is implemented with a small memory size by exploiting a feature amount management function as a characteristic feature of the present invention.

On the other hand, steps S1308 to S1324 in FIG. 13B show the flow of processing for performing detailed comparison of feature amounts and calculating similarities for registered document images narrowed down by the pre-search processing.

In step S1301, an original document image for search is input via the image input device 110 under the control of the query image input unit 207, and is temporarily stored in the image memory on the RAM 103 by the image temporary storage unit 208.

In step S1302, the region division unit 209 divides the original document image for search into a plurality of partial regions (text and image regions), determines the orders of a sequence of partial regions in correspondence with image and text regions on the basis of predetermined rules, and manages them using numbers (to assign reading orders). This is to manage information corresponding to respective partial regions of the original document image for search.

In step S1303, the region feature extraction unit 210 extracts the number N of partial regions, the number Jq of image regions, and the center of gravity position coordinates, sizes, aspect ratios, and color feature information of image regions included in the original document image for search, and temporarily stores them in a work area on the RAM 103.

The processes in steps S1302 and S1303 are basically the same as those in the image registration processing in FIG. 3, except that the analysis results of the original document image for search are temporarily stored in the work area on the RAM 103 in place of being registered in the DBs in FIGS. 10, 11, and 12. Hence, a detailed description of these processes will be omitted.

In step S1304, the region similarity comparison unit 211 determines a divided block near the center of gravity of each image region in the original document image for search. Based on the shape determination result of the original document image for search and the number Jq of extracted image regions in step S1303, and the determined divided block, the image region indices (FIG. 11) of the image region management DB 216 are referred to. If matched IDs are found, the corresponding image region IDs and feature amounts (aspect ratio, size, and center of gravity position coordinates) of the image regions are loaded onto the memory of the RAM 103 in correspondence with the reading order of image regions of the original document image for search.

In step S1305, the feature amounts (aspect ratio, size, and center of gravity position coordinates) of the image regions loaded onto the memory in correspondence with the reading order are compared with the center of gravity position coordinates size, and aspect ratio of each image region of the original document image for search, thus narrowing down image regions which fall within an allowable range. The narrowed-down image region IDs are stored in correspondence with the reading order of image regions included in the original document image for search. This processing is repeated for all image regions of the original document image for search.

In step S1306, the image region IDs narrowed down in step S1305 are converted into registered document image ID with reference to the registered document image ID field 1001 in FIG. 10, and the registered document image ID is newly stored. This processing is repeated for all image regions.

In step S1307, the registered document image IDs obtained in step S1306 are logically ANDed to narrow down registered document images having image regions corresponding to all the image regions of the original document image for search, and the registered document image IDs (the number L of registered document image IDs) are stored as a new registered document image ID list. The pre-search processing in the similar image search processing has been explained.

The feature amount detailed comparison and similarity calculation processing will be described below using FIG. 13B. In step S1308, a processed pre-search data counter i is set to be zero. In step S1309, the processed pre-search data counter i is compared with the number L of registered document image IDs obtained as a result of the pre-search processing to check if the pre-search data counter i is smaller than the number L. If it is determined in step S1309 that the pre-search data counter i is smaller than the number L, the flow advances to step S1310.

In step S1310, a processed image region counter j and image region accumulated similarity Sum_I are reset to zero. In step S1311, Di as the i-th registered document image ID of the registered document image ID list stored in step S1307 is acquired.

In steps S1312 to S1315, all the image regions of the original document image for search and those of the registered document image Di undergo similarity comparison to obtain the image region accumulated similarity Sum_I. The similarity comparison between image regions will be described in detail later.

In step S1312, the processed image region counter j is compared with the number Jq of image regions to check if image regions to be compared still remain. If it is determined that the processed image region counter j is smaller than the number Jq of image regions, i.e., if it is determined that image regions to be compared still remain, the flow advances to step S1313 to read out an image region ID to be compared included in the registered document image with the registered document image ID=Di with reference to data (FIG. 10) in the image management DB 215. The image region IDs corresponding to the reading order j read in step S1305 are searched for one which matches the readout image region ID, and feature amounts of that image region are read out.

Next, in step S1314 the feature amounts of the image region of the reading order J of the original document image for search, and those of the image region obtained in step S1313 undergo similarity calculations, and the result is added to the image region accumulated similarity Sum_I. In step S1315, the processed image region counter j is incremented.

The processes in steps S1312 to S1315 are repeated until it is determined in step S1312 that no image region to be compared remains. If it is determined that no image region to be compared remains, the flow advances to step S1316 to calculate, as a total similarity of the registered document image with the registered document image ID=Di:

$$Sim\_i = Sum\_I/Jq \qquad (1)$$

The total similarity is stored in correspondence with the registered document image ID.

In step S1317, the processed pre-search data counter i is incremented, and the flow returns to step S1309. If it is determined in step S1309 that the original document image for search is not compared with all registered document images narrowed down by the pre-search processing yet, the processes in steps S1310 to S1317 are repeated again.

On the other hand, if it is determined that the original document image for search is compared with all registered document images narrowed down by the pre-search processing, the flow advances to step S1318 to sort registered document image IDs in descending order of total similarity Sim_i corresponding to the L registered document IDs stored in step S1316, thus obtaining search results. In step S1319, retrieved registered document images are displayed as a search result list using thumbnail images, as shown in FIG. 18. Also, total similarities (scores) are displayed together.

4.2 Processing for Determining Divided Block that Neighbors Center of Gravity of Image Region (Step S1304)

The processing for determining a divided block that neighbors the center of gravity of an image region (step S1304) in the similar image search processing will be described in detail below. There are some image region center of gravity neighboring divided block determination methods.

As a simplest method, the divided block, which includes the center of gravity of each image region of the original document image for search, of those of the registered document image is obtained with reference to image region indices.

However, with this method, even when the registered document image is very similar to the original document image for search, if it is determined that the center of gravity position is located just on the block division boundary and is located in another block due to position errors between the document images, such document image is excluded from the search result (resulting in omission of search).

To avoid such problem, in this embodiment, all divided blocks which extend across the image regions of the original document image for search are selected as objects, and the image region having the center of gravity on one of these divided blocks is obtained with reference to the image region indices, thus minimizing omission of search. With this method, in an example of FIG. 14A, the divided block having the center of gravity is obtained from divided blocks 1, 2, 5, and 6. In an example of FIG. 14B, the divided block having the center of gravity is obtained from divided blocks 1, 2, 3, 5, 6, 7, 9, 10, and 11.

Figures 14A, 14B, 14C, 14D:
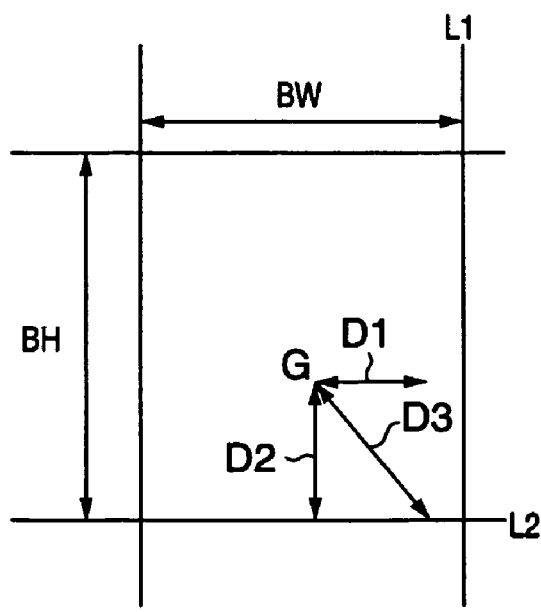
FIG. 14A shows an example of the center of gravity position of an image region in divided blocks.
FIG. 14B shows an example of the center of gravity position of an image region in divided blocks.
FIG. 14C shows an example of the center of gravity position of an image region in divided blocks.
FIG. 14D is a view for explaining a method of calculating the distance between a divided block where the center of gravity of a partial region exists, and a divided block which neighbors that divided block.

However, with this method, even divided blocks which have low reference worth such as divided block 1 in the example of FIG. 14A and divided blocks 1, 3, 9, and 11 in the example of FIG. 14B may be referred to. Hence, in this embodiment, of divided blocks which extend across the image regions of the original document image for search, those which have areas extending across the image regions at a predetermined ratio or higher to the divided block area are selected as objects, thus reducing noise to some extent.

When this ratio is selected to be 25% of the divided block, divided block 1 in the example of FIG. 14A and divided blocks 1, 3, 9, and 11 in the example of FIG. 14B will never be referred to. However, in an example of a very large region shown in FIG. 14C, all divided blocks are inevitably referred to.

Figure 15A:
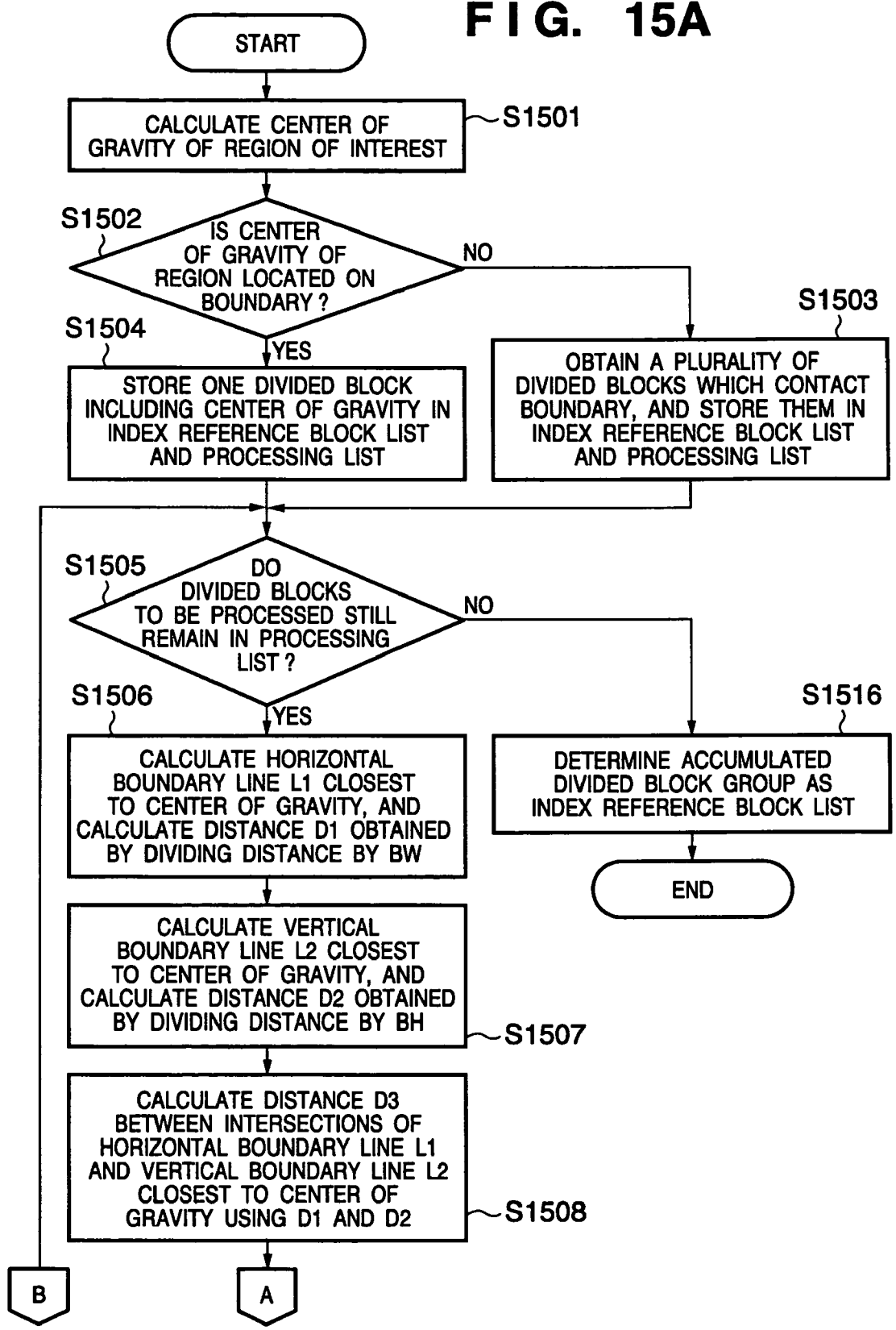
Figure 15B:
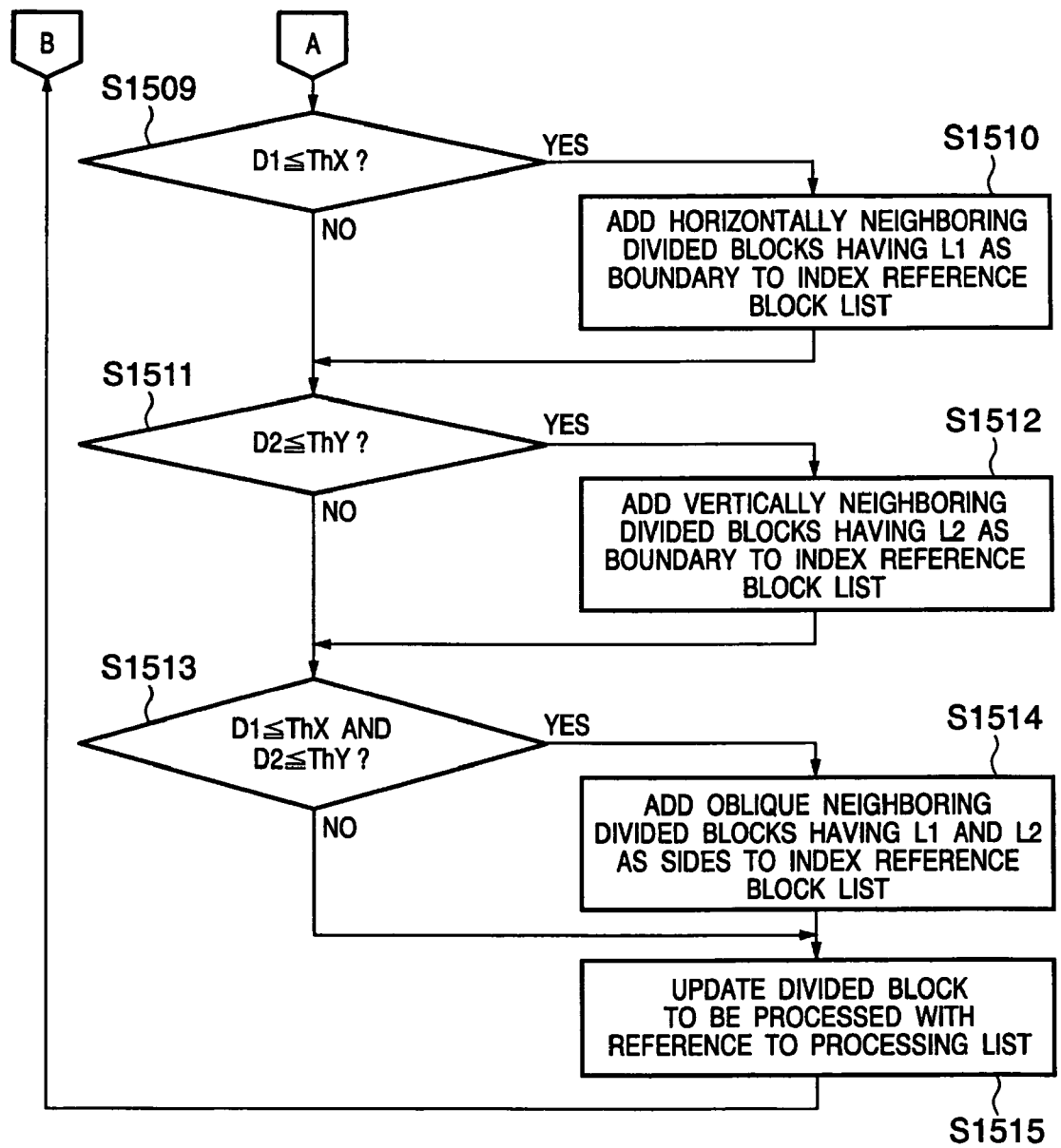

Hence, in this embodiment, furthermore, even when a partial region is large, as shown in FIG. 14C, only appropriate divided blocks can be referred to. An algorithm for determining divided blocks so as to refer to only appropriate divided blocks even when the partial region is large will be described below using the flowcharts of FIGS. 15A and 15B.

In step S1501, the center of gravity position of an image region of interest of the original document image for search is obtained. It is checked in step S1502 if the center of gravity position is located on a boundary between divided blocks. If it is determined in step S1502 that the center of gravity position is located on the boundary between divided blocks, the flow advances to step S1503 to store the divided blocks which neighbor the boundary in an index reference block list (a list that describes divided blocks determined as those which neighbor the image region center of gravity) and to store them in a processing list, thus preparing them as divided blocks to be processed by loop processing in step S1505 and subsequent steps later.

On the other hand, if it is determined in step S1502 that the center of gravity position of the divided region is not located on the boundary, a divided block where the center of gravity exists is stored in the index reference block list and also in the processing list, thus preparing it as a divided block to be processed by loop processing in step S1505 and subsequent steps later.

It is checked in step S1505 if divided blocks to be processed still remain in the processing list. If it is determined that divided blocks to be processed still remain, a horizontal boundary line L1 closest to the center of gravity position is obtained, and its distance is divided by a horizontal size BW of the divided block to obtain a normalized distance D1 in step S1506 (see FIG. 14D).

In step S1507, a vertical boundary line L2 closest to the center of gravity position, and its distance is divided by a vertical size BH of the divided block to obtain a normalized distance D2. Furthermore, in step S1508 a normalized distance D3 to an intersection between the horizontal boundary line L1 and vertical boundary line L2 closest to the center of gravity position is obtained based on D1 and D2 (see FIG. 14D).

It is checked in step S1509 if D1 is equal to or smaller than a first threshold ThX. If it is determined that D1 is equal to or smaller than the first threshold ThX, a divided block which neighbors in the horizontal direction to have L1 of the divided block where the center of gravity exists as a boundary is added to the index reference block list in step S1510. On the other hand, if it is determined that D1 is larger than the first threshold ThX, the addition processing to the index reference block list is skipped.

It is checked in step S1511 if D2 is equal to or smaller than a second threshold ThY. If it is determined that D2 is equal to or smaller than the second threshold ThY, a divided block which neighbors in the vertical direction to have L2 of the divided block where the center of gravity exists as a boundary is added to the index reference block list in step S1512. On the other hand, if it is determined that D2 is larger than the first threshold ThY, the addition processing to the index reference block list is skipped.

Furthermore, it is checked in step S1513 if D1 is equal to or smaller than the first threshold ThX and D2 is equal to or smaller than the second threshold ThY. If it is determined that D1 is equal to or smaller than the first threshold and D2 is equal to or smaller than the second threshold, the flow advances to step S1514. In step S1514, a divided block which is located at an obliquely symmetric position to a divided block where the center of gravity exists with respect to the intersection of L1 and L2 is further added to the index reference block list. On the other hand, if D1 is not equal to or smaller than the first threshold ThX or if D2 is not equal to or smaller than the second threshold ThY, the addition processing to the index reference block list is skipped. In the addition processing to the index reference block list, addition of redundant divided blocks is avoided.

In step S1515, the next divided block to be processed is determined from the processing list. If it is determined in step S1505 that divided blocks to be processed still remain, the processes in steps S1506 to S1515 are repeated to execute the addition processing to the index reference block list; if it is determined in step S1505 that no divided block to be processed remains, the accumulated index reference block list is determined in step S1516.

4.3 Details of Region Similarity Comparison Processing (Step S1314)

Details of the region similarity comparison processing (step S1314) in the similar image search processing will be described below.

Similarity comparison processing between the image region of interest of the original document image for search and that of the registered document image will be described first using the flowchart of FIG. 16.

In step S1601, the center of gravity position coordinates, size, aspect ratio, and color feature information of the image region of interest of the original document image for search are loaded. In step S1602, the center of gravity position coordinates, size, aspect ratio, and color feature information of the image region in the registered document image are loaded.

In step S1603, a difference between the aspect ratios is calculated. It is checked in step S1604 if the difference between the aspect ratios is equal to or smaller than a threshold. If it is determined in step S1604 that the difference between the aspect ratios is equal to or smaller than the threshold, the flow advances to step S1605. On the other hand, if it is determined that the difference between the aspect ratios is larger than the threshold, the flow advances to step S1609 to output a similarity=0% without any similarity comparison processing.

In step S1605, a difference between the center of gravity position coordinates is calculated. It is checked in step S1606 if the difference between the center of gravity position coordinates is equal to or smaller than a threshold. If it is determined in step S1606 that the difference between the center of gravity position coordinates is equal to or smaller than the threshold, the flow advances to step S1607. On the other hand, if it is determined that the difference between the center of gravity position coordinates is larger than the threshold, the flow advances to step S1609 to output a similarity=0% without any similarity comparison processing.

In step S1607, a difference between the sizes relative to the document images is calculated. It is checked in step S1608 if the difference between the sizes is equal to or smaller than a threshold. If it is determined in step S1608 that the difference between the sizes is equal to or smaller than the threshold, the flow advances to step S1610. On the other hand, if it is determined that the difference between the sizes is larger than the threshold, the flow advances to step S1609 to output a similarity=0% without any similarity comparison processing.

In step S1610, a demerit point ratio Rp from a similarity is set on the basis of the difference between the aspect ratios, that between the center of gravity position coordinates, and that between the sizes. Let Asp0 be the aspect ratio of the image region of interest of the original document image for search, (Gx0, Gy0) be the center of gravity position coordinates, and S0 be the size. Also, let Asp1 be the aspect ratio of the image region of the registered document image, (Gx1, Gy1) be the center of gravity position coordinates, and S1 be the size.

Furthermore, let D_ASP, D_G, and D_S be variances of the difference between the aspect ratios, that between the center of gravity position coordinates, and that between the sizes, which are recognized as correct answers using data sets that are recognized as correct answers by experiments, and $\alpha 1$, $\alpha 2$, and $\alpha 3$ be contribution coefficients of the difference between the aspect ratios, that between the center of gravity position coordinates, and that between the sizes to a similarity. Then, the demerit point ratio Rp is described by:

$$Rp = \alpha 1 * abs(Asp1-Asp0)/D\_ASP + \alpha 2 * sqrt((Gx1-Gx0)*(Gx1-Gx0)+(Gy1-Gy0)*(Gy1-Gy0))/D\_G + \alpha 3 * abs(S1-S0)/D\_S \quad (2)$$

In step S1611, the two pieces of color feature information are compared to obtain an accumulated distance between the image regions. The color feature information is obtained by dividing each image region of the document image into the same numbers of blocks in the vertical and horizontal directions as in an example of FIG. 5, calculating the average values of RGB channels of pixels which belong to each divided block, and holding them in a matrix in the scan order, as shown in FIG. 6. FIG. 6 shows the scan order of 9 (=3×3) blocks for the sake of illustrative convenience.

Upon comparison, the color feature information of the divided blocks corresponding to the rearranged matrix is processed in the following manner.

More specifically, let (R0, G0, B0) be the color average values of a block of interest of the image region of the original document image for search, (R1, G1, B1) be the color average values of a block of interest of the image region of the registered document image, and d be the similarity distance between the blocks of interest. Then, the similarity distance d can be expressed by:

$$d = sqrt((R0-R1)*(R0-R1)+(G0-G1)*(G0-G1)+(B0-B1)*(B0-B1)) \quad (3)$$

This distance is calculated for all corresponding blocks in the image region, and an accumulated distance D is calculated.

Figure 17:
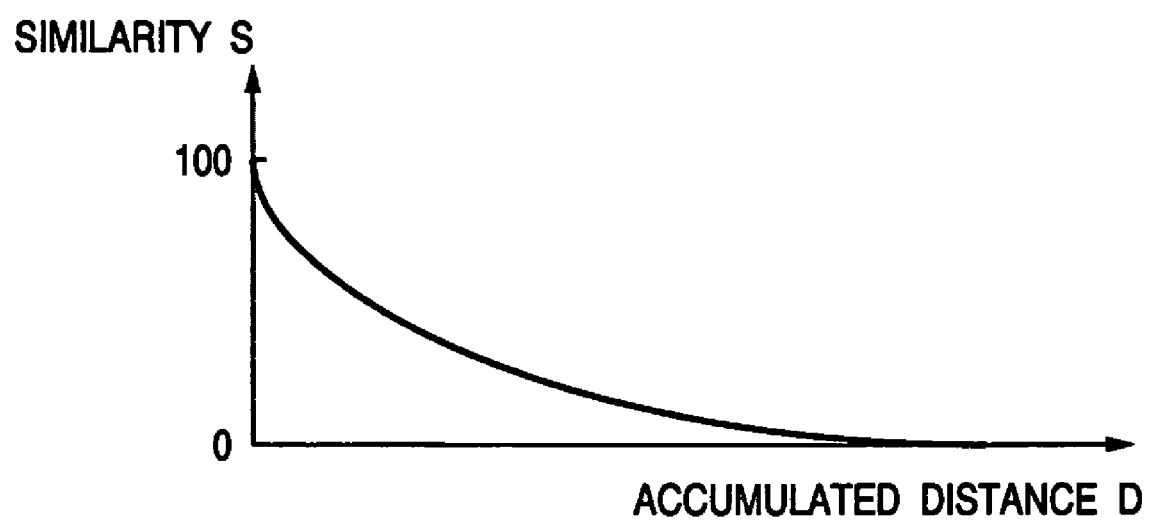
FIG. 17 is a graph showing an example of the characteristics of a function of converting a similarity distance into a similarity used in the image region comparison processing.

A similarity S can be obtained via an accumulated distance⇔similarity table which has nonlinear characteristics which yield a similarity=100 when the accumulated distance D=0 in the graph of FIG. 17.

In step S1612, the image region accumulated similarity Sum_I is calculated using the demerit point ratio obtained in step S1610 by:

$$Sum\_I = S * (1 - Rp) \quad (4)$$

As can be seen from the above description, the image search processing of the image search apparatus according to this embodiment uses the block ID of the center of gravity position of each image region as the narrowing-down conditions in addition to the number of image regions included in a document image. In this manner, since the block at the center of gravity position of each image region is used in addition to the number of image regions, narrowing-down processing can be done to the appropriate number.

The narrowing-down processing is configured to use the number of image regions and the block ID of the center of gravity position of each image region as an index, and to load only feature amounts of image regions that match the index onto a memory. Since only specific feature amounts stored and managed in a DB are loaded to calculate a similarity, the search speed is greatly higher than the conventional method which sequentially loads feature amounts stored on an HDD or individually and directly refers to feature amounts stored and managed using a DB. In addition, the memory consumption amount can be greatly reduced without any large search speed drop compared to the conventional method which stores all feature amounts on the memory.

In order to eliminate omission upon narrowing down allowable values are provided to block IDs of the center of gravity positions of image regions as the narrowing-down conditions, and candidates are further narrowed down under the condition that feature amounts (the center of gravity position coordinates, size, and aspect ratio of each image region) of image regions which match the narrowing-down conditions and are loaded onto the memory fall within the allowable range. In this manner, since narrowing-down processing is done in two steps, candidates can be further narrowed down to the appropriate number without any omission.

The image search processing of the image search apparatus according to this embodiment uses the center of gravity position coordinates, sizes, aspect ratio, and color feature information of image regions included in document images upon comparing feature amounts of the narrowed-down document images and calculating similarities.

In this way, since only specific feature amounts stored and managed in the DB are loaded upon calculating similarities, the memory consumption amount can be greatly reduced without any large search speed drop compared to the conventional method which stores all feature amounts on the memory.

Second Embodiment

The first embodiment has exemplified the similar image search processing based on image regions. However, the present invention is not particularly limited to such specific processing, and image search based on text regions may be conducted. In this case, the feature amounts of image regions used in the region similarity comparison processing are replaced by character strings in text regions, and the feature amount comparison processing of image regions are replaced by character string comparison processing of text regions. Upon executing the character string comparison processing of text regions, when a partial region of interest of the original document image for search is a text region, comparison is made with only the text regions of registered document images. In this case, text data (intra-region text information) obtained via OCR processing, an aspect ratio, a size relative to a document image, and center of gravity position coordinates are used. Details will be described hereinafter.

1. Hardware Arrangement of Image Search Apparatus

The hardware arrangement of the image search apparatus according to this embodiment is the same as that of the first embodiment, and a description thereof will be omitted.

2. Functional Block Arrangement of Image Search Apparatus

Figure 19:
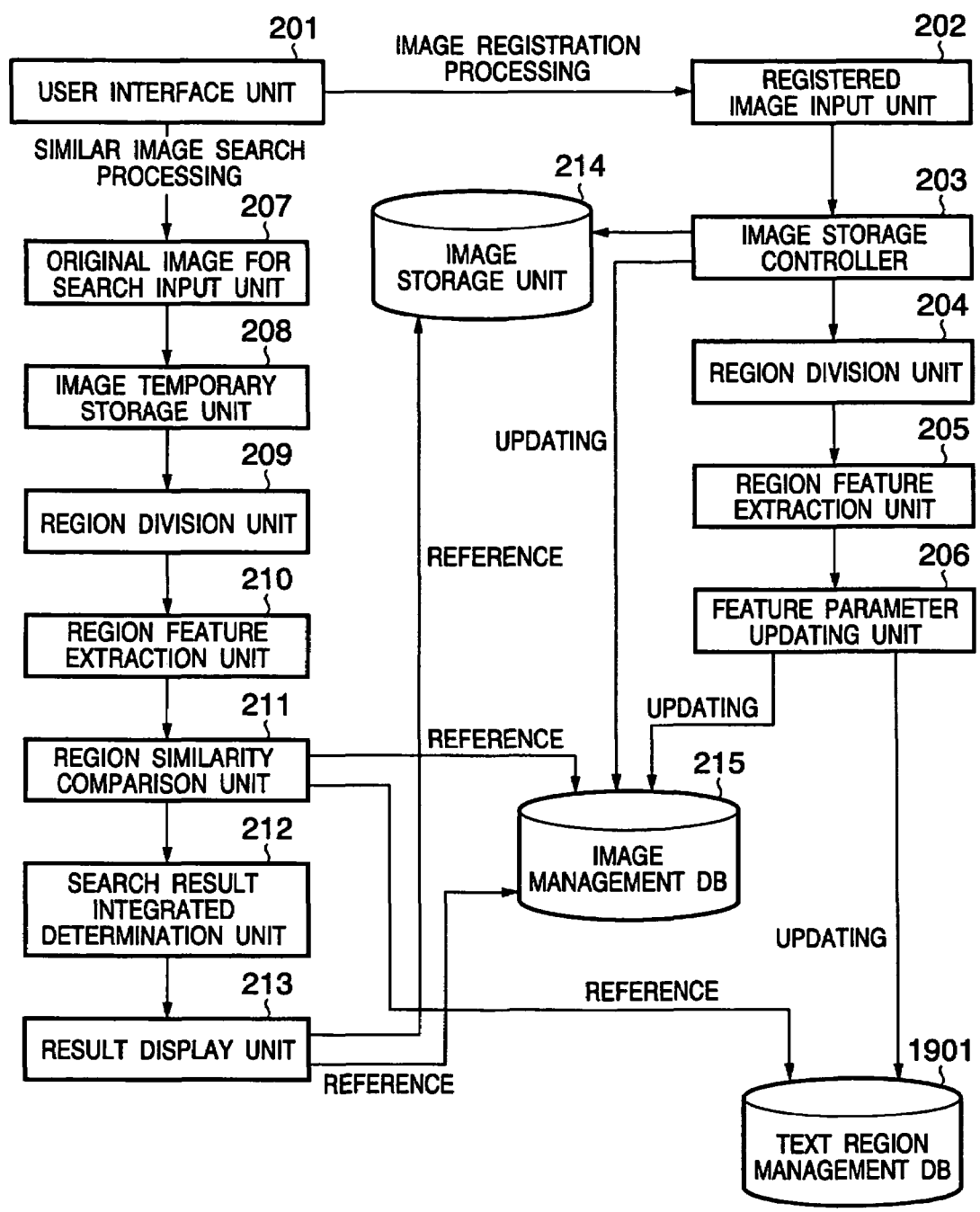
FIG. 19 is a block diagram showing the arrangement of an image registration/similar image search function of the image search apparatus according to the second embodiment of the present invention.

FIG. 19 is a block diagram showing the arrangement of an image registration/similar image search function of the image search apparatus according to this embodiment. Note that the same reference numerals in FIG. 19 denotes the same blocks as in the first embodiment, and a description thereof will be omitted. The difference from FIG. 2 is a text region management DB 1901 which is arranged in place of the image region management DB 216, and stores feature amounts of respective text regions by the feature amount updating unit 206.

3. Image Registration Processing 3.1 Flow of Overall Image Registration Processing Data to be stored in the respective DBs (image management DB 215 and text region management DB 1901) by the image registration processing will be described first.

A plurality of partial regions (image and text regions) are extracted from an image to be registered as a registered document image by the image registration processing, the aspect ratio, the size relative to the registered document image, and the center of gravity position coordinates are obtained as "feature amounts associated with each partial region", and intra-region text information is obtained as a "feature amount associated with the contents of each partial region". These feature amounts are stored in the image management DB 215 and text region management DB 1901 in correspondence with the registered document image. Practical examples of data to be stored in the DBs, i.e., the image management DB 215 and text region management DB 1901 are as shown in FIGS. 21 to 23. FIG. 21 shows a practical example of data stored in the image management DB 215, and FIGS. 22 and 23 show practical examples of data to be stored in the text region management DB 1901.

Figure 20:
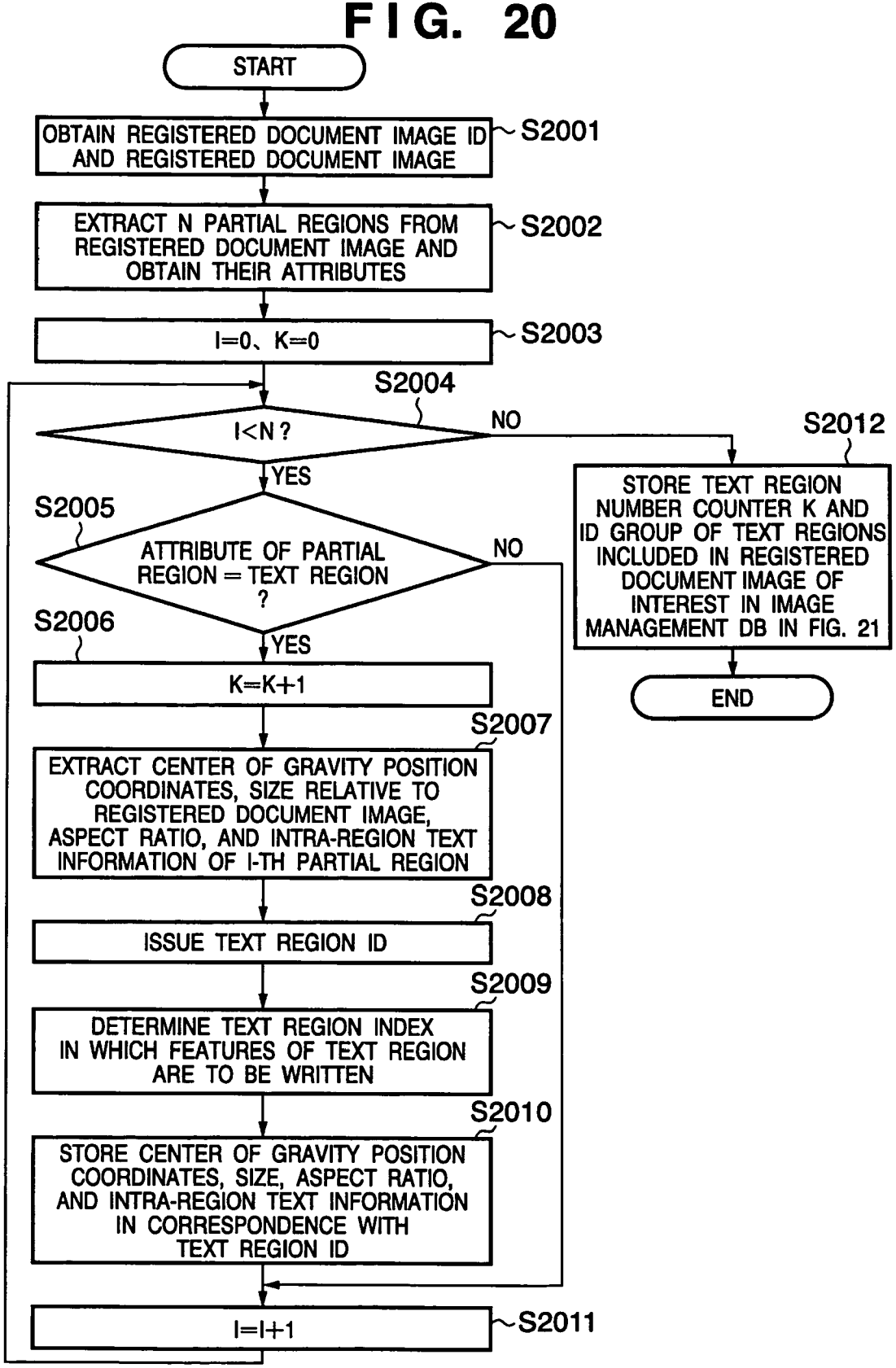
FIG. 20 is a flowchart showing the flow of image registration processing.

The flow of processes to generate respective DBs by the image registration processing will be described below using FIG. 20. FIG. 20 is a flowchart showing the flow of the image registration processing. In step S2001, the registered image input unit 202 inputs a registered document image via the image input device 110. Furthermore, the image storage controller 203 issues an ID of the input registered document image, stores the ID of the registered document image in a registered document image ID field (2101 in FIG. 21) in the image management DB 215, stores the storage location of the registered document image in a full-path file name field (2102 in FIG. 21), and then stores the registered document image in the image storage unit 214 as a file.

In step S2002, the region division unit 204 extracts partial regions and their attributes from the registered document image, and obtains the number (N) of extracted partial regions. Since extraction of the partial regions and their attributes has already been explained using FIG. 4 in the first embodiment, a detailed description thereof will be omitted.

In step S2003, the region feature extraction unit 205 resets a partial region number counter I and text region number counter K to zero. Furthermore, it is checked in step S2004 if the partial region number counter I is smaller than the number N of partial regions. If it is determined in step S2004 that the partial region number counter I is smaller than the number N of partial regions, the flow advances to processes in step S2005 and subsequent steps. In this manner, the processes in step S2005 and subsequent steps are repeated until the partial region number counter I becomes equal to the number N of partial regions and all partial regions are processed.

If the partial region number counter I becomes equal to the number N of partial regions and all partial regions are processed, the flow advances to step S2012. In step S2012, the feature amount updating unit 206 stores the value of the text region number counter K in a text region number field 2103 in the image management DB 215, and stores a text region ID group included in the registered document image in a text region ID field 2104, thus ending the processing.

On the other hand, if it is determined in step S2004 that I<N and partial regions to be processed still remain, the region feature extraction unit 205 checks in step S2005 if the attribute of the I-th partial region indicates a text region. If it is determined in step S2005 that the attribute of the I-th partial image indicates a text region, the text region number counter K is incremented by 1 in step S2006, and the flow advances to step S2007.

In step S2007, the center of gravity position coordinates, the size relative to the registered document image, and the aspect ratio as "feature amounts associated with the I-th partial region", and intra-region text information as "information associated with the contents of that partial region" are extracted.

In step S2008, the feature amount updating unit 206 issues a unique text region ID. Furthermore, in step S2009 an index (text region index) that reflects the nature of the text region of the registered document image is determined. In this embodiment, assume that the text region index is a combination of:

document image shape (vertically elongated, horizontally elongated, square) (2201);

the number of text regions included in the document image (2202); and a center of gravity block of the text region (2203).

Furthermore, in step S2010 the feature amount updating unit 206 stores the center of gravity position coordinates (2303), the size relative to the registered document image (2302), the aspect ratio (2301), and intra-region text information (2304) in the text region management DB 1901 in correspondence with the text region ID (2305). In step S2011, the partial region number counter I is incremented by 1, and the flow returns to step S2004.

On the other hand, if it is determined in step S2005 that the attribute of the I-th partial region does not indicate a text region, the flow jumps to step S2011 to increment the partial region number counter I by 1, and the flow returns to step S2004.

4. Similar Image Search Processing

4.1 Flow of Overall Similar Image Search Processing

Figure 24B:
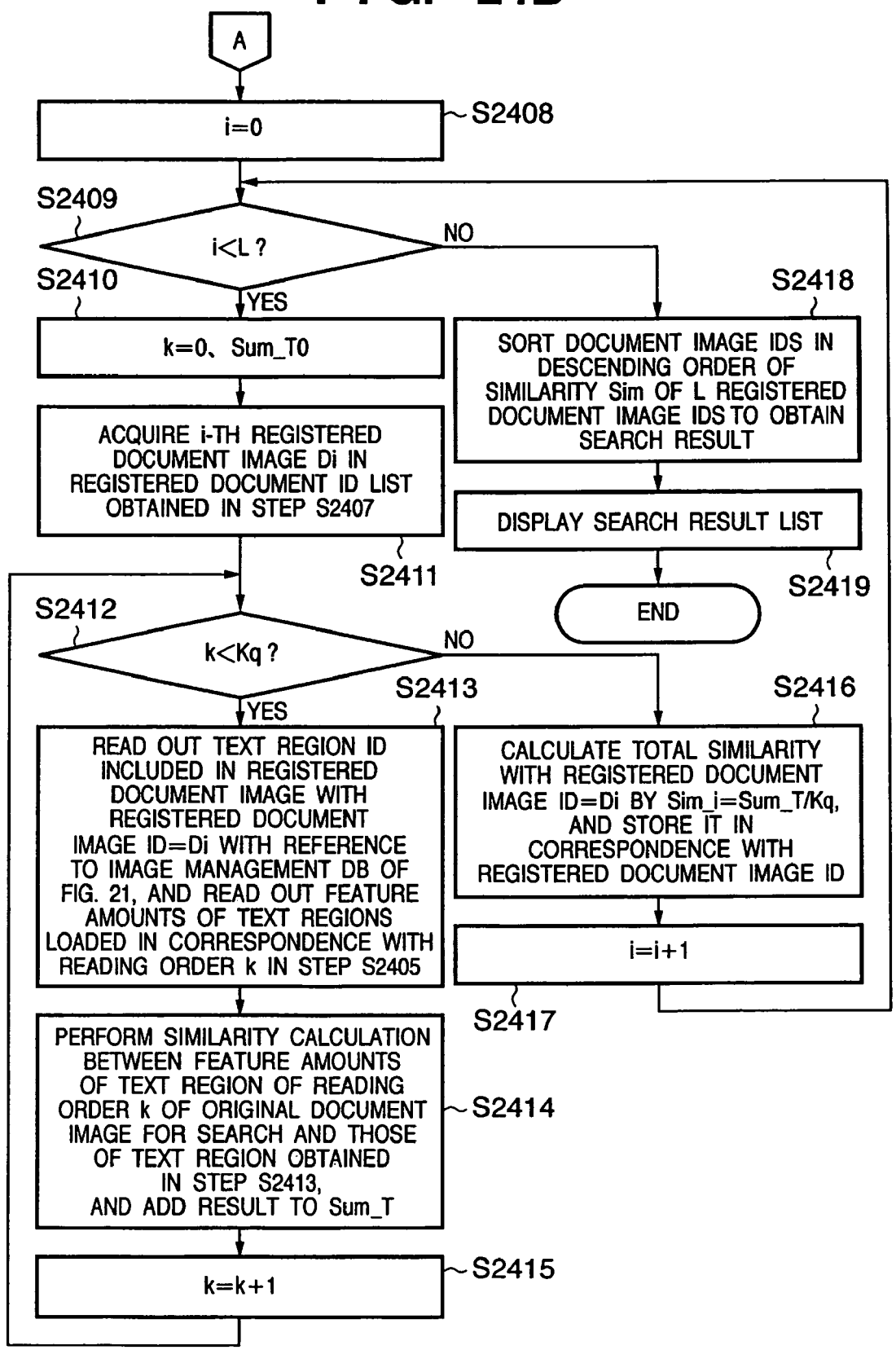
FIG. 24B is a flowchart showing the flow of similar image search processing (feature amount detailed comparison and similarity calculation processing)

The flow of the similar image search processing will be described below. FIGS. 24A and 24B are flowcharts showing the flow of the similar image search processing. Especially, steps S2401 to S2407 in FIG. 24A show the flow of pre-search processing for narrowing down registered document images on the basis of an original document image for search, and high-speed search is implemented with a small memory size by exploiting a feature amount management function as a characteristic feature of the present invention.

On the other hand, steps S2408 to S2424 in FIG. 24B show the flow of processing for performing detailed comparison of feature amounts and calculating similarity for registered document images narrowed down by the pre-search processing.

In step S2401, an original document image for search is input via the image input device 110 under the control of the query image input unit 207, and is temporarily stored in the image memory on the RAM 103 by the image temporary storage unit 208.

In step S2402, the region division unit 209 divides the original document image for search into a plurality of partial regions (text and image regions), determines the orders of a sequence of partial regions in correspondence with image and text regions on the basis of predetermined rules, and manages them using numbers (to assign reading orders). This is to manage information corresponding to respective partial regions of the original document image for search.

In step S2403, the region feature extraction unit 210 extracts the number N of partial regions, the number Kq of text regions, and the center of gravity position coordinates, sizes, aspect ratios, and intra-region text information of text regions included in the original document image for search, and temporarily stores them in a work area on the RAM 103.

The processes in steps S2402 and S2403 are basically the same as those in the image registration processing in FIG. 20, except that the analysis results of the original document image for search are temporarily stored in the work area on the RAM 103 in place of being registered in the DBs in FIGS. 21, 22, and 23. Hence, a detailed description of these processes will be omitted.

In step S2404, the region similarity comparison unit 211 determines a divided block near the center of gravity of each text region in the original document image for search. Based on the shape determination result of the original document image for search and the number Kq of extracted text regions in step S2403, and the determined divided block, the text region indices (FIG. 22) of the text region management DB 1901 are referred to. If matched IDs are found, the corresponding text region IDs and feature amounts (aspect ratio, size, and center of gravity position coordinates) of the text regions are loaded onto the memory of the RAM 103 in correspondence with the reading order of text regions of the original document image for search.

In step S2405, the feature amounts (aspect ratio, size, and center of gravity position coordinates) of the text regions loaded onto the memory in correspondence with the reading order are compared with the center of gravity position coordinates, size, and aspect ratio of each text region of the original document image for search, thus narrowing down text regions which fall within an allowable range. The narrowed-down text region IDs are stored in correspondence with the reading order of text regions included in the original document image for search. This processing is repeated for all text regions of the original document image for search.

In step S2406, the text region IDs narrowed down in step S2405 are converted into a registered document image ID with reference to the registered document image ID field 2101 in FIG. 21, and the registered document image ID is newly stored. This processing is repeated for all text regions.

In step S2407, the registered document image IDs obtained in step S2406 are logically ANDed to narrow down registered document images having text regions corresponding to all the text regions of the original document image for search, and the registered document image IDs (the number L of registered document image IDs) are stored as a new registered document image ID list. The pre-search processing in the similar image search processing has been explained.

The feature amount detailed comparison and similarity calculation processing will be described below using FIG. 24B. In step S2408, a processed pre-search data counter i is set to be zero. In step S2409, the processed pre-search data counter i is compared with the number L of registered document image IDs obtained as a result of the pre-search processing to check if the pre-search data counter i is smaller than the number L. If it is determined in step S2409 that the pre-search data counter i is smaller than the number L, the flow advances to step S2410.

In step S2410, a processed text region counter k and text region accumulated similarity Sum_T are reset to zero. In step S2411, Di as the i-th registered document image ID of the registered document image ID list stored in step S2407 is acquired.

In steps S2412 to S2415, all the text regions of the original document image for search and those of the registered document image Di undergo similarity comparison to obtain the text region accumulated similarity Sum_T. The similarity comparison between text regions will be described in detail later.

In step S2412, the processed text region counter k is compared with the number Kg of text regions to check if text regions to be compared still remain. If it is determined that the processed text region counter k is smaller than the number Kq of text regions, i.e., if it is determined that text regions to be compared still remain, the flow advances to step S2413 to read out a text region ID to be compared included in the registered document image with the registered document image ID=Di with reference to data (FIG. 21) in the image management DB 215. The text region IDs corresponding to the reading order k read in step S2405 are searched for one which matches the readout text region ID, and feature amounts of that text region are read out.

Next, in step S2414 the feature amounts of the text region of the reading order k of the original document image for search, and those of the text region obtained in step S2413 undergo similarity calculations, and the result is added to the text region accumulated similarity Sum_T. In step S2415, the processed text region counter k is incremented.

The processes in steps S2412 to S2415 are repeated until it is determined in step S2412 that no text region to be compared remains. If it is determined that no text region to be compared remains, the flow advances to step S2416 to calculate, as a total similarity of the registered document image with the registered document image ID=Di:

$$Sim\_i = Sum\_T/Kq \qquad (5)$$

The total similarity is stored in correspondence with the registered document image ID.

In step S2417, the processed pre-search data counter i is incremented, and the flow returns to step S2409. If it is determined in step S2409 that the original document image for search is not compared with all registered document images narrowed down by the pre-search processing yet, the processes in steps S2410 to S2417 are repeated again.

On the other hand, if it is determined that the original document image for search is compared with all registered document images narrowed down by the pre-search processing, the flow advances to step S2418 to sort registered document image IDs in descending order of total similarity Sim_i corresponding to the L registered document IDs stored in step S2416, thus obtaining search results. In step S2419, retrieved registered document images are displayed as a search result list using thumbnail images, as shown in FIG. 18. Also, total similarities (scores) are displayed together.

4.2 Details of Region Similarity Comparison Processing (Step S2414)

The similarity comparison processing of the text region of interest of the original document image for search and those of registered document images will be described below with reference to the flowchart of FIG. 25.

In step S2501, the center of gravity position coordinates, size, aspect ratio, and intra-region text information of the text region of interest of the original document image for search are loaded. In step S2502, the center of gravity position coordinates, size, aspect ratio, and intra-region text information of the text region in the registered document image are loaded.

In step S2503, a difference between the aspect ratios is calculated. It is checked in step S2504 if the difference between the aspect ratios is equal to or smaller than a threshold. If it is determined in step S2504 that the difference between the aspect ratios is equal to or smaller than the threshold, the flow advances to step S2505. On the other hand, if it is determined that the difference between the aspect ratios is larger than the threshold, the flow advances to step S2509 to output a similarity=0% without any similarity comparison processing.

In step S2505, a difference between the center of gravity position coordinates is calculated. It is checked in step S2506 if the difference between the center of gravity position coordinates is equal to or smaller than a threshold. If it is determined in step S2506 that the difference between the center of gravity position coordinates is equal to or smaller than the threshold, the flow advances to step S2507. On the other hand, if it is determined that the difference between the center of gravity position coordinates is larger than the threshold, the flow advances to step S2509 to output a similarity=0% without any similarity comparison processing.

In step S2507, a difference between the sizes relative to the document images is calculated. It is checked in step S2508 if the difference between the sizes is equal to or smaller than a threshold. If it is determined in step S2508 that the difference between the sizes is equal to or smaller than the threshold, the flow advances to step S2510. On the other hand, if it is determined that the difference between the sizes is larger than the threshold, the flow advances to step S2509 to output a similarity=0% without any similarity comparison processing.

In step S2510, a demerit point ratio Rp from a similarity is set on the basis of the difference between the aspect ratios, that between the center of gravity position coordinates, and that between the sizes. Let Asp0 be the aspect ratio of the text region of interest of the original document image for search, (Gx0, Gy0) be the center of gravity position coordinates, and S0 be the size. Also, let Asp1 be the aspect ratio of the text region of the registered document image, (Gx1, Gy1) be the center of gravity position coordinates, and S1 be the size.

Note that as in the first embodiment, the center of gravity position coordinates are defined as relative ($0 \leq X \leq 1$) position coordinates when the vertical and horizontal sizes of the registered document image are assumed to be 1. The size of the text region is defined as an area of the text region when the area of the registered document image is assumed to be 1. The aspect ratio is defined as a ratio of the number of vertical pixels to the number of horizontal pixels of the text region.

Furthermore, let D_ASP, D_G, and D_S be variances of the difference between the aspect ratios, that between the center of gravity position coordinates, and that between the sizes, which are recognized as correct answers using data sets that are recognized as correct answers by experiments, and $\alpha 1$, $\alpha 2$, and $\alpha 3$ be contribution coefficients of the difference between the aspect ratios, that between the center of gravity position coordinates, and that between the sizes to a similarity. Then, the demerit point ratio Rp is described by:

$$Rp = \alpha 1 * abs(Asp1 - Asp0)/D\_ASP + \alpha 2 * sqrt((Gx1 - Gx0)*(Gx1-Gx0)+(Gy1-Gy0)*(Gy1-Gy0))/D\_G + \alpha 3 * abs(S1-S0)/D\_S \quad (6)$$

In step S2511, the two pieces of intra-region text information are compared to obtain a similarity between the text regions.

The flow of processing for calculating a similarity between the text regions will be described below using FIG. 26. In step S2601, the number M of intra-region characters and a character string Str1[M] of each text region of the original document image for search are obtained. In step S2602, the number N of intra-region characters and a character string Str2[N] of each text region of the registered document image are obtained.

In step S2603, a string element number I used to refer to Str1[M], a string element number J used to refer to Str2[N], and a similarity distance Dist are reset to zero. Str1[0] indicates the first character of the text region of the original document image for search.

In step S2604, the I-th character Str1[I] of the original document image for search is compared with the J-th character Str2[J] of the registered document image. If the two characters are equal to each other, I and J are incremented by 1 in step S2605 to advance the characters of the original document image for search and registered document image by one character, and the flow advances to step S2607.

On the other hand, if Str1[I] and Str2[J] are different in step S2604, only I is incremented by 1 in step S2606, i.e., only the character of the original document image for search is advanced by one character, and the similarity distance Dist is incremented by 1. The flow then advances to step S2607.

It is checked in step S2607 if I<M and J<N, i.e., the characters to be referred to fall within the limit ranges. If this condition is met, the flow returns to step S2604 to compare characters again. On the other hand, if NO in step S2607, a normalized similarity distance is calculated by:

$$\text{if } (M \leq N) \begin{cases} Dnorm = (Dist + N - M)/N; \\ \text{else} \\ Dnorm = (Dist + M - N)/M; \end{cases} \quad (7)$$

According to formula (7), Dnorm=0 if the character string of the original document image for search is equal to that of the registered document image. The value of Dnorm increases as the character string of the registered document image includes a larger number of characters which are not included in the character string of the original document image for search. If the length of the character string of the original document image for search is different from that of the character string of the registered document image, the value of Dnorm increases as the length of characters which are not compared is larger.

Figure 27:
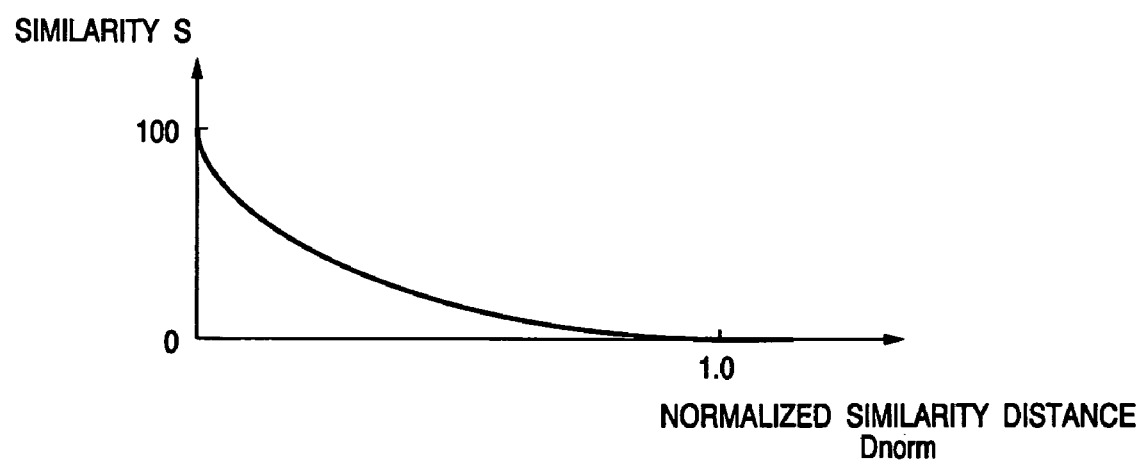
FIG. 27 is a graph showing an example of the characteristics of a function of converting a similarity distance into a similarity used in the text region comparison processing.

Furthermore, the normalized similarity distance Dnorm is obtained, and is converted into a similarity S with reference to the table which has nonlinear characteristics, and converts the distance to a similarity, as shown in FIG. 27. Finally, in step S2511 the text region accumulated similarity Sum_T is calculated using the demerit point ratio obtained in step S2510 by:

$$Sum\_T = S*(1-Rp) \quad (8)$$

As can be seen from the above description, the image search processing of the image search apparatus according to this embodiment uses the block ID of the center of gravity position of each text region as the narrowing-down conditions in addition to the number of text regions included in a document image. In this manner, since the block at the center of gravity position of each text region is used in addition to the number of text regions, narrowing-down processing can be done to the appropriate number.

The narrowing-down processing is configured to use the number of text regions and the block ID of the center of gravity position of each text region as an index, and to load only feature amounts of text regions that match the index onto a memory. Since only specific feature amounts stored and managed in a DB are loaded to calculate a similarity, the search speed is greatly higher than the conventional method which sequentially loads feature amounts stored on an HDD or individually and directly refers to feature amounts stored and managed using a DB. In addition, the memory consumption amount can be greatly reduced without any large search speed drop compared to the conventional method which stores all feature amounts on the memory.

In order to eliminate omission upon narrowing down, allowable values are provided to block IDs of the center of gravity positions of text regions as the narrowing-down conditions, and candidates are further narrowed down under the condition that feature amounts (the center of gravity position coordinates, size, and aspect ratio of each text region) of text regions which match the narrowing-down conditions and are loaded onto the memory fall within the allowable range. In this manner, since narrowing-down processing is done in two steps, candidates can be further narrowed down to the appropriate number without any omission.

The image search processing of the image search apparatus according to this embodiment uses the center of gravity position coordinates, sizes, aspect ratio, and intra-region text information of text regions included in document images upon comparing feature amounts of the narrowed-down document images and calculating similarities.

In this way, since only specific feature amounts stored and managed in the DB are loaded upon calculating similarities, the memory consumption amount can be greatly reduced without any large search speed drop compared to the conventional method which stores all feature amounts on the memory.

Third Embodiment

In the first and second embodiments, an original document image for search is given as a query. However, the present invention is not limited to this, and the registered document image which has already been registered can be given as a query. Such processing can be implemented by configuring steps S1301, S1302, and S1303 in FIG. 13A (steps to S2401, S2402, and S2403 in FIG. 24A) to read out the number N of partial regions, the number Jq (Kq) of image regions (text regions), and the center of gravity position coordinates, sizes, aspect ratios, and color feature information (intra-region text information) of an image region (text region) group included in the registered document image from the DB.

Fourth Embodiment

The image registration/similar image search processing is executed based on image regions in the first embodiment and based on text regions in the second embodiment. However, the present invention is not limited to this, and the image registration/similar image search processing may be executed using both image and text regions. Details will be described hereinafter.

1. Hardware Arrangement of Image Search Apparatus

The hardware arrangement of the image search apparatus according to this embodiment is the same as that of the first embodiment, and a description thereof will be omitted.

2. Functional Block Arrangement of Image Search Apparatus

Figure 28:
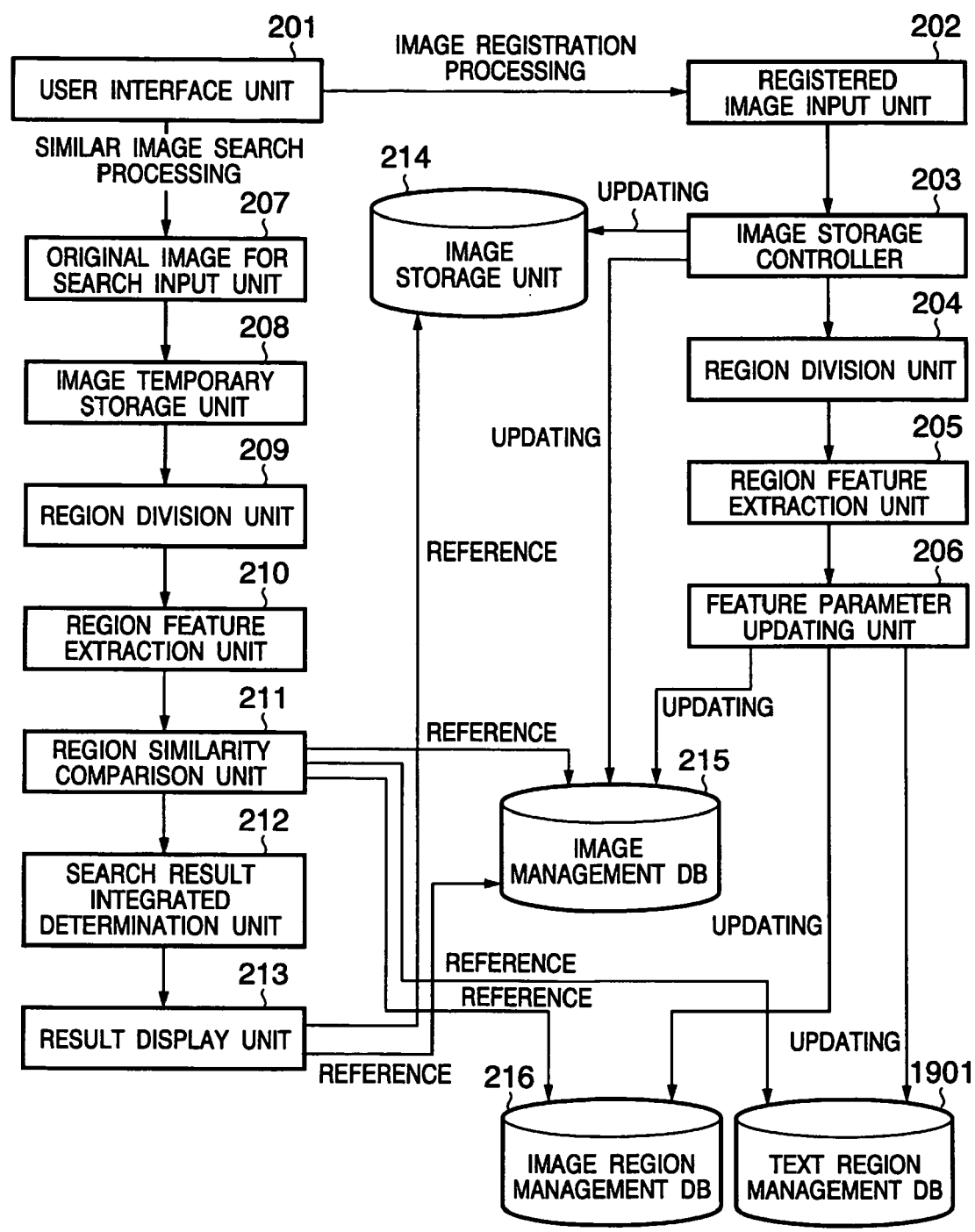
FIG. 28 is a block diagram showing the arrangement of an image registration/similar image search function of the image search apparatus according to the fourth embodiment of the present invention.

FIG. 28 is a block diagram showing the arrangement of an image registration/similar image search function of the image search apparatus according to this embodiment. Note that the same reference numerals in FIG. 28 denotes the same blocks as in the first embodiment, and a description thereof will be omitted. The difference from FIG. 2 lies in that a text region management DB 1901 is added, and feature amounts of respective text regions are stored in the DB by the feature amount updating unit 206.

3. Image Registration Processing 3.1. Flow of Overall Image Registration Processing Data to be stored in the respective DBs (image management DB 215, image region management DB 216, and text region management DB 1901) by the image registration processing will be described first.

A plurality of partial regions (image and text regions) are extracted from an image to be registered as a registered document image by the image registration processing, the aspect ratio, the size relative to the registered document image, and the center of gravity position coordinates are obtained as "feature amounts associated with each partial region", and color feature information (or intra-region text information) is obtained as a "feature amount associated with the contents of each partial region". These feature amounts are stored in the image management DB 215, image region management DB 216, and text region management DB 1901 in correspondence with the registered document image. Practical examples of data to be stored in the DBs, i.e., the image management DB 215, image region management DB 216, and text region management DB 1901 are as shown in FIGS. 30 to 34.

FIG. 30 shows a practical example of data stored in the image management DB 215, FIGS. 31 and 32 show practical examples of data to be stored in the image region management DB 216, and FIGS. 33 and 34 show practical examples of data to be stored in the text region management DB 1901.

Figure 29:
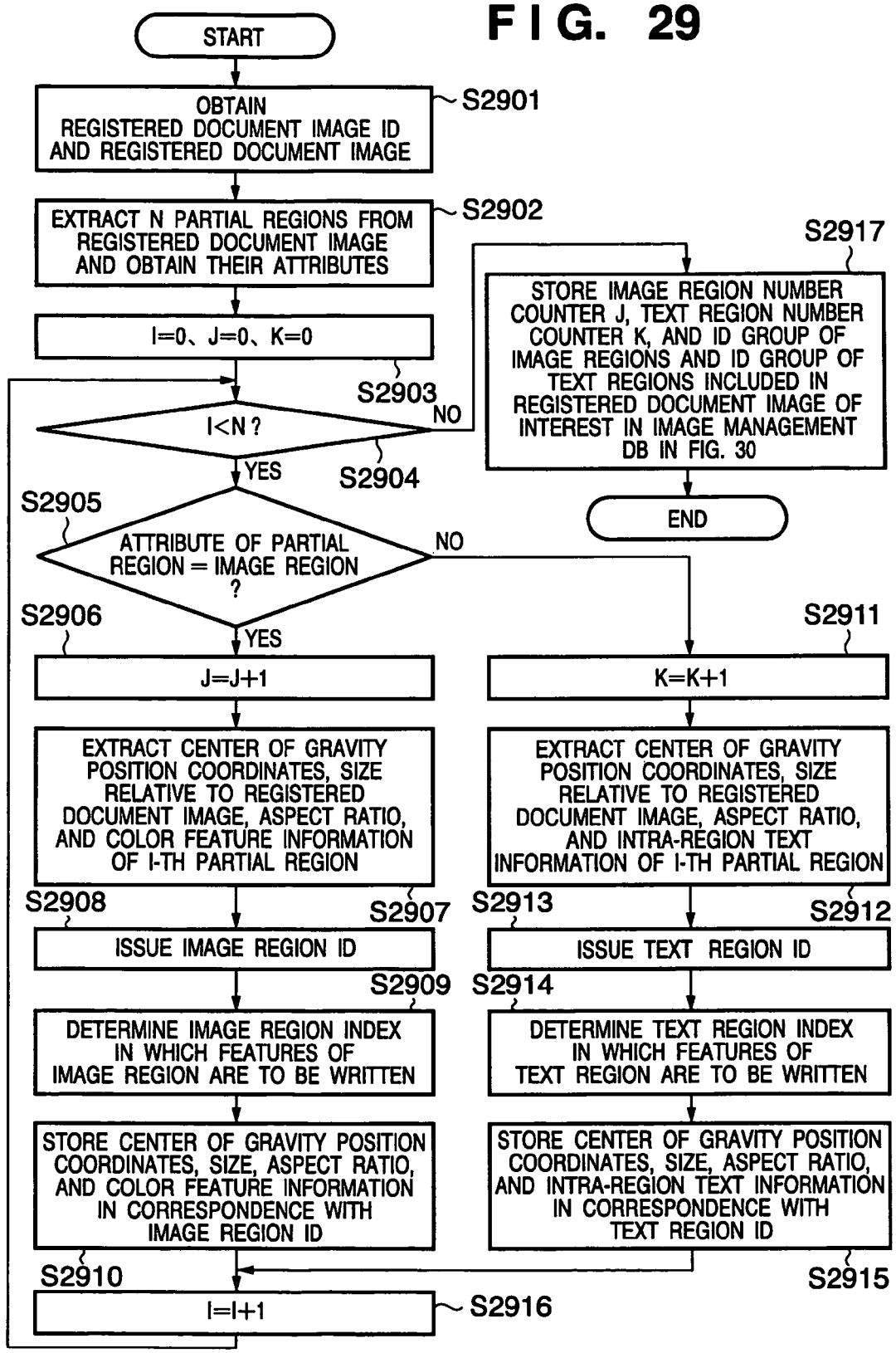
FIG. 29 is a flowchart showing the flow of image registration processing.

The flow of processes until respective DBs are generated by the image registration processing will be described below using FIG. 29. FIG. 29 is a flowchart showing the flow of the image registration processing. In step S2901, the registered image input unit 202 inputs a registered document image via the image input device 110. Furthermore, the image storage controller 203 issues an ID of the input registered document image, stores the ID of the registered document image in a registered document image ID field (3001 in FIG. 30) in the image management DB 215, stores the storage location of the registered image in a full-path file name field (3002 in FIG. 30), and then stores the registered document image in the image storage unit 214 as a file.

In step S2902, the region division unit 204 extracts partial regions and their attributes from the registered document image, and obtains the number (N) of extracted partial regions. Since extraction of the partial regions and their attributes has already been explained using FIG. 4 in the first embodiment, a detailed description thereof will be omitted.

In step S2903, the region feature extraction unit 205 resets a partial region number counter I, image region number counter J, and text region number counter K to zero. Furthermore, it is checked in step S2904 if the partial region number counter I is smaller than the number N of partial regions. If it is determined in step S2904 that the partial region number counter I is smaller than the number N of partial regions, the flow advances to processes in step S2905 and subsequent steps. In this manner, the processes in step S2905 and subsequent steps are repeated until the partial region number counter I becomes equal to the number N of partial regions and all partial regions are processed.

If the partial region number counter I becomes equal to the number N of partial regions and all partial regions are processed, the flow advances to step S2917. In step S2917, the feature amount updating unit 206 stores the value of the image region number counter J in an image region number field 3003 in the image management DB 215, and the value of the text region number counter K in a text region number field 3004, and stores an image region ID group included in the registered document image in an image region ID field 3005 and a text region ID group in a text region ID field 3006, thus ending the processing.

On the other hand, if it is determined in step S2904 that I<N and partial regions to be processed still remain, the region feature extraction unit 205 checks in step S2905 if the attribute of the I-th partial region indicates an image region. If it is determined in step S2905 that the attribute of the I-th partial image indicates an image region, the image region number counter J is incremented by 1 in step S2906, and the flow advances to step S2907.

In step S2907, the center of gravity position coordinates, the size relative to the registered document image, and the aspect ratio as "feature amounts associated with the I-th partial region", and color feature information as "information associated with the contents of that partial region" are extracted.

In step S2908, the feature amount updating unit 206 issues a unique image region ID. Furthermore, in step S2909 an index (image region index) that reflects the nature of the image region of the registered document image is determined. In this embodiment, assume that the image region index is a combination of:

document image shape (vertically elongated, horizontally elongated, square) (3101);

the number of image regions included in the document image (3102); and a center of gravity block of the image region (3103).

Furthermore, in step S2910 the feature amount updating unit 206 stores the center of gravity position coordinates (3203), the size relative to the registered document image (3202), the aspect ratio (3201), and color feature information (3204) in the image region management DB 216 in correspondence with the image region ID (3205). In step S2911, the partial region number counter I is incremented by 1, and the flow returns to step S2904.

On the other hand, if it is determined in step S2905 that the attribute of the I-th partial region does not indicate an image region, the flow advances to step S2911 to increment the text region number counter K by 1, and the flow then advances to step S2912.

In step S2912, the center of gravity position coordinates, the size relative to the registered document image, and the aspect ratio as "feature amounts associated with the I-th partial region", and intra-region text information as "information associated with the contents of that partial region" are extracted.

In step S2913, the feature amount updating unit 206 issues a unique text region ID. Furthermore, in step S2914 an index (text region index) that reflects the nature of the text region of the registered document image is determined. In this embodiment, assume that the text region index is a combination of:

document image shape (vertically elongated, horizontally elongated, square) (3301);

the number of text regions included in the document image (3302); and a center of gravity block of the text region (3303).

Furthermore, in step S2915 the feature amount updating unit 206 stores the center of gravity position coordinates (3403), the size relative to the registered document image (3402), the aspect ratio (3401), and intra-region text information (3404) in the text region management DB 1901 in correspondence with the text region ID (3405). In step S2916, the partial region number counter I is incremented by 1, and the flow returns to step S2904.

Figure 35B:
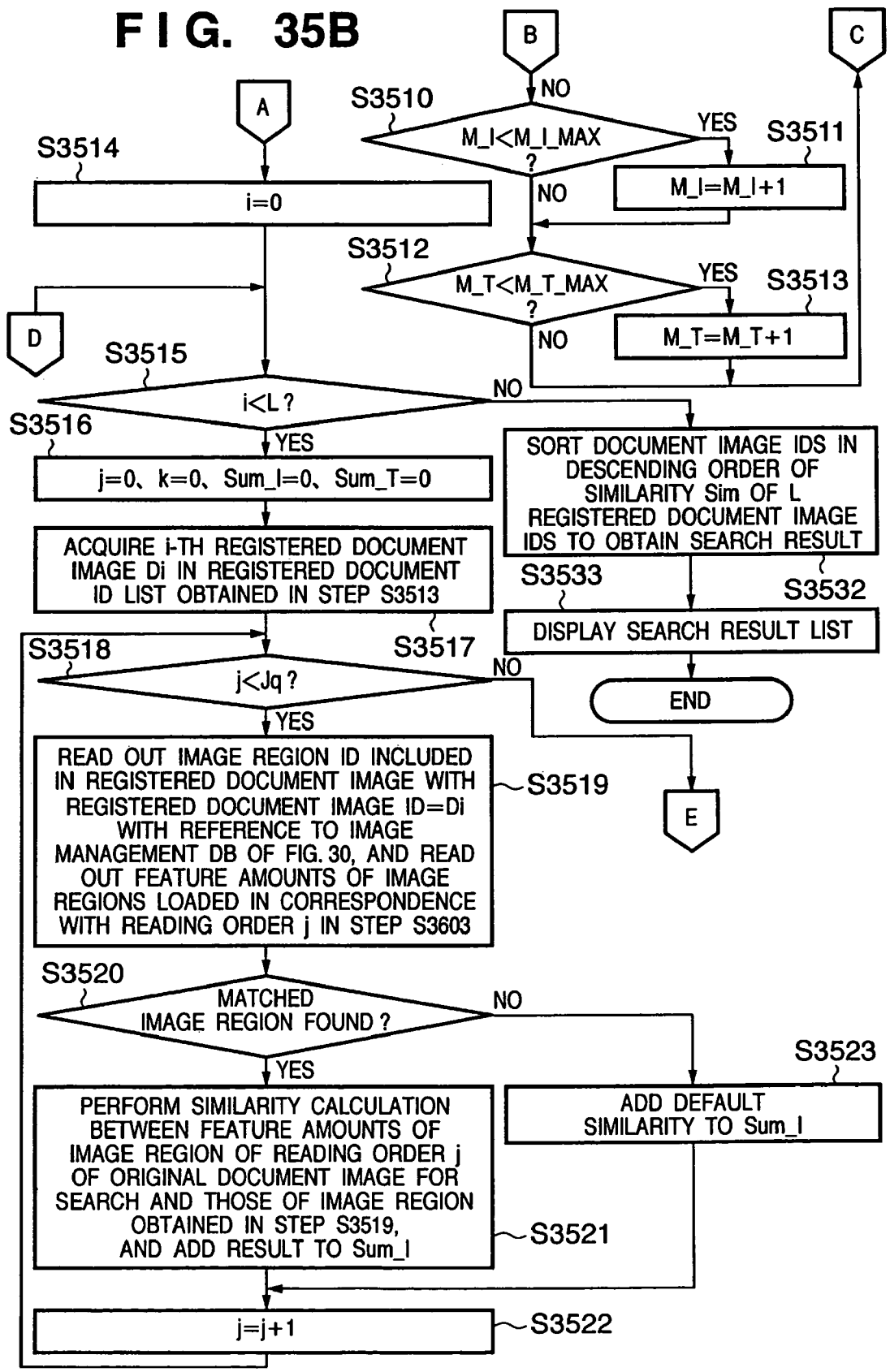
FIG. 35B is a flowchart showing the flow of the similar image search processing.
Figure 35C:
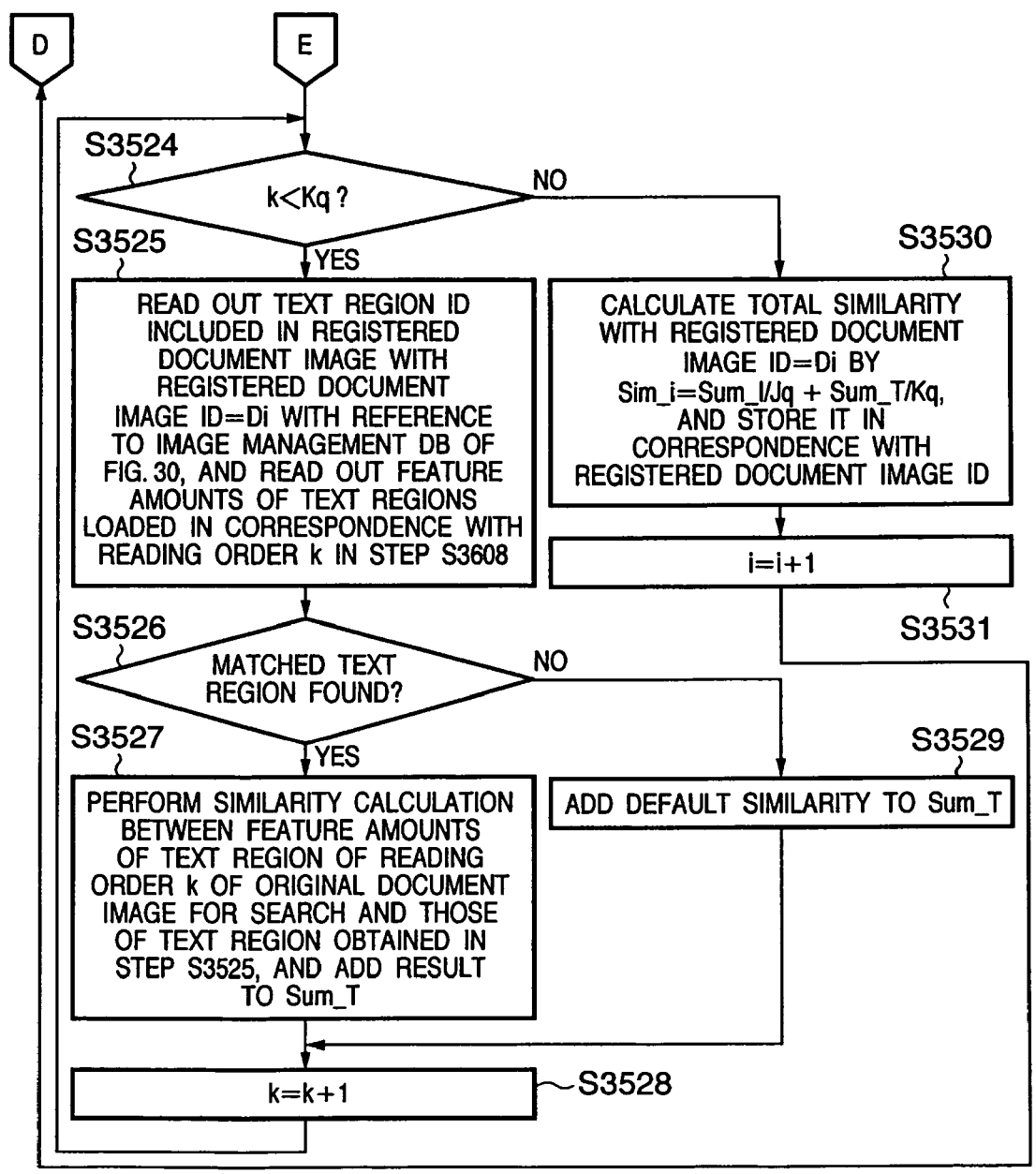
FIG. 35C is a flowchart showing the flow of the similar image search processing.

4. Similar Image Search Processing 4.1 Flow of Overall Similar Image Search Processing The flow of the similar image search processing will be described below. FIGS. 35A to 35C are flowcharts showing the flow of the similar image search processing. Especially, steps S3501 to S3513 in FIGS. 35A and 35B show the flow of pre-search processing for narrowing down registered document images on the basis of an original document image for search, and high-speed search is implemented with a small memory size by exploiting a feature amount management function as a characteristic feature of the present invention.

On the other hand, steps S3514 to S3529 in FIGS. 35B and 35C show the flow of processing for performing detailed comparison of feature amounts and calculating similarity for registered document images narrowed down by the pre-search processing.

In step S3501, an original document image for search is input via the image input device 110 under the control of the query image input unit 207, and is temporarily stored in the image memory on the RAM 103 by the image temporary storage unit 208.

In step S3502, the region division unit 209 divides the original document image for search into a plurality of partial regions (text and image regions), determines the orders of a sequence of partial regions in correspondence with image and text regions on the basis of predetermined rules, and manages them using numbers (to assign reading orders). This is to manage information corresponding to respective partial regions of the original document image for search.

In step S3503, the region feature extraction unit 210 determines the shape of the original document image for search, extracts the number N of partial regions, the number Jq of image regions, the number Kq of text regions, the center of gravity position coordinates, sizes, aspect ratios, and intra-region text information of text regions included in the original document image for search, and the center of gravity position coordinates, sizes, aspect ratios, and color feature information of image regions, and temporarily stores them in a work area on the RAM 103.

The processes in steps S3502 and S3503 are basically the same as those in the image registration processing in FIG. 29, except that the analysis results of the original document image for search are temporarily stored in the work area on the RAM 103 in place of being registered in the DBs in FIGS. 30, 31, 32, 33, and 34. Hence, a detailed description of these processes will be omitted.

In step S3504, an image region number allowable range maximum value M_I_MAX is calculated from the number Jq of image regions. This maximum value is calculated at, e.g., a ratio which is predetermined for the number Jg of image regions. Likewise, in step S3505 a text region number allowable range maximum value M_T_MAX is calculated from the number Kq of text regions.

In step S3506, an image region number allowable range M_I and text region number allowable range M_T are initialized to zero. In step S3507, pre-search processing in FIGS. 36A and 36B (to be described in detail later) is called. Initial search is conducted using the same numbers of image and text regions.

It is checked in step S3508 if the number L of hits is larger than 0 as a result of the pre-search processing in step S3507. If L>0, the flow advances to the feature amount detailed comparison processing.

On the other hand, if it is determined in step S3508 that the number L of hits is equal to or smaller than 0, it is confirmed in step S3509 if both the region number allowable ranges M_I and M_T have reached their region number allowable range maximum values. If both the ranges have reached their maximum values, the flow advances to the feature amount detailed comparison processing even when the number of hits is zero in the pre-search processing (in this case, the number of his=0 is returned).

On the other hand, if it is determined in step S3509 that both the region number allowable ranges M_I and M_T have not reached their region number allowable range maximum values yet, it is confirmed in step S3510 if the image region number allowable range M_I has reached the region number allowable range maximum value M_I_MAX. If the range M_I has not reached its maximum value yet, the image region number allowable range M_I is incremented by 1 in step S3511, and the flow advances to step S3512; otherwise, the flow advances to step S3512.

Likewise, it is confirmed in step S3512 if the text region number allowable range M_T has reached the region number allowable range maximum value M_T_MAX. If the range M_T has not reached its maximum value yet, the image region number allowable range M_T is incremented by 1 in step S3513, and the pre-search processing in step S3507 is executed again; otherwise, the pre-search processing in step S3507 is directly executed.

The processes in steps S3507 to S3513 are recursively executed until either of the conditions is met: it is determined in step S3508 that the number L of hits>0 as a result of the pre-search processing, or it is determined in step S3509 that both the image and text regions have reached their region number allowable range maximum values.

The flow of the feature amount detailed comparison processing will be described below using FIGS. 35B and 35C. In step S3514, a processed pre-search data counter i is set to be zero. In step S3515, the processed pre-search data counter i is compared with the number L of hits of the pre-search processing. If i<L, the flow advances to the feature amount detailed comparison processing in step S3516.

In step S3516, a processed image region counter j, processed text region counter k, image region accumulated similarity Sum_I, and text region accumulated similarity Sum_T are reset to zero. Di as the i-th registered document image ID of the registered document image ID list stored in step S3513 is then acquired.

In the processes in steps S3518 to S3521, all the image regions of the original document image for search and those of the registered document image Di undergo similarity comparison to obtain the image region accumulated similarity Sum_I.

It is checked in step S3518 if image regions to be compared still remain. If no image region to be compared remains, the flow branches to text region comparison in step S3522; if image regions to be compared still remain, an image region ID to be compared included in the registered document image with the registered document image ID=Di is read out from the image management DB in FIG. 30 in step S3519. The image region IDs corresponding to a reading order j read in step S3603 are searched for one which matches the readout image region ID, and feature amounts of that image region are read out.

It is checked in step S3520 if the matched image region is found. If the matched image region is found, similarity calculations between the feature amounts of the image region with the reading order j of the original document image for search and those of the image region obtained in step S3519 are made, and the result is added to the image region accumulated similarity Sum_I in step S3521. In step S3522, the processed image region counter j is incremented.

On the other hand, if it is determined in step S3520 that no matched image region is found, a default similarity (a delicate level between similar and non-similar levels) is added to Sum_I in step S3523, and the processed image region counter j is incremented in step S3522.

The processes in steps S3519 to S3523 are repeated until no image region to be compared remains. If no image region to be compared remains, the flow advances to the text region comparison processing in step S3524.

In the processes in steps S3524 to S3529, all the text regions of the original document image for search and those of the registered document image Di undergo similarity comparison to obtain the text region accumulated similarity Sum_T.

It is checked in step S3524 if text regions to be compared still remain. If text regions to be compared still remain, a text region ID to be compared included in the registered document image with the registered document image ID=Di is read out from the image management DB in FIG. 30 in step S3525. The text region IDs corresponding to a reading order k read in step S3608 are searched for one which matches the readout text region ID, and feature amounts of that text region are read out.

It is checked in step S3526 if the matched text region is found. If the matched text region is found, similarity calculations between the feature amounts of the text region with the reading order k of the original document image for search and those of the text region obtained in step S3522 are made, and the result is added to the text region accumulated similarity Sum_T in step S3527. In step S3528, the processed text region counter k is incremented.

On the other hand, if it is determined in step S3526 that no matched text region is found, a default similarity (a delicate level between similar and non-similar levels) is added to Sum_T in step S3529, and the processed text region counter j is incremented in step S3528.

The processes in steps S3524 to S3528 are repeated until no text region to be compared remains. If no text region to be compared remains, the flow branches from step S3524 to step S3530, and a total similarity of the registered document image Di is calculated by:

$$Sim\_i = Sum\_I/Jq + Sum\_T/Kq \qquad (9)$$

The calculated total similarity is stored in correspondence with the registered document image ID. The processed pre-search data counter i is incremented in step S3531, and the flow returns to step S3515.

If it is determined in step S3515 that the processed pre-search data counter i is smaller than the number L of hits of the pre-search processing (if it is determined that comparison is not made with all registered document images hit in the pre-search processing), the processes in steps S3516 to S3531 are repeated. On the other hand, if it is determined that comparison is made with all registered document images hit in the pre-search processing, the flow advances to step S3532 to sort registered document image IDs in descending order of total similarity Sim_i corresponding to the L registered document IDs stored in step S3530, thus obtaining search results. In step S3533, retrieved registered document images are displayed as a search result list using thumbnail images. Also, total similarities (scores) are displayed together.

4.2 Pre-Search Processing

The pre-search processing in FIGS. 36A and 36B will be described below. In the flowcharts of FIGS. 36A and 36B, steps S3602 to S3606 correspond to the narrowing-down processing associated with image regions, steps S3607 to S3611 correspond to the narrowing-down processing associated with text regions, and step S3612 corresponds to processing for logically ANDing these processing results, and combining pre-search results which satisfy both the conditions of the image and text regions.

In step S3601, the number Jq of image regions, the image region number allowable range M_I, the number Kq of text regions, the text region number allowable range M_T, the center of gravity position coordinates, sizes, aspect ratios, and intra-region text information of a text region group included in the original document image for search, and the center of gravity position coordinates, sizes, aspect ratios, and color feature information of an image region group are received as the pre-search processing conditions.

It is checked in step S3602 if the number Jq of image regions=0. If the number Jq of image regions=0 (i.e., no image region is included), the flow advances to step S3607. On the other hand, if the number Jq of image regions≠0, i.e., if it is determined that image regions exist, the flow advances to step S3603.

In step S3603, a divided block near the center of gravity of each image region is determined. Based on the shape determination result of the document image, the number Jq of extracted image regions, and the determined divided block, FIG. 31 is referred to. If matched IDs are found, the corresponding image region IDs and feature amounts of the image regions are loaded onto the memory in correspondence with the reading order of image regions of the original document image for search.

In step S3604, the feature amounts (aspect ratio, size, and center of gravity position coordinates) of the image regions loaded onto the memory in correspondence with the reading order are compared with the center of gravity position coordinates, size, and aspect ratio of each image region of the original document image for search, thus narrowing down image regions which fall within an allowable range. The narrowed-down image region IDs are stored in correspondence with the reading order of image regions included in the original document image for search. This processing is repeated for all image regions of the original document image for search.

In step S3605, the image region IDs narrowed down in step S3604 are converted into a registered document image ID with reference to the registered document image ID field in FIG. 30, and the registered document image ID is newly stored. This processing is repeated for all image regions.

In step S3606, the registered document image IDs obtained in step S3605 are logically ANDed to narrow down to registered document images having image regions corresponding to all the image regions of the original document image for search. The narrowed-down registered document image IDs are newly stored as a registered document image ID list.

Steps S3607 to S3611 correspond to the narrowing-down processing associated with text regions, which is the same as the narrowing-down processing associated with text regions in steps S3602 to S3606, and a description thereof will be omitted.

In step S3612, the registered document image IDs of text regions are logically ANDed to narrow down to registered document image IDs including all text regions. These registered document image IDs and those which are stored in step S3606 are logically ANDed to narrow down to registered document image IDs which satisfy both the image region condition and text region condition, thus obtaining the number L of registered document images.

As can be seen from the above description, the image search processing of the image search apparatus according to this embodiment uses, as the narrowing-down conditions, the numbers of image and text regions as partial regions included in a document image, the block ID of the center of gravity position of each image region, and that of the center of gravity position of each text region. Since the numbers of image and text regions and the blocks of the center of gravity positions of image and text regions are used, narrowing-down processing can be done to the appropriate number.

The narrowing-down processing is configured to use the number of image regions, the number of text regions, the block ID of the center of gravity position of each image region, and the block ID of the center of gravity position of each text region as an index, and to load only feature amounts of image or text regions that match the index onto a memory. Since only specific feature amounts stored and managed in a DB are loaded to calculate a similarity, the search speed is greatly higher than the conventional method which sequentially loads feature amounts stored on an HDD or individually and directly refers to feature amounts stored and managed using a DB. In addition, the memory consumption amount can be greatly reduced without any large search speed drop compared to the conventional method which stores all feature amounts on the memory.

In order to eliminate omission upon narrowing down, allowable values are provided to block IDs of the center of gravity positions of image and text regions as the narrowing-down conditions, and candidates are further narrowed down under the condition that feature amounts (the center of gravity position coordinates, size, and aspect ratio of each of image and text regions) of image and text regions which match the narrowing-down conditions and are loaded onto the memory fall within the allowable range, so as to narrow down to the appropriate number. In this manner, since narrowing-down processing is done in two steps, candidates can be further narrowed down to the appropriate number without any omission.

A characteristic feature of the image search processing of the image search apparatus according to this embodiment lies in that the center of gravity position coordinates, sizes, aspect ratio, color feature information, and intra-region text information of image and text regions included in document images are used upon comparing feature amounts of the narrowed-down document images and calculating similarities.

In this way, since only specific feature amounts stored and managed in the DB are loaded upon calculating similarities, the memory consumption amount can be greatly reduced without any large search speed drop compared to the conventional method which stores all feature amounts on the memory.

Furthermore, since this embodiment adopts a recursive configuration that broadens the image region number allowable range and text region number allowable range to obtain at least one registered document image as a result narrowed down by the pre-search processing, the search performance can be improved.

Fifth Embodiment

The fourth embodiment adopts the recursive configuration that broadens the image region number allowable range and text region number allowable range to obtain at least one registered document image as a result narrowed down by the pre-search processing. However, the present invention is not limited to this, and the image region number allowable range and text region number allowable range may be broadened to obtain a total similarity equal to or higher than a predetermined threshold in the similar image search processing.

Figure 37B:
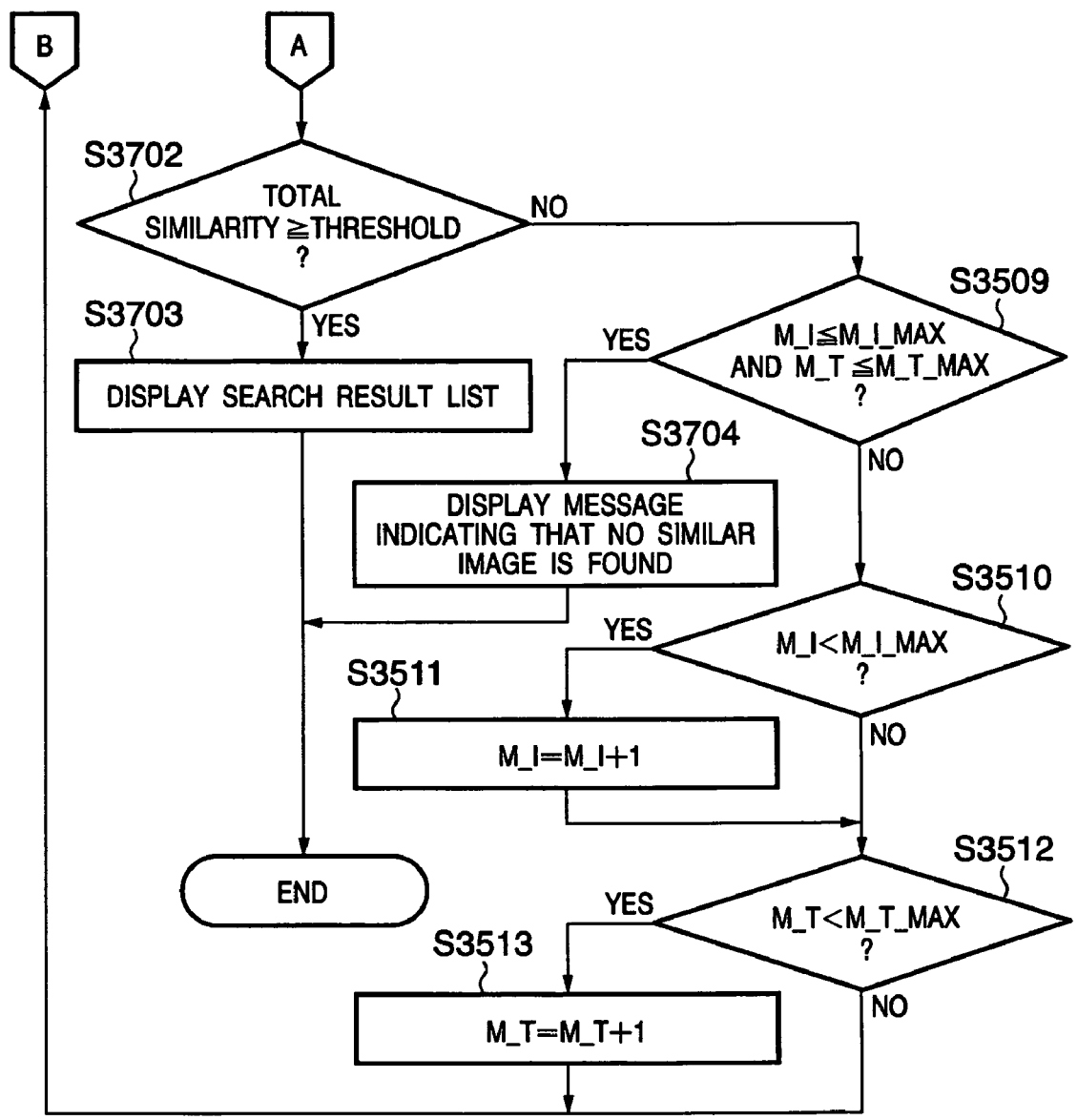
FIG. 37B is a flowchart showing the flow of similar search processing.

FIGS. 37A and 37B show the flow of processing for conducting recursive search processing by increasing M again and obtaining search results with total similarities equal to or higher than a threshold when the highest one of obtained total similarities does not reach the threshold as a result of performing detailed comparison of feature amounts and calculating similarities.

This processing can be considered as an application which recursively performs both of the pre-search processing and feature amount detailed comparison processing, and uses the search result in control of recursive processing, in place of the recursive pre-search processing in the fourth embodiment.

In step S3501, an original document image for search is input via the image input device 110 under the control of the query image input unit 207, and is temporarily stored in the image memory on the RAM 103 by the image temporary storage unit 208.

In step S3502, the region division unit 209 extracts a plurality of partial regions (text and image regions) from the original document image for search, determines the orders of a sequence of partial regions in correspondence with image and text regions on the basis of predetermined rules, and manages them using numbers (to assign reading orders). This is to manage information corresponding to respective partial regions of the original document image for search.

In step S3503, the region feature extraction unit 210 extracts the number N of partial regions, the number Jq of image regions, the number Kq of text regions, the center of gravity position coordinates, sizes, aspect ratios, and intra-region text information of text regions included in the original document image for search, and the center of gravity position coordinates, sizes, aspect ratios, and color feature information of image regions, and temporarily stores them in a work area on the RAM 103.

The processes in steps S3502 and S3503 are basically the same as those in the image registration processing in FIG. 29, except that the analysis results of the original document image for search are temporarily stored in the work area on the RAM 103 in place of being registered in the DBs in FIGS. 30, 31, 32, 33, and 34. Hence, a detailed description of these processes will be omitted.

In step S3504, an image region number allowable range maximum value M_I_MAX is calculated from the number Jq of image regions. This maximum value is calculated at, e.g., a ratio which is predetermined for the number of image regions. Likewise, in step S3505, a text region number allowable range maximum value M_T_MAX is calculated from the number Kg of text regions.

In step S3506, an image region number allowable range M_I and text region number allowable range M_T are initialized to zero. In step S3701, pre-search processing in FIGS. 36A and 36B is executed. As for the pre-search processing in FIGS. 36A and 36B, and the feature amount detailed comparison processing in FIGS. 35B and 35C to be subsequently executed, initial search is conducted using the same numbers of image and text regions.

Note that the processing flow in FIGS. 36A and 36B has already been described in the fourth embodiment, and the processing flow in FIGS. 35B and 35C has substantially the same contents as that of the fourth embodiment. Hence, a description thereof will be omitted.

It is checked in step S3702 if the maximum value of total similarities is larger than a threshold as a result of the processing in step S3701. If the maximum value is larger than the threshold, the flow advances to step S3703 to display a search result list.

If it is determined in step S3702 that the maximum value of total similarities is smaller than the threshold, it is confirmed in step S3509 if both the image and text region number allowable ranges M_I and M_T have reached their region number allowable range maximum values (M_I_MAX and M_T_MAX). If both the ranges have reached their maximum values, a message indicating that no similar document is available is displayed in step S3704.

If one of the image and text region number allowable ranges M_I and M_T has reached the region number allowable range maximum value in step S3509, it is confirmed in step S3510 if the image region number allowable range M_I has reached the image region number allowable range maximum value M_I_MAX. If the range M_I has not reached the maximum value yet, M_I is incremented by 1 in step S3511, and the flow then advances to step S3512. If the range M_I has reached the maximum value, the flow directly advances to step S3512.

Likewise, it is confirmed in step S3512 if the text region number allowable range M_T has reached the text region number allowable range maximum value. If the range M_T has not reached the maximum value yet, M_T is incremented by 1 in step S3513, and the flow returns to step S3507. If the range M_T has reached the maximum value, the flow directly returns to step S3507.

The processes in steps S3701 to S3513 are recursively executed until one of conditions is met: the result which has the maximum value of total similarities larger than the threshold is found in step S3702 or both the image and text regions have reached the region number allowable range maximum values in step S3509.

Sixth Embodiment

In the fourth and fifth embodiments, embodiments of search that considers both text and image regions have been described. Of course, search that considers only text or image regions may be conducted according to user's choice.

In order to easily implement this, the arrangement of the fourth or fifth embodiment remains the same, and the extraction result of the region feature extraction unit 205 may be masked to output only text or image regions.

More specifically, in the image registration processing, if the extraction result is masked in the region feature extraction processing in step S2502 in FIG. 25, only documents that reflect the extraction result can be searched for.

In similar image search, if the extraction result is masked in step S3601 in FIG. 36A as the region feature extraction processing, e.g., if the image region extraction result is discarded, search that considers only text regions can be conducted. Conversely, if text region extraction result is discarded, search that considers only image regions can be conducted.

Of course, when steps S3602 to S3606 in FIG. 36A are removed, search that considers only text regions can be conducted, or when steps S3607 to S3611 in FIG. 36B are removed, search that considers only image regions can be conducted. However, this is as a matter of implementation, and a description will be omitted for the sake of simplicity.

In any case, the fourth and fifth embodiments can be applied to either one of a text or image region or both the text and image regions.

Seventh Embodiment

In the fourth to sixth embodiments, an original document image for search is given as a query. However, the present invention is not limited to this, and the registered document image which has already been registered can be given as a query. Such processing can be implemented by configuring steps S3501, S3502, and S3503 in FIG. 35A to read out the number N of partial regions, the number Jq of image regions, the number Kq of text regions, the center of gravity position coordinates, sizes, aspect ratios, and color feature information of an image region group included in the registered document image, and the center of gravity position coordinates, sizes, aspect ratios, and intra-region text information of a text region group from the DB.

In the fourth to sixth embodiments, similarities calculated for respective partial regions are averaged to obtain a total similarity. Alternatively, the average of similarities or that of weighting coefficients may be calculated.

As an implementation method, the user may designate a weight γ of a text region and a weight β of an image region in advance as the search condition, and respective similarities may be multiplied by a normalized weight WT=γ/(γ+β) of the text region and a normalized weight WI=β/(γ+β) of the image region and their average may be calculated, thus obtaining the weighted average.

A total similarity FinalSim can be expressed, using the number M of text regions, a similarity STi of the i-th text region, Wi, the number N of image regions, and a similarity SIj of the j-th image region, by:

$$FinalSim = \left\{\sum_{i=0}^{M} WT*STi + \sum_{j=0}^{N} WI*SIj\right\} / \{M*WT + N*WI\} \quad (10)$$

The difference between the comparison precision of color feature information in an image region and that of intra-region text information in a text region particularly largely depends on the number of characters in the text region. When the text data size in the text region is small, if the weight of a similarity to the text region is reduced due to a small information size, optimal weighting can be automatically applied.

In order to implement this, for example, an empirical text number threshold value ζ that can obtain similarity precision equivalent to an image region is used, and a weight Wi in case of the number n of characters in the i-th text region can be expressed by:

$$\begin{aligned} \text{if } (n \geq \zeta) \quad & Wi = 1.0; \\ \text{else} \quad & Wi = 1.0 - n/\zeta; \end{aligned} \quad (11)$$

In this case, the total similarity FinalSim can be expressed, using the number M of text regions, the similarity STi of the i-th text region, Wi, the number N of image regions, and the similarity SIj of the j-th image region, by:

$$FinalSim = \left\{\sum_{i=0}^{M} Wi*STi + \sum_{j=0}^{N} SIj\right\} / \left\{\sum_{i=0}^{M} Wi + N\right\} \quad (12)$$

Other Embodiment

Note that the present invention may be applied to either a system or integrated apparatus constituted by a plurality of devices (e.g., a host computer, interface device, reader, printer, and the like), or an apparatus consisting of a single equipment.

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

Note that the present invention can be applied to a case wherein a program is delivered from a storage medium that records the program code of software which implements the functions of the aforementioned embodiments to a demander via a communication line such as PC communications.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-354702 filed on Dec. 7, 2004, which is hereby incorporated by reference herein.

What is claimed is:

1. An image search apparatus for searching a plurality of saved registered images for an image similar to a predetermined image, comprising:

extraction unit configured to extract a plurality of partial regions which form an image;

determination unit configured to determine attributes of the partial regions extracted by said extraction unit;

first calculation unit configured to calculate the number of partial regions having an identical attribute of the attributes of the partial regions determined by said determination unit, and center of gravity positions of the partial regions;

second calculation unit configured to calculate feature amounts of the partial regions having the identical attribute of the attributes of the partial regions determined by said determination unit;

save unit configured to save the number of partial regions having the identical attribute and the positions of the partial regions calculated by said first calculation unit as an index in correspondence with the image;

load unit configured to refer to indices saved in said save unit on the basis of the number of partial regions having the identical attribute and the positions of the partial regions calculated by said first calculation unit, and for, when matched indices found, loading feature amounts of the matched partial regions onto a memory;

judgment unit configured to compare the feature amounts of the partial region which is included in the predetermined image and calculated by said second calculation unit with the feature amounts of the partial regions loaded by said load unit, and judging whether or not the feature amounts of the partial regions loaded by said load unit fall within predetermined allowable ranges, respectively; and selection unit configured to select the registered images on the basis of the judgment result of said judgment unit, wherein the registered images selected by said selection unit are searched for an image similar to the predetermined image.

2. The apparatus according to claim 1, wherein the feature amounts of the partial region include at least one of an aspect ratio, size, and center of gravity position coordinates of the partial region.

3. The apparatus according to claim 1, wherein the center of gravity position of the partial region is an identifier indicating, when an image is divided into a plurality of blocks, a block where a center of gravity of the partial region is located.

4. The apparatus according to claim 3, wherein based on the center of gravity positions of the partial regions which are calculated using said first calculation unit, are included in the predetermined image, and have the identical attribute, the indices saved in said save unit are referred to using identifiers indicating blocks which are located in the neighborhood of the block where the center of gravity of each partial region is located in addition to the identifier indicating the block where the center of gravity of each partial region is located.

5. The apparatus according to claim 2, wherein the partial regions having the identical attribute are image regions, and similarities between image regions included in the registered images selected by said selection unit and image regions included in the predetermined image are calculated using aspect ratios, sizes, center of gravity position coordinates, and color feature information of the image regions included in the selected registered images, and an aspect ratio, size, center of gravity position coordinates, and color feature information of the image regions included in the predetermined image.

6. The apparatus according to claim 5, wherein an average value of the similarities between the image regions included in each of the selected registered images and the image regions included in the predetermined image is output as a total similarity between each of the selected registered images and the predetermined image.

7. The apparatus according to claim 2, wherein the partial regions having the identical attribute are text regions, and similarities between text regions included in the registered images selected by said selection unit and text regions included in the predetermined image are calculated using aspect ratios, sizes, center of gravity position coordinates, and intra-region text information of the text regions included in the selected registered images, and an aspect ratio, size, center of gravity position coordinates, and intra-region text information of the text regions included in the predetermined image.

8. The apparatus according to claim 7, wherein an average value of the similarities between the text regions included in each of the selected registered images and the text regions included in the predetermined image is output as a total similarity between each of the selected registered images and the predetermined image.

9. The apparatus according to claim 1, wherein when the partial regions having the identical attribute are image regions, similarities between image regions included in the registered images selected by said selection unit and image regions included in the predetermined image are calculated using aspect ratios, sizes, center of gravity position coordinates, and color feature information of the image regions included in the selected registered images, and an aspect ratio, size, center of gravity position coordinates, and color feature information of the image regions included in the predetermined image, and when the partial regions having the identical attribute are text regions, similarities between text regions included in the registered images selected by said selection unit and text regions included in the predetermined image are calculated using aspect ratios, sizes, center of gravity position coordinates, and intra-region text information of the text regions included in the selected registered images, and an aspect ratio, size, center of gravity position coordinates, and intra-region text information of the text regions included in the predetermined image.

10. The apparatus according to claim 9, wherein an average value of the similarities between the image regions included in each of the selected registered images and the image regions included in the predetermined image, and an average value of the similarities between the text regions included in each of the selected registered images and the text regions included in the predetermined image are calculated, the average values are weighted, and the weighted average values are output as total similarities between each of the registered images and the predetermined image.

11. The apparatus according to claim 1, wherein said selection unit selects the registered images on the basis of not more than a predetermined allowable number of partial regions of the partial regions which are judged by said judgment unit to fall within the predetermined allowable range.

12. The apparatus according to claim 11, wherein when no registered image is selected by said selection unit, the predetermined allowable number is changed.

13. The apparatus according to claim 6, wherein said selection unit selects the registered images on the basis of not more than a predetermined allowable number of partial regions of the partial regions which are judged by said judgment unit to fall within the predetermined allowable range.

14. The apparatus according to claim 13, wherein when the total similarity between each of the selected registered images and the predetermined image is less than a predetermined threshold value, the predetermined allowable number is changed.

15. An image search method for searching a plurality of saved registered images for an image similar to a predetermined image, characterized by comprising:

an extraction step of extracting a plurality of partial regions which form an image;

a determination step of determining attributes of the partial regions extracted in the extraction step;

a first calculation step of calculating the number of partial regions having an identical attribute of the attributes of the partial regions determined in the determination step, and center of gravity positions of the partial regions;

a second calculation step of calculating feature amounts of the partial regions having the identical attribute of the attributes of the partial regions determined in the determination step;

a save step of saving the number of partial regions having the identical attribute and the positions of the partial regions calculated in the first calculation step as an index in save unit in correspondence with the image;

a load step of referring to indices saved in the save unit on the basis of the number of partial regions having the identical attribute and the positions of the partial regions calculated in the first calculation step, and loading, when matched indices found, feature amounts of the matched partial regions onto a memory;

a judgment step of comparing the feature amounts of the partial region which is included in the predetermined image and calculated in the second calculation step with the feature amounts of the partial regions loaded in the load step, and judging whether or not the feature amounts of the partial regions loaded in the load step fall within predetermined allowable ranges, respectively; and a selection step of selecting the registered images on the basis of the judgment result of the judgment step, wherein the registered images selected in the selection step are searched for an image similar to the predetermined image.

16. A computer-readable storage medium storing a computer-executable program for causing a computer to execute the method according to claim 15.

17. An image search method wherein said method has a document-region association index which associates text and image regions extracted from a document image with the document image, and a feature amount index which describes features of respective regions for each combination of a property pertaining to regions of the document image itself and properties of the respective regions themselves, registration processing extracts text and image regions by parsing the document image, generates the document-region association index that associates the document image and the extracted text and image regions, and describes the feature amounts by determining a feature amount index in which feature amounts of respective regions are to be additionally written on the basis of the combination of the property pertaining to the regions of the document image itself and the properties of the respective regions themselves, and search processing obtains, based on text and image regions obtained by parsing a query document image, properties of feature amount indices to be referred to on the basis of a combination of a property pertaining to regions of the query document image itself and properties of the respective regions themselves, reads out the corresponding feature amount indices onto a memory, narrows down document images including all regions to be compared with reference to the readout feature amount indices and the document-region association indices, and searches for document images by calculating a total similarity for each registered document on the basis of similarities of respective regions when similarity comparison processing using feature amounts is applied to the regions included in the narrowed-down document images.

18. The method according to claim 17, wherein the property pertaining to the regions of the document image itself includes at least the number of regions included in the document image, the property of the region itself includes at least a position of a center of gravity of the region, and the feature amount index is determined by combining at least the number of regions and the position of the center of gravity of the region to describe and refer to the feature amounts of a region of interest.

19. The method according to claim 17, wherein the property pertaining to the regions of the document image itself includes the number of regions included in the document image and a shape of the document image, horizontally elongated shape, or the like the property of the region itself includes at least a position of a center of gravity of the region, and the feature amount index is determined by combining at least the number of regions, the shape of the document image, and the position of the center of gravity of the region to describe and refer to the feature amounts of a region.

20. The method according to claim 18, wherein the document image is divided into a plurality of M×N blocks, unique identification IDs are assigned to the blocks, and a block across which a largest area of the region extends is determined as the position of the center of gravity of the region.

21. The method according to claim 20, wherein when there are a plurality of blocks across which the largest area of the region extends, a block with a smallest ID of the IDs assigned to the plurality of blocks is determined as the position of the center of gravity of the region.

22. The method according to claim 17, wherein
when the search processing determines regions which are to undergo similarity comparison of registered document images with the regions obtained by parsing the query document image, the search processing refers to and reads out text region feature amount indices which include regions having centers of gravity of the regions in the neighborhood of the regions of the query images and have the same number of regions of document images onto the memory, the search processing obtains candidate regions on the basis of the readout feature amount indices, applies processing for obtaining pages including the candidate regions to all the regions of the query document image with reference to the document-region association indices, narrows down pages having regions corresponding to all the regions included in the query document images by logically ANDing the pages, and recursively performs the processing by incrementing M until narrowed-down information is found under a condition that document images do not have the same number of regions and have the numbers of regions falling within a range of ±M regions, when no matched information is found as a result of narrowing down, no hit is determined when no narrowed-down information is found after M is incremented to a given limit value, and when matched information is found as a result of narrowing down, the search processing calculates total similarities by applying feature comparison to only regions included in the pages narrowed down by a document-region association index management unit.

23. The method according to claim 17, wherein when the search processing determines regions which are to undergo similarity comparison of registered document images with the regions obtained by parsing the query document image, the search processing refers to and reads out region feature amount indices which include regions having centers of gravity of the regions in the neighborhood of the regions of the query images and have the same number of regions of document images onto the memory, the search processing obtains candidate text regions on the basis of the readout text feature amount indices, applies processing for obtaining pages including the candidate text regions to all the text regions of the query document image with reference to the document-region association indices, narrows down pages having regions corresponding to all the regions included in the query document images by logically ANDing the pages, and calculates total similarities by applying feature comparison to the regions included in the narrowed-down pages, when a highest total similarity of the calculated total similarities does not reach a threshold, the search processing recursively performs the processing by incrementing M until the highest total similarity reaches the threshold under a condition that document images do not have the same number of regions and have the numbers of regions falling within a range of ±M regions, and no hit is determined when the highest total similarity does not reach the threshold after M is incremented to a given limit value.

24. The method according to claim 17, wherein properties pertaining to regions of the document image itself and properties of the regions themselves are obtained in correspondence with text regions and image regions in association with the property pertaining to the regions of the document image itself, and feature amount indices are generated in correspondence with the text regions and image regions, respectively.

25. The method according to claim 20, wherein when the search processing determines regions which are to undergo similarity comparison of registered document images with text regions obtained by parsing the query document image, the search processing refers to and reads out text region feature amount indices which include regions having centers of gravity of the regions in the neighborhood of the text regions of the query images and have the same number of text regions of document images onto the memory, when the search processing determines regions which are to undergo similarity comparison of registered document images with image regions obtained by parsing the query document image, the search processing refers to and reads out text region feature amount indices which include regions having centers of gravity of the regions in the neighborhood of the image regions of the query images and have the same number of image regions of document images onto the memory, the search processing obtains candidate text regions on the basis of the readout text feature amount indices, applies processing for obtaining pages including the candidate text regions to all the text regions of the query document image with reference to the document-region association indices, and determines pages having text regions corresponding to all the text regions included in the query document images by logically ANDing the pages, the search processing obtains candidate image regions on the basis of the readout image feature amount indices, applies processing for obtaining pages including the candidate image regions to all the image regions of the query document image with reference to the document-region association indices, and determines pages having image regions corresponding to all the image regions included in the query document images by logically ANDing the pages, the search processing narrows down registered document pages corresponding all the text regions and all the image regions of the query document image by making logical operations of the pages corresponding to the text regions and the image regions, when no matched information is found as a result of narrowing down, the search processing recursively performs the processing by incrementing M until narrowed-down information is found under a condition that document images do not have the same numbers of text regions and image regions and have the numbers of regions falling within a range of ±M regions, no hit is determined when no narrowed-down information is found after M is incremented to a given limit value, and when matched information is found as a result of narrowing down, the search processing calculates total similarities by applying feature comparison to only text regions and image regions included in the pages narrowed down by a document-region association index management unit.

26. The method according to claim 20, wherein when the search processing determines regions which are to undergo similarity comparison of registered document images with text regions obtained by parsing the query document image, the search processing refers to and reads out text region feature amount indices which include regions having centers of gravity of the regions in the neighborhood of the text regions of the query images and have the same number of text regions of document images onto the memory, when the search processing determines regions which are to undergo similarity comparison of registered document images with image regions obtained by parsing the query document image, the search processing refers to and reads out image region feature amount indices which include regions having centers of gravity of the regions in the neighborhood of the image regions of the query images and have the same number of image regions of document images onto the memory, the search processing obtains candidate text regions on the basis of the readout text feature amount indices, applies processing for obtaining pages including the candidate text regions to all the text regions of the query document image with reference to the document-region association indices, and determines pages having text regions corresponding to all the text regions included in the query document images by logically ANDing the pages, the search processing obtains candidate image regions on the basis of the readout image feature amount indices, applies processing for obtaining pages including the candidate image regions to all the image regions of the query document image with reference to the document-region association indices, and determines pages having image regions corresponding to all the image regions included in the query document images by logically ANDing the pages, the search processing narrows down registered document pages corresponding all the text regions and all the image regions of the query document image by making logical operations of the pages corresponding to the text regions and the image regions, and calculates total similarities by applying feature comparison to only text regions and image regions included in the narrowed-down pages, when a highest total similarity of the calculated total similarities does not reach a threshold, the search processing recursively performs the processing by incrementing M until the highest total similarity reaches the threshold under a condition that document images do not have the same numbers of text regions and image regions and have the numbers of regions falling within a range of ±M regions, and no hit is determined when the highest total similarity does not reach the threshold after M is incremented to a given limit value.

27. The method according to claim 22, wherein search is conducted in consideration of either of text regions and image regions by masking an extraction result of either of the text regions and image regions of a parsing result of the query document image.

28. The method according to claim 22, wherein the limit value of a region number error allowable range is calculated by multiplying the number of text and image regions by a predetermined ratio.

29. The method according to claim 22, wherein the search processing considers the text region which has the center of gravity on the same divided block as the divided block including the center of gravity of the text region to be compared as the text region having the center of gravity of the region in the vicinity of the text region of the query document image, and considers the image region which has the center of gravity on the same divided block as the divided block including the center of gravity of the image region to be compared as the image region having the center of gravity of the region in the vicinity of the image region of the query document image.

30. The method according to claim 22, wherein the search processing considers the text region which has the center of gravity on all or some of divided blocks across which the text region to be compared extends as the text region having the center of gravity in the neighborhood of the text region of the query document image, and considers the image region which has the center of gravity on all or some of divided blocks across which the image region to be compared extends as the image region having the center of gravity in the neighborhood of the image region of the query document image.

31. The method according to claim 22, wherein the search processing considers the text region which has the center of gravity in the same block as the divided block including the center of gravity of the text region to be compared and surrounding divided blocks thereof as the text region having the center of gravity of the region in the vicinity of the text region of the query document image, and considers the image region which has the center of gravity on the same divided block as the divided block including the center of gravity of the image region to be compared and surrounding divided blocks thereof as the image region having the center of gravity of the region in the vicinity of the image region of the query document image.

32. The method according to claim 22, wherein the search processing considers the text region which has the center of gravity in a plurality of divided blocks obtained by adding divided blocks, in each of which a distance from the center of gravity of the image region to a boundary is not more than a threshold, of divided blocks including a divided block where the center of gravity of the text region to be compared exists and neighboring divided blocks to the divided block where the center of gravity of the image region to be compared exists, as the text region having the center of gravity of the region in the vicinity of the text region of the query document image, and considers the image region which has the center of gravity in a plurality of divided blocks obtained by adding divided blocks, in each of which a distance from the center of gravity of the image region to a boundary is not more than a threshold, of divided blocks including a divided block where the center of gravity of the image region to be compared exists and neighboring divided blocks to the divided block where the center of gravity of the image region to be compared exists, as the image region having the center of gravity of the region in the vicinity of the image region of the query document image.

33. An image search apparatus wherein said apparatus has a document-region association index which associates text and image regions extracted from a document image with the document image, and a feature amount index which describes features of respective regions for each combination of a property pertaining to regions of the document image itself and properties of the respective regions themselves, registration processing extracts text and image regions by parsing the document image, generates the document-region association index that associates the document image and the extracted text and image regions, and additionally writes the feature amounts by determining a feature amount index in which feature amounts of respective regions are to be additionally written on the basis of the combination of the property pertaining to the regions of the document image itself and the properties of the respective regions themselves, and search processing obtains, based on text and image regions obtained by parsing a query document image, properties of feature amount indices to be referred to on the basis of a combination of a property pertaining to regions of the query document image itself and properties of the respective regions themselves, reads out the corresponding feature amount indices onto a memory, narrows down document images including all regions to be compared with reference to the readout feature amount indices and the document-region association indices, and searches for document images by calculating a total similarity for each registered document on the basis of similarities of respective regions when similarity comparison processing using feature amounts is applied to the regions included in the narrowed-down document images.

34. A computer-readable storage medium storing a computer-executable program for causing a computer to execute the method according to claim 17.

\* \* \* \* \*